(12) United States Patent
Hada et al.

(10) Patent No.: US 6,346,064 B1
(45) Date of Patent: Feb. 12, 2002

(54) DRIVING FORCE CONTROL UNIT FOR VEHICLES

(75) Inventors: Satoshi Hada; Takahiro Eguchi; Toshiya Kanda; Yoichi Sugimoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/634,460

(22) Filed: Aug. 7, 2000

(30) Foreign Application Priority Data

Aug. 6, 1999 (JP) ............................................. 11-224658

(51) Int. Cl.[7] .......................... B60K 41/20; B60K 41/24
(52) U.S. Cl. ....................... 477/171; 477/173; 477/203; 477/901
(58) Field of Search ............................. 477/71, 74, 92, 477/93, 171, 173, 203, 901

(56) References Cited

U.S. PATENT DOCUMENTS

| | | | | |
|---|---|---|---|---|
| 4,804,074 A | * | 2/1989 | Kori ........................ | 477/901 X |
| 5,549,525 A | * | 8/1996 | Wendel .................. | 477/901 X |
| 5,916,061 A | * | 6/1999 | Koyama et al. ............. | 477/175 |
| 5,989,153 A | * | 11/1999 | Fischer et al. ................. | 477/74 |
| 6,086,508 A | * | 7/2000 | Kosik et al. .................. | 477/74 |

OTHER PUBLICATIONS

Patent Abstract of Japan 09202159 A Aug. 5, 1997.
Patent Abstract of Japan 01244930 A Sep. 29, 1989.

* cited by examiner

*Primary Examiner*—Charles A Marmor
*Assistant Examiner*—Ankur Parekh
(74) *Attorney, Agent, or Firm*—Sughrue Mion, PLLC

(57) ABSTRACT

A driving force control unit for a vehicle, which allows transmission of driving force from a driving motor to driving wheels irrespective of releasing an accelerator pedal at a certain or lower vehicle speed when a transmission is set in a driving range, and which switches the magnitude of the driving force while the accelerator pedal is released at vehicle speed no more than the certain vehicle speed between a greater condition and a smaller condition in accordance with depression of the brake pedal so that the driving force is made lower at a depression of the brake pedal than at a release of the brake pedal. In the driving force control unit, the driving force value in said greater condition upon switching from said smaller condition to said greater condition, at a release of the brake pedal during the time the vehicle stops, is increased or decreased according to an inclination angle of the vehicle at the time of stopping. Meanwhile, the increasing rate of said driving force upon switching from said smaller condition to said greater condition, at a release of the brake pedal during the time the vehicle stops, is increased or decreased based on a vehicle inclination angle when the vehicle stops.

6 Claims, 26 Drawing Sheets

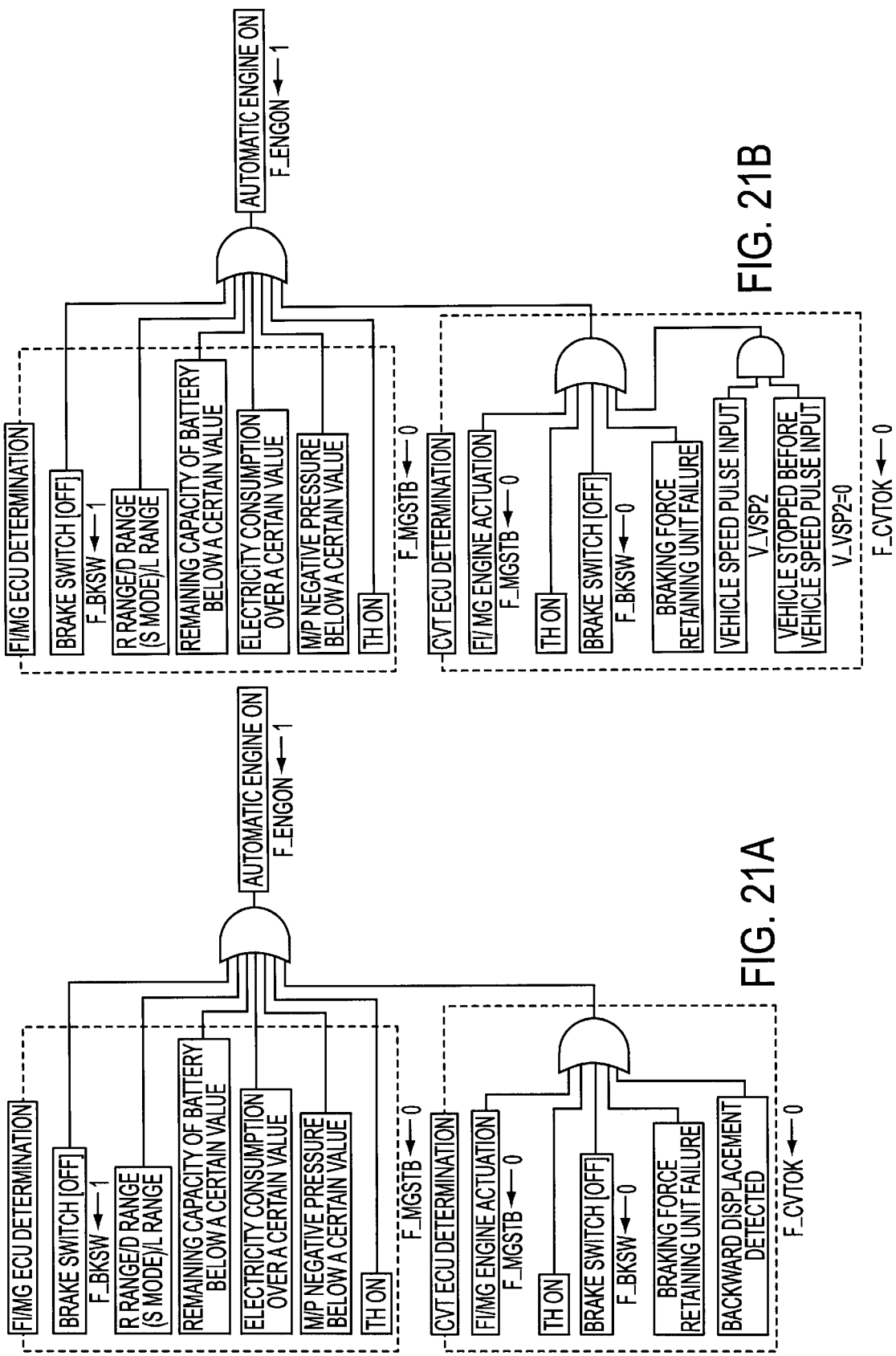

DRIVING FORCE CONTROL UNIT FOR VEHICLES

FIELD OF THE INVENTION

The present invention relates to a driving force control unit for a vehicle which is capable of switching the driving force to be transmitted to the driving wheels based on the brake pedal depression.

BACKGROUND OF THE INVENTION

In the prior art, vehicles exist in which the driving force is transmitted to the driving wheels when the transmission is set in a driving range and the vehicle is idling at a certain or lower vehicle speed, including when the vehicles stop. The driving force in an idling condition is called "creep force", by which unintentional backward displacement of the vehicle on a slope is restricted or the running operation in traffic is improved. In this conventional vehicle, creep force is generated even when the brake pedal is depressed and the vehicle is in an idling condition at the certain or lower vehicle speed. At this time, the creep force generated by the rotation of the engine is forcibly restricted by the braking force, which can cause vehicle vibration or noise.

In order to solve this problem, Japanese Patent Publication No. 1-244930 (i.e., Japanese Patent Application No.63-71520) discloses a control unit for a vehicular automatic clutch which is applied to a control system for establishing a low dragging torque (creep force) when the transmission is set in a driving range and the vehicle moves at an extremely low speed. The control unit makes the creep force lower when the brake pedal is depressed than when the brake pedal is released. According to this disclosure, the creep force is changed by depressing the brake pedal from a high state (strong creep condition) to a low state (weak creep condition) so that the aforementioned problems, such as vibrations when the vehicle stops, can be eliminated.

In Japanese Patent Publication No.9-202159 (i.e., Japanese Patent Application No. 8-12457), there is also disclosed a vehicle with a starting clutch, in which the starting clutch is half engaged to apply driving force (creep force) to the vehicle when the transmission is set in a driving range and the vehicle moves at an extremely low speed. In this vehicle, the engaging state of the starting clutch is controlled in response to a braking operation of the driver so that the driving force is made lower (in the weak creep condition) when the brake pedal is depressed than when the brake pedal is released.

However, if the brake pedal depression is released while the vehicle stops, the driving force is switched from the low state to the high state. When the driving force value in the high state upon switching from the low state is set at a smaller value, the vehicle can start smoothly on a flat road, but is likely to displace backwards on an up slope when the accelerator pedal is depressed. On the other hand, when the aforementioned driving force value in the high state is set at a larger value, the vehicle can start smoothly on an up slope without any backward displacement, but may start abruptly on a flat road. As to the increasing rate of the driving force upon switching from the low state to the high state when the vehicle starts, if the increasing rate is set to a higher value, the vehicle can start smoothly without any backward displacement on an up slope, but is likely to cause an abrupt start on a flat road.

SUMMARY OF THE INVENTION

In view of the foregoing problems, an objective of the present invention is to provide a driving force control unit for a vehicle which ensures that the vehicle starts smoothly.

In order to achieve this object, according to a first aspect of the invention, a driving force control unit for a vehicle is provided which allows transmission of the driving force from a driving motor to driving wheels, irrespective of the releasing of an accelerator pedal at a certain or lower vehicle speed when a transmission is set in a driving range, and which switches the magnitude of the driving force while the accelerator pedal is released at a vehicle speed of no more than the certain vehicle speed between a greater condition and a smaller condition based on the brake pedal depression so that the driving force is made lower when the brake pedal is depressed rather than when the brake pedal is released, wherein the driving force value in the greater condition upon switching from the smaller condition to the greater condition, when the brake pedal is released when the vehicle stops, is increased or decreased based on a vehicle inclination angle when the vehicle is stopping.

According to the invention, the driving force value in the greater condition after the brake pedal is released is made larger at a large vehicle inclination angle and smaller at a small vehicle inclination angle.

The vehicle inclination angle means the surface gradient of a road on which the vehicle stops. The larger the vehicle inclination angle, the steeper the surface gradient of the road so that greater driving force is required to start the vehicle.

The term "a certain vehicle speed" indicates a vehicle speed just before the vehicle stops. Therefore, if a certain vehicle speed is 5 km/h, as an example shown in the preferred embodiments, the vehicle speed range "at a certain or lower vehicle speed" includes vehicle speeds from 0 km/h (when the vehicle stops) to 5 km/h.

Meanwhile, the "smaller condition" or "lowering" of the driving force includes the reduction of the driving force to zero (i.e., the driving motor is stopped, as in the preferred embodiments). Therefore, the "driving force being switched from the smaller condition to the greater condition includes the following two situations:

1) Driving force is established from zero and increased; and
2) Existing driving force is further increased.

According to a second aspect of the invention, in the aforementioned driving force control unit, the time period required for reaching the driving force value from when the brake pedal is released is controlled to be constant, irrespective of the driving force value in the greater condition.

After the brake pedal is released, the driving force is switched to the driving force value in the greater condition previously determined based on the vehicle inclination angle. However, the driving force is always switched to the preset driving force value for a constant time period, irrespective of the vehicle inclination angle. For this reason, the driver always experiences the constant time period from when the brake pedal is released to the initial motion of the vehicle, notwithstanding the gradient of the road.

According to a third aspect of the invention, a driving force control unit for a vehicle is provided which allows the transmission of the driving force from a driving motor to driving wheels, irrespective of an accelerator pedal being released at a certain or lower vehicle speed, when a transmission is set in a driving range, and which switches the magnitude of the driving force while the accelerator pedal is released at a vehicle speed no more than the certain vehicle speed between a greater condition and a smaller condition based on the brake pedal depression so that the driving force is made lower when the brake pedal is depressed than when the brake pedal is released, wherein the increasing rate of the driving force upon switching from the smaller condition to the greater condition, when the brake pedal is released when the vehicle stops, is increased or decreased based on an inclination angle when the vehicle stops.

According to this invention, the increasing rate of the driving force in the greater condition after the brake pedal is released is made larger at a large vehicle inclination angle and smaller at a small vehicle inclination angle.

As mentioned above, the vehicle inclination angle means the surface gradient of a road on which the vehicle stops. The larger the vehicle inclination angle, the steeper the surface gradient of the road so that a higher rise in the driving force is required to start the vehicle.

Here, the terms "a certain vehicle speed" and "at a certain or lower vehicle speed", "a smaller condition" or "lowering" of the driving force, and "the driving force is switched from the smaller condition to the greater condition" are similar to those described before.

According to a fourth aspect of the invention, the vehicle inclination angle is detected based on the braking force generated by the brake pedal depression while the vehicle stops.

The vehicle inclination angle has a constant relation to the braking force that is generated by the brake pedal depression while the vehicle stops. Therefore, the vehicle inclination angle may be determined in terms of the braking force at the time of stopping. This is because the driver depresses the brake pedal strongly on a steep gradient and weakly on a gentle gradient.

As to the vehicle weight (loading weight) on a slope, the heavier the loading weight, the greater the braking force that is required to keep the vehicle stationary on the slope. At the same time, the heavier the loading weight of the vehicle, the greater the driving force (higher rise in the driving force) that is required to start the vehicle. Therefore, if the driving force value is increased/decreased based on the braking force when the vehicle stops, the driving force value is increased/decreased based on the vehicle loading weight.

According to a fifth aspect of the invention, the vehicle inclination angle is determined by the brake pedal releasing rate when the vehicle stops.

Because the vehicle inclination angle has a constant relation to the brake pedal releasing rate when the vehicle stops, the vehicle inclination angle may be determined in terms of the brake pedal releasing rate while the vehicle stops. This is because the driver releases the brake pedal quickly on an up slope and slowly on a down slope.

As to the vehicle weight (loading weight) on an up slope, the heavier the loading weight, the more quickly the brake pedal is released. On a down slope, however, the heavier the loading weight, the more slowly the brake pedal is released. Therefore, if the driving force is increased/decreased based on the brake pedal releasing rate, the driving force value is increased/decreased based on the vehicle loading weight.

BRIEF DESCRIPTION OF THE DRAWINGS

FIG. 15 shows the control logic of the braking force retaining unit of FIG. 14, in which

FIG. 16 shows the control logic of the driving force control unit, in which

FIG. 18 shows the control logic of the braking force retaining unit of FIG. 14, in which

FIG. 19 shows the control logic of the driving force control unit, in which FIG. 19A shows a vehicle backward displacement detecting version, and FIG. 19B shows a vehicle movement detecting version, respectively;

FIG. 20 shows one example of a vehicle backward displacement detecting method in the vehicle of FIG. 13, in which

FIG. 21 shows the control logic of the driving motor stopping unit to be mounted on the vehicle of FIG. 13, in which FIGS. 21A and 21B show the control logic for automatically starting the engine. FIG. 21A shows a vehicle backward displacement detecting version, and FIG. 21B shows a vehicle movement detecting version, respectively;

DESCRIPTION OF THE PREFERRED EMBODIMENTS

A driving force control unit according to the present invention will be described in detail in connection with three of its embodiments. These embodiments will be described separately. In the first and second embodiments, the driving force value in the greater condition when the vehicle starts is increased/decreased based on the vehicle inclination angle when the vehicle stops. In the third embodiment, the increasing rate of the driving force when the driving force is switched to the greater condition when the vehicle starts is increased/decreased based on the vehicle inclination angle vehicle while the vehicle stops. The difference between the first embodiment and the second embodiment is that the time period required for reaching the driving force value in the greater condition from the time the brake pedal is released is constant in the second embodiment, irrespective of the driving force value in the greater condition.

First Embodiment

The first embodiment will be described in detail with reference to FIGS. 1 to 7.

A driving force control unit DCU of the first embodiment is mounted on a vehicle equipped with a driving motor, together with an inclination angle detecting unit that detects the vehicle inclination angle, a braking force retaining unit and a driving motor stopping unit, as will be individually described later. The vehicle inclination angle is detected based on the braking force when the vehicle stops.

Figure 1:
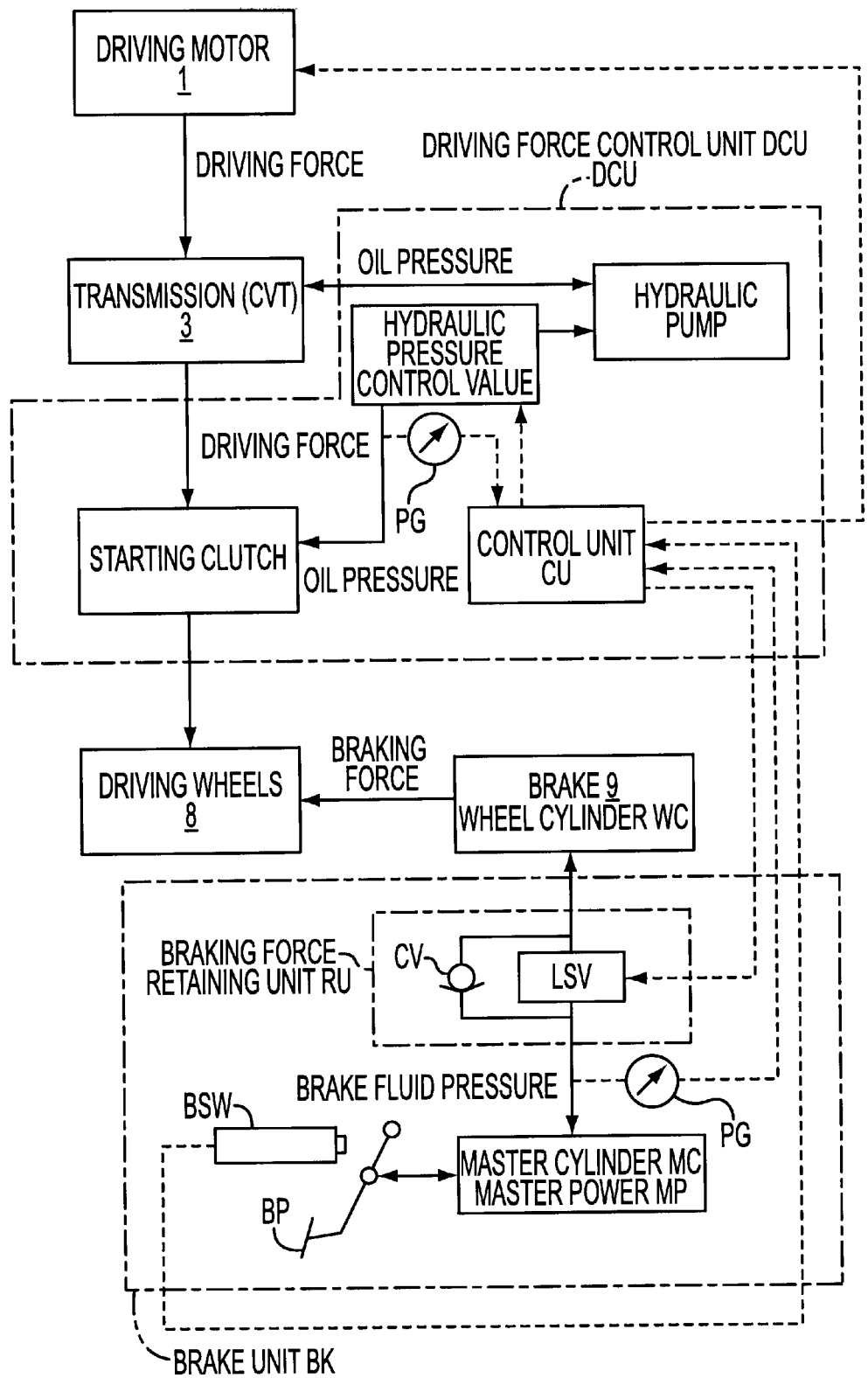
FIG. 1 is a block diagram showing a drive system and a brake system of a vehicle in which a driving force control unit according to a first embodiment of the invention is mounted.

Configuration of the Driving Force Control Unit (FIG. 1)

The driving force control unit DCU in the first embodiment includes a starting clutch and a control unit CU. In response to a control signal from the control unit CU, the driving force control unit DCU sets the driving force (or the creep force) that is generated at a driving motor 1 when idling, and transmitted through a transmission 3, to a "greater condition" (the "strong creep condition") or a "smaller condition" (the "weak creep condition") and transmits it to driving wheels 8. On the other hand, the driving force value in the strong creep condition is variably controlled to a large or small value and transmitted to driving wheels 8. Here, the clutch, as the starting clutch, may be disposed on the input side of transmission 3.

The combination of the driving force control unit DCU and transmission 3 is exemplified by (1) the combination between the starting clutch, as an essential portion of the driving force control unit DCU, and a belt type continuously variable transmission ("CVT"), as transmission 3, (2) the combination between a hydraulic torque converter, as an essential portion of the driving force control unit DCU, and an auxiliary transmission, as transmission 3, and so on. Specifically, in example (2), the driving force control unit DCU includes the hydraulic torque converter and a hydraulic engagement element, such as a hydraulic clutch (or a hydraulic brake) belonging to the auxiliary transmission.

The block diagram of FIG. 1 assumes CVT 3 of example (1). In this Figure, oil pressure supplied from the hydraulic pump to CVT 3 is used to actuate a forward/backward switching clutch (not shown) and a movable pulley (not shown) on the input/output side of CVT 3. In order to establish the strong creep condition and the weak creep condition or to change the driving force value in the strong creep condition, i.e., to optionally change the driving force transmission capacity, in the aforementioned example (1), the starting clutch (or the hydraulic multi-disc clutch) forming an essential portion of the driving force control unit DCU is supplied with pressure oil at a predetermined oil pressure value from the hydraulic pump based on the control signal (or the hydraulic pressure command value) transmitted by the control unit CU. The hydraulic pressure command value is transmitted to a hydraulic control valve (e.g., a servo valve (or a linear solenoid valve)) for controlling the oil pressure value of the starting clutch.

If the oil pressure value supplied from the hydraulic pump to the starting clutch is reduced, the pushing force of the clutch disc (or the driving force transmission capacity (or the engagement force)) is weakened to establish the weak creep condition of a small driving force. On the other hand, if the oil pressure value is enlarged, the pushing force of the clutch disc is enlarged to establish the strong creep condition of a large driving force.

In example (2), on the other hand, in order to establish the strong creep condition and the weak creep condition, or to change the driving force value in the strong creep condition, pressure oil at a predetermined oil pressure value is supplied from the hydraulic pump to the hydraulic clutch, belonging to the auxiliary transmission which forms one essential portion of the driving force control unit DCU, based on the hydraulic pressure command value transmitted by the control unit CU.

Whether or not the driving force is at a proper value in each condition can be determined based on the speed ratio between the input side and the output side of the starting clutch (e.g., the hydraulic clutch belonging to the auxiliary transmission in example (2)). If it is determined that the driving force is larger than the proper value, the driving force can be controlled to the proper magnitude by reducing the oil pressure value to be supplied from the hydraulic pump to the starting clutch.

Configuration of Brake Unit (FIG. 1)

A brake unit BK is a hydraulically operable brake unit. As the driver depresses a brake pedal BP, the depressing force is boosted by a master power MP and is converted at a master cylinder MC into brake fluid pressure. This brake fluid pressure is transmitted to a wheel cylinder WC mounted in a brake 9 so that it is re-converted into a mechanical force. This mechanical force becomes a braking force for braking driving wheels 8.

Whether the brake pedal BP is depressed or released is detected by a brake switch BSW. The brake fluid pressure is detected by a brake fluid pressure gauge PG. The detected values of the bake switch BSW and the brake fluid pressure value, detected by the brake fluid pressure gauge, are transmitted to the control unit CU.

This brake unit BK will be described in more detail in the other embodiments.

Configuration of Braking Force Retaining Unit (FIG. 1)

A braking force retaining unit RU is disposed in a liquid pressure passage between the master cylinder MC and the wheel cylinders WC of the brake unit BK and includes the control unit CU. The braking force retaining unit RU also includes: a servo valve LSV acting as a braking force retaining means that retains the braking force on the vehicle after the brake pedal BP is released; and a check valve CV disposed in a bypass passage bypassing the servo valve LSV.

This braking force retaining unit RU is intended to facilitate an uphill start on a slope by retaining brake fluid pressure (i.e., the braking force) in the wheel cylinders WC even after the brake pedal BP is released.

The servo valve LSV is activated by a control current from the control unit CU and switches between a shut-off position that shuts off a flow of the brake oil and a communicating position that permits a flow of brake fluid. (1) The servo valve LSV shuts off a flow of brake fluid all at once, when it is switched to the shut-off position, to retain brake fluid pressure applied to the wheel cylinders WC, as a braking force. As long as the servo valve LSV is in the shut-off position, the braking force is continuously retained at a constant value. (2) The servo valve LSV allows a flow of brake fluid all at once, when it is switched to the communicating position, to release the braking force. As long as the servo valve LSV is in the communicating position, the braking force is not retained after the brake pedal BP. (3) The retained braking force can be gradually released by changing the control current to the servo valve LSV.

The servo valve LSV is opened and closed such that the sum (the "biasing force or the like") of the biasing force of a built-in spring (not shown) and the product of a pilot pressure applied to the valve and the pressure receiving area of the valve balances with the electromagnetic force generated by a built-in solenoid oil (not shown). The servo valve LSV of a normally open type will be opened to the communicating position if the biasing force, or the like, exceeds the electromagnetic force. This communicating position continues until a condition such as "the electromagnetic force is >than the biasing force," or the like, is satisfied. If the biasing force, or the like, is smaller than the electromagnetic force, on the other hand, the valve is closed to the shut-off position. This shut-off position is continued until a condition such as "the electromagnetic force is <than the biasing force," or the like, is satisfied. The pilot pressure is brake fluid pressure on the side of the wheel cylinders WC across from the servo valve LSV.

The electromagnetic force of the servo valve LSV can be changed by changing the current value of the control current supplied to the solenoid coil. When the servo valve LSV is a normally open type, electromagnetic force is gradually weakened by lowering the current value gradually from the shut-off position of the maximum current value, so that the brake fluid pressure retained in the wheel cylinders WC can be gradually lowered by turning the valve ON/OFF (or the communicating position/the shut-off position) with a balance between the biasing force, or the like, and the electromagnetic force. In short, the braking force that acts on the vehicle can be gradually lowered (or gradually released). By reducing the current value of the control current all at once, on the other hand, the braking force can be released all at once.

The normally open type servo valve assumes the communicating position when the current value supplied to the solenoid coil is zero (or small). The servo valve LSV of this embodiment is a normally open type (so as to shut off the passage of the brake fluid at all times when the power supply is interrupted by trouble, or the like).

By shutting off a flow of brake fluid with the servo valve LSV, brake fluid pressure can be retained (that is, braking force can be retained) to prevent unintentional backward displacement of the vehicle, even if the driver releases the brake pedal BP when starting on an up slope. By releasing the braking force gradually with the servo valve LSV, on the other hand, a smooth start can be made on an up slope because of the harmony between the gradually rising driving force and the gradually lowering braking force.

The rate or pattern of gradually releasing the braking force may vary optionally by the lowering rate or pattern of the current value of the control current to be input from the control unit CU to the servo valve LSV.

The check valve CV functions to transmit brake fluid pressure, as generated in the master cylinder MC, to the wheel cylinders WC when the servo valve LSV is in the shut-off position and when the driver additionally depresses the brake pedal BP. The check valve CV effectively acts, when the brake fluid pressure in the master cylinder MC exceeds that of the wheel cylinders WC, to raise the brake fluid pressure of the wheel cylinders WC quickly in response to the driver's additional depression of the brake pedal BP. As a result, the braking force can be increased even if the servo valve LSV is in the shut-off position.

With the construction in which the once-closed servo valve LSV assumes the communicating position when the brake fluid pressure of the master cylinder MC exceeds that of the wheel cylinders WC, the additional depression of the brake pedal BP can be handled solely by the servo valve LSV so that the check valve CV does not need to be provided. In other words, the check valve CV can be eliminated by a construction in which the brake fluid pressure value on the side of the master cylinder MC and the brake liquid pressure value on the side of the wheel cylinders WC are detected so that the servo valve LSV may assume the communicating position when the former brake liquid pressure value exceeds the latter.

In the present embodiment, the braking force retaining unit RU does not need to be especially equipped with any relief valve. This is because the function of the relief valve can be performed by controlling the current value of the control current to be supplied to the solenoid coil of the servo valve LSV when the brake pedal BP is released.

The brake switch BSW detects whether the brake pedal BP is depressed (ON) or not (OFF). Based on this detected value, the control unit CU instructs the switching between the communicating/shut-off position of the servo valve LSV. The braking force retaining unit RU of this embodiment is provided with a timer mechanism (corresponding to a creep rising timer, as identified in the examples) which can release the retained braking force all at once when the servo valve LSV is completely switched to the communicating position a predetermined time after the brake pedal BP was released (to turn OFF the brake switch BSW).

Configuration of Inclination Angle Detecting Unit (FIG. 1)

The unit for detecting the vehicle inclination angle (i.e., inclination angle of a place where the vehicle stops) can be exemplified by a well-known inclination meter if it can detect the longitudinal inclination angle of the vehicle being stopped. If the vehicle is provided with an acceleration sensor, on the other hand, the inclination angle can be detected based on the detected value of the acceleration sensor.

The inclination angle detecting unit of this embodiment detects the vehicle inclination angle in terms of the braking force based on the brake pedal BP depression when the vehicle stops. Between the braking force and the vehicle inclination angle when the vehicle stops, more specifically, there is a constant relation in which the braking force becomes larger when the inclination angle of the place where the vehicle stops is steeper and smaller when the inclination angle is less steep. Therefore, by detecting the braking force when the vehicle stops, it is possible to detect the vehicle inclination angle, i.e., the longitudinal inclination angle of the place where the vehicle stops.

The vehicle inclination angle detecting unit, based on the braking force, can be constructed, as shown in FIG. 1, of a brake fluid pressure gauge PG disposed in the hydraulic pressure passage between the master cylinder MC and the wheel cylinders WC, and the control unit CU. The brake fluid pressure (or the braking force), as metered by the brake fluid pressure gauge PG, is converted as the brake fluid pressure value into electric signals and input to the control unit CU so that the control unit CU detects the vehicle inclination angle.

When the vehicle inclination angle is to be detected based on the braking force, it can be determined based on the braking force at the instant when the vehicle speed becomes 0 km/h. But it may not always be proper to be determined from the braking force when the vehicle speed becomes 0 km/h. For example, the vehicle may stop (reach a vehicle speed of 0 km/h) on an up slope when the brake pedal BP is not depressed at all or only weakly depressed. In order to prevent the backward displacement of the vehicle after the stop, moreover, the brake pedal BP is depressed or additionally depressed.

Therefore, the braking force for detecting the vehicle inclination angle is suitably exemplified either by the average value or the maximum value of the brake fluid pressure (or the braking force), as detected by the brake fluid pressure gauge PG for a time period beginning from the instant the vehicle speed becomes 0 km/h to the loosening or complete release of the brake pedal BP, or by the brake fluid pressure value at the instant when the brake pedal depression starts. In this embodiment, the vehicle inclination angle is detected by exemplifying the braking force by the maximum of the brake fluid pressure value from the instant the vehicle speed becomes 0 km/h to the time when the brake pedal BP is released. The control unit CU, to which the brake fluid pressure value is input from the brake fluid pressure gauge PG, is provided with a maximum detecting means for determining the maximum of the brake fluid pressure value from the time the vehicle speed becomes 0 km/h to the time the brake pedal BP is released. This brake fluid pressure gauge PG is properly disposed on the side of the master cylinder MC across from the servo valve LSV. This is because the brake fluid pressure gauge PG can more directly detect the braking force intended by the driver.

Configuration of the Driving Motor Stopping Unit

The driving motor stopping unit includes the control unit CU and a starter, and stops the engine or driving motor 1 automatically under a predetermined condition, such as the vehicle stopping, and starts the automatically stopped engine automatically under a predetermined condition, such as the brake pedal BP being released. The stopping of driving motor 1 is intended to improve fuel consumption and reduce exhaust emissions.

Other Configuration (FIG. 1)

The driving force is switched by the driving force control unit DCU based on the vehicle speed, depression/release of the accelerator pedal and the driving range position of the transmission. Therefore, the vehicle is provided with at least a means for detecting the state of the vehicle, including a speed meter that detects the vehicle speed, a throttle switch that detects the accelerator pedal depression and a position switch that detects the transmission range position.

In this first embodiment, the driving force control unit DCU changes the driving force value in the strong creep condition based on the braking force. This control to change the driving force value in the strong creep condition based on the braking force is made by providing the control unit CU with a table containing a relationship between the braking force and the oil pressure value to be supplied to the starting clutch. For example, such that (1) the brake fluid pressure value (or the braking force), as detected by the brake fluid pressure gauge PG, when the vehicle stops is input to the control unit CU; (2) the control unit CU inputs the oil pressure command value based on the braking force to the hydraulic control valve based on the aforementioned table; and (3) the oil pressure value, based on the oil pressure command value, is supplied to the starting clutch (that is, the control unit CU inputs the brake fluid pressure value and outputs the oil pressure command value based on the table).

The brake fluid pressure value (or the braking force), as defined herein, is the maximum value from the instant the vehicle speed becomes 0 km/h to the time when the brake pedal BP is released.

Next, the operations/controls of the individual units of the first embodiment will be described.

Basic Controls of the Driving Force Control Unit for Driving

The basic controls of the driving force control unit DCU for driving will be described as follows.

The driving force control unit DCU transmits the driving force from driving motor 1 to driving wheels 8 when transmission 3 is set in the driving range even in a condition below a predetermined or lower vehicle speed and with the accelerator pedal released, and sets the driving force to be transmitted to driving wheels 8 to the weak creep condition if the brake pedal BP is depressed, but to the strong creep condition if the brake pedal BP is not depressed. From the signal of the brake switch BSW, the control unit CU determines whether or not the brake pedal BP is depressed.

The reason why the driving force is set in the weak creep condition when the brake pedal BP is depressed is to prevent vibrations when the vehicle stops. This weak creep condition is maintained while the vehicle is stopped. The weak creep condition includes the state in which driving force is zero, that is, the condition in which driving motor 1 stops and the state in which the driving force transmission capacity by the driving force control unit DCU is set to zero. Here, the driving force is set in the weak creep condition in order to reduce the load on engine 1 and to reduce the load on the hydraulic pump of the starting clutch, thereby reducing fuel consumption.

On the other hand, the reason the driving force is set in the strong creep condition when the brake pedal BP is released is to prepare for the start or acceleration of the vehicle and create resistance on a slope to some extent, without resorting to the braking force.

In the first embodiment, when the accelerator pedal is depressed and when the transmission 3 is set in the driving range, the driving force control unit DCU further strengthens the pushing force of the clutch disc of the starting clutch, irrespective of the state of the brake pedal BP depression, (i.e., further enlarges the driving force transmission capacity) to set the driving force in the "greater condition or more" (or the "strong creep condition or more"). In this situation, there is little or no slippage of the clutch disc in the starting clutch.

One example of the basic controls of the driving force control unit DCU for driving will be described with reference to the flow chart of FIG. 2. In the flow chart of FIG. 2, the driving range of transmission 3 is detected and determined (at J1). Unless transmission 3 is in the driving range, the driving force is not transmitted to the driving wheels 8 (that is, the driving force is zero). If transmission 3 is in the driving range, on the other hand, the accelerator pedal depression is detected and determined (at J2). With this depression, the driving force is set to the "strong or greater creep condition". Without the accelerator pedal depression, on the other hand, the vehicle speed is detected and determined (at J3). If the vehicle speed is not at a predetermined or lower speed (e.g., 5 km/h or less), the driving force is set to the "strong or greater creep condition". If the vehicle speed is at a predetermined value or less, moreover, the brake pedal BP depression is detected and determined (at J4). If the brake pedal BP is not depressed, the driving force is set to the "strong creep condition". If the brake pedal BP is depressed, the driving force is set to the "weak creep condition".

Controls of Driving Force Value in Strong Creep Condition

Figure 3:
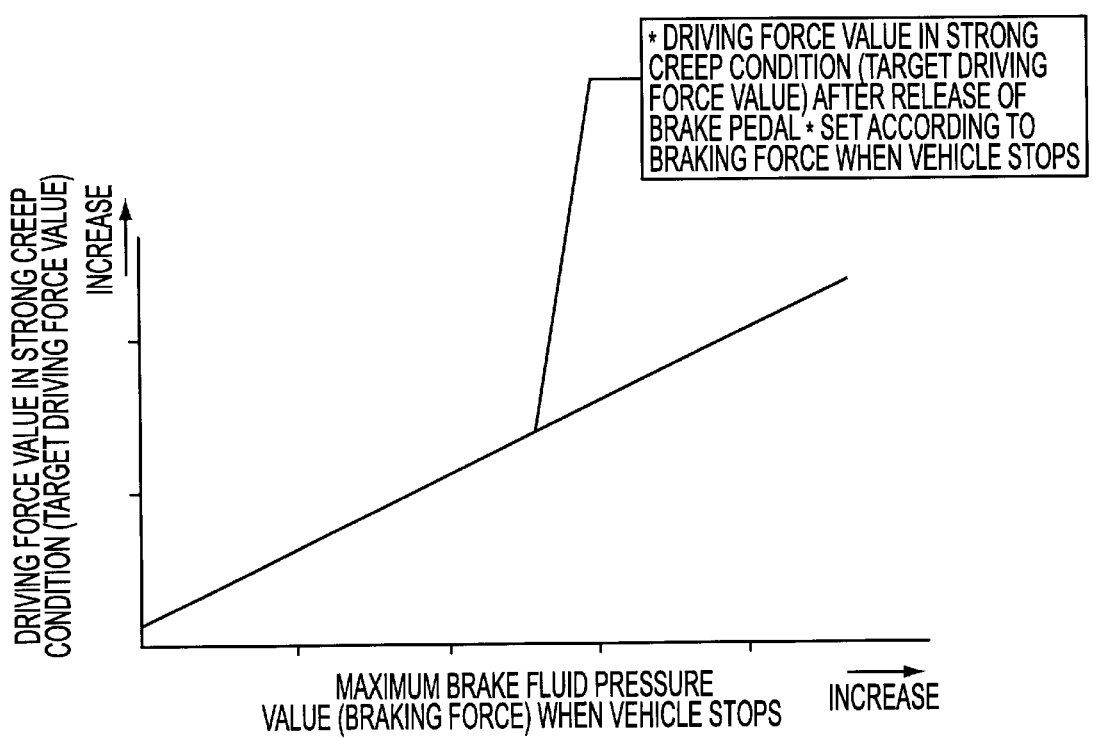
FIG. 3 is a diagram illustrating a relation of the driving force control unit according to the first embodiment of the invention between the braking force when a vehicle stops and a driving force value (or a target driving force value) in a strong creep condition.

The driving force control unit DCU of the first embodiment increases the driving force value in the strong creep condition, which is established when the brake pedal BP depression when the vehicle stops is released so that the driving force is switched from the weak creep condition to the strong creep condition, based on the vehicle inclination angle (or the braking force) when the vehicle stops. In other words, the driving force control unit DCU increases, when the vehicle starts, driving force in the weak creep condition to the driving force value in the strong creep condition (i.e., the target driving force value, as shown in FIG. 3) in the strong creep condition, as set by the braking force (or the maximum brake fluid pressure value) when the vehicle stops. The target driving force value may be set such that the vehicle can start smoothly on a flat road by releasing the brake pedal BP and is prevented from backward displacing on an up slope.

Here, the relation of FIG. 3 between the maximum brake fluid pressure value when the vehicle stops and the driving force value (or the target driving force value) in the strong creep condition corresponds to the table which is provided in the aforementioned control unit CU.

The reason the driving force value in the strong creep condition is controlled when the vehicle starts is based on the braking force when the vehicle stops is to allow for a smooth vehicle start such that the vehicle neither displaces backwards on an up slope nor moves forward abruptly on a flat road or on a down slope. When the vehicle inclination angle is to be detected in terms of the braking force, the driving force value in the strong creep condition may be set higher even on a down slope.

In the case of a down slope, however, the driver does not release the brake pedal BP gradually except in the situation of an intentional abrupt start, for the following reasons. Specifically, (1) Because of human nature, the driver does not release the brake pedal BP depression all at once (that is, the driver releases the brake pedal BP more gently on a steeper down slope). (2) The driver acquires from life experiences that a vehicle will be started on the down slope by the forward force of the vehicle's own weight (which is proportional to the gradient of the down slope). This point is different from that of an up slope on which the brake pedal BP depression is (or has to be) released to depress the accelerator pedal.

On a steep down slope, therefore, the driver leaves his foot on the brake pedal BP as long as he likes and releases the brake pedal BP depression only gradually. Before the brake switch BSW is turned OFF (i.e., before the switching from the weak creep condition to the strong creep condition, as shown in FIG. 2), therefore, a situation arises in which the vehicle moves forward by the forward force of its own weight. At the start of this situation, the brake switch BSW is ON to keep the state in which the driving force is small. At the same time, the driver places his foot on the brake pedal BP so that he is able to adjust the braking force easily by additionally depressing the brake pedal BP. Here, the driving force in the strong creep condition cannot exceed that generated by the idling of driving motor 1, but is restricted by its upper limit, and the idling per se is suppressed below a low speed to reduce fuel consumption.

No matter whether the slope might be upward or downward, therefore, no problems arise even if the driving force value in the strong creep condition after the brake pedal BP release is increased/decreased based on the braking force when the vehicle stops.

Thus, no problems arise even if the driving force value in the strong creep condition might be increased/decreased based on the braking force when the vehicle stops, irrespective of being on an up slope or down slope. When not only an up slope/down slope can be discriminated, when the vehicle inclination angle is detected by the inclination meter or the acceleration sensor, however, the driving force value in the strong creep condition can be increased/decreased only on an up slope based on the vehicle inclination angle.

Operations of the Inclination Angle Metering Unit

Next, the operations of an inclination angle metering unit will be described.

The inclination angle metering unit meters the brake fluid pressure value continuously when the vehicle stops (at the vehicle speed of 0 km/h) to detect the vehicle inclination angle based on the maximum brake fluid pressure value.

Operations of the Braking Force Retaining Unit

Next, the operations of the braking force retaining unit RU will be described.

(1) Under the condition where the brake pedal BP is depressed when the vehicle stops (at the vehicle speed of 0 km/h), the braking force retaining unit RU retains the braking force by switching the servo valve LSV to the shut-off position to shut off the return of brake fluid from the wheel cylinders WC to the master cylinder MC.

(2) As to the retained braking force, the servo valve LSV at the shut-off position keeps the braking force constant for the time period beginning from the loosening of the brake pedal BP depression to the time the brake switch BSW turns off.

(3) When the brake pedal BP depression is completely released to turn OFF the brake switch BSW, the control current to be supplied to the servo valve LSV is gradually reduced to gradually release the retaining braking force. By releasing the braking force gradually, the vehicle can be started smoothly because of the harmony between the rising driving force and the gradually lowering braking force.

(4) After a predetermined time after the brake switch BSW is turned OFF, the supply of the control current to the servo valve LSV is interrupted to bring the servo valve LSV into a completely communicating position. As a result, the braking force is eliminated all at once to eliminate brake dragging.

Controls of the Driving Motor Stopping Unit

Next, the controls of the driving motor stopping unit will be described.

(1) Under the condition when the brake pedal BP is depressed when the vehicle stops (at the vehicle speed of 0 km/h), the driving motor stopping unit stops the engine or driving motor 1 automatically. This is done because no driving force is required when the vehicle stops. Therefore, fuel consumption is improved by stopping the engine automatically.

(2) The engine that has been automatically stopped is automatically started when the brake pedal BP depression is released (or the brake switch BSW is OFF). The engine is automatically started because it is assumed that by releasing the brake pedal BP, the driver intends to start the vehicle. This also reminds the driver not to exit the vehicle without turning off the ignition switch.

Flow Chart of Controls

One example of the controls of the first embodiment from stopping to starting the vehicle will be described with reference to the flow charts of FIGS. 4 and 5. Here, it is assumed that the driving force when the vehicle stops is in the weak creep condition, that the transmission is set in the driving range and that the accelerator pedal is not depressed. It is further assumed that the brake switch BSW is turned ON when the brake pedal BP is depressed, but OFF when not depressed.

Figure 4:
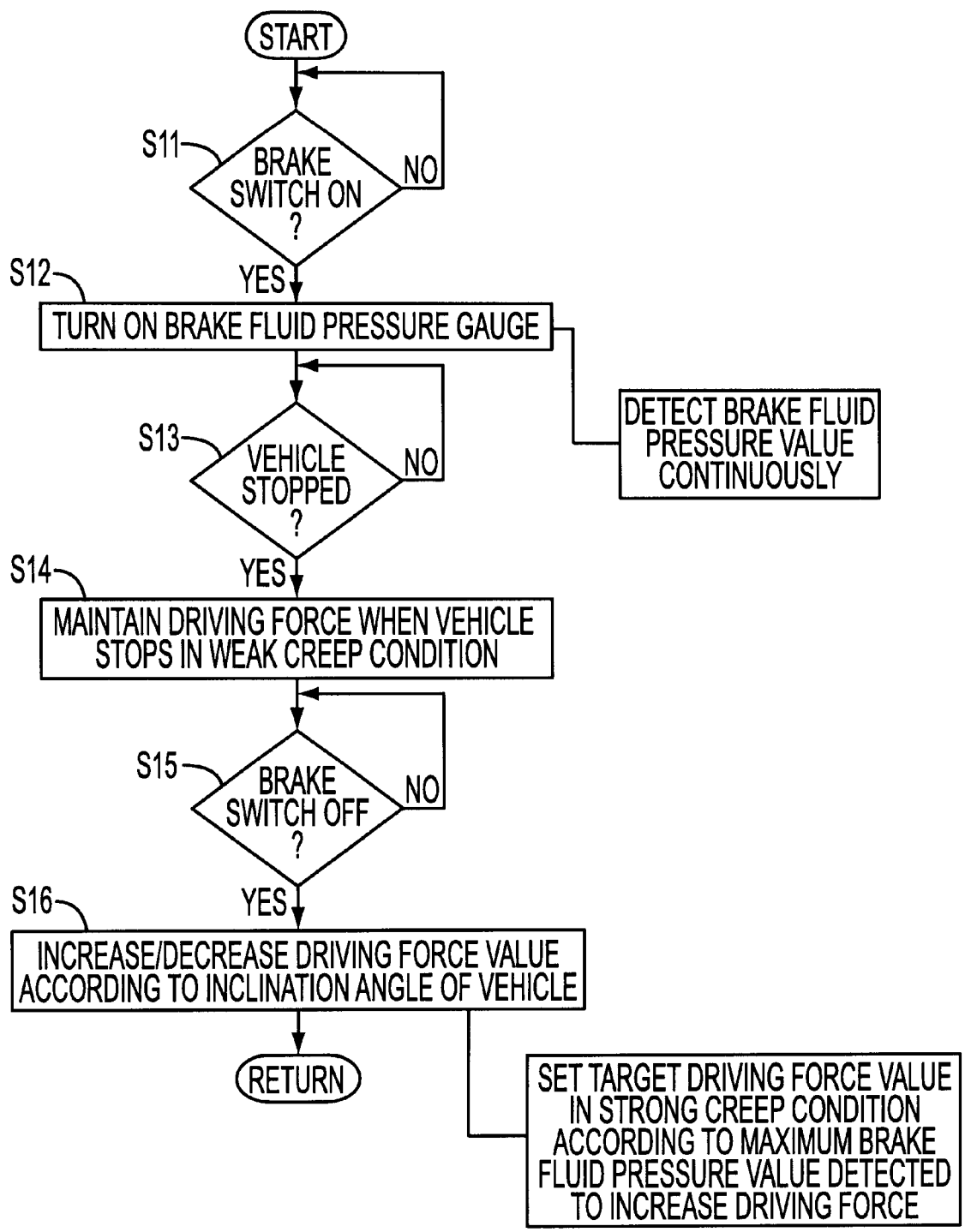
FIG. 4 is a flow chart (only for the control of the driving force value) showing a control example starting at the time when the vehicle stops. Here, the vehicle is provided with the driving force control unit according to the first embodiment of the invention.

FIG. 4 is a flow chart for controlling only the driving force. FIG. 5 is a flow chart for retaining the braking force and for stopping driving motor 1 automatically when the vehicle stops.

(1) Controlling Only the Driving Force

In the flow chart of FIG. 4, the state of the brake switch BSW by the brake pedal BP depression is detected and determined (at S11). If the brake switch BSW is not ON, the controls wait for the brake switch BSW to turn on. When the brake switch BSW is turned ON, the brake fluid pressure gauge PG (FIG. 1) is turned ON (at S12), and the brake fluid pressure is continuously detected so that the brake fluid pressure value, as converted into electric signals, is transmitted to the control unit CU. When the brake switch BSW is ON so that the vehicle speed becomes a predetermined or lower vehicle speed, the driving force is switched (as shown in FIG. 2) to the weak creep condition. When it is determined (at S13) that the vehicle has stopped, the weak creep condition is maintained (at S14). Here, the weak creep condition occurs in a situation in which the driving force is reduced to zero.

The controls then wait (at S15) for the brake switch BSW to be turned OFF by releasing the brake pedal BP depression when the vehicle stops. Based on the braking force when the vehicle stops (i.e., the maximum brake fluid pressure value when the vehicle stops), i.e., based on the vehicle inclination angle, the driving force value (or the target driving force value) in the strong creep condition after the brake pedal BP is released is set to increase the driving force (at S16).

(2) Retaining Braking Force and Stopping Driving Motor Automatically

Figure 5:
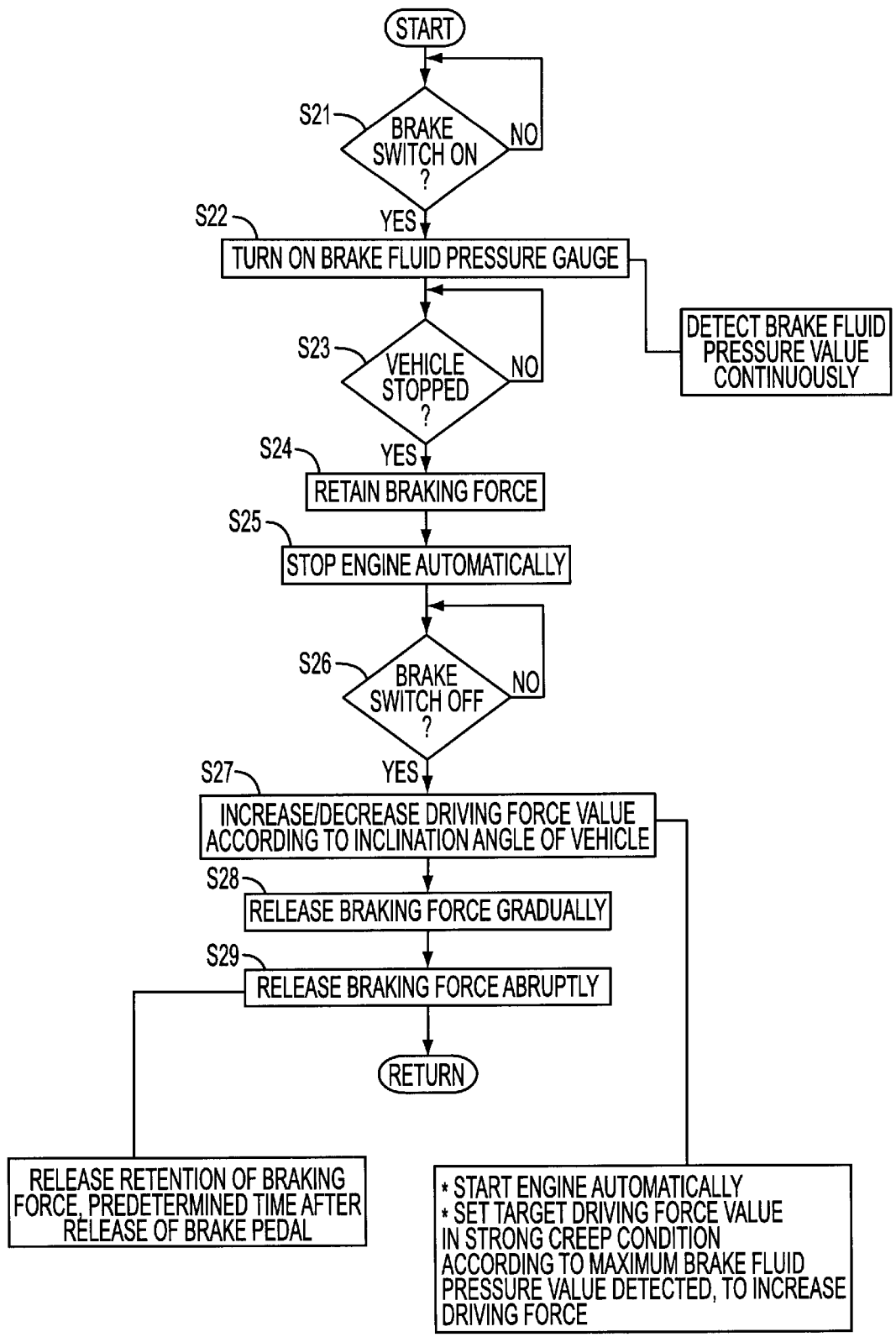
FIG. 5 is a flow chart (for the control of the driving force value and for retaining the braking force and automatically stopping the driving motor) showing a control example starting at the time when the vehicle stops. Here, the vehicle is provided with the driving force control unit according to the first embodiment of the invention.

In the flow chart of FIG. 5, the state of the brake switch BSW by the brake pedal BP depression is detected and determined (at S21). If the brake switch BSW is not ON, the controls wait for the brake switch BSW to turn on. When the brake switch BSW is turned ON, the brake fluid pressure gauge PG (FIG. 1) is turned ON (at S22), and the brake fluid pressure is continuously detected so that the brake fluid pressure value, as converted into electric signals, is transmitted to the control unit CU. When the brake switch BSW is ON so that the vehicle speed becomes a predetermined or lower vehicle speed, the driving force is switched (as shown in FIG. 2) to the weak creep condition. When it is determined (at S23) that the vehicle has stopped, the braking force retaining unit RU is actuated to retain the braking force (at S24). Simultaneously, driving motor 1 is automatically stopped (at S25) by the driving motor stopping unit to reduce the driving force to zero.

The controls then wait (at S26) for the brake switch BSW to be turned OFF by releasing the brake pedal BP depression when the vehicle stops. Based on the braking force when the vehicle stops (i.e., the maximum brake fluid pressure value when the vehicle stops), i.e., based on the vehicle inclination angle, the driving force value (or the target driving force value) in the strong creep condition after the brake pedal BP is released is set to increase the driving force (at S27). Simultaneously, the braking force begins to be gradually released (at S28) by the braking force retaining unit RU and is released all at once (at S29) after a predetermined time to eliminate the useless brake dragging.

Control Time Chart

The operations of the driving force control unit DCU of the first embodiment will be described with reference to the control time charts of FIGS. 6 and 7. (In FIGS. 6 and 7, a thick solid line indicates the braking force, and a solid dotted line indicates the driving force.). FIG. 6 is a control time chart of the situation in which the braking force is not retained when the vehicle stops, and FIG. 7 is a control time chart of the situation in which the braking force is retained when the vehicle stops and in which the driving motor is automatically stopped.

(1) Retaining no Braking Force

Three situations will be described separately based on the magnitude of the braking force when the vehicle stops.

The configurations of the vehicle and the driving force control unit DCU are those shown in FIG. 1, and the vehicle inclination angle is detected based on the braking force. On the other hand, the driving force control unit DCU switches the driving force, when the brake pedal BP is depressed at a predetermined or lower vehicle speed, as illustrated in FIGS. 2 and 4, into the weak creep condition, while maintaining the weak creep condition when the brake pedal BP is depressed even when the vehicle stops, and increases the driving force to the driving force value (or the target driving force value) in the strong creep condition based on the braking force when the brake pedal BP depression is released (or the brake switch is OFF) when the vehicle starts.

However, the braking force is neither retained when the vehicle stops nor is the driving motor automatically stopped.

Figure 6A:
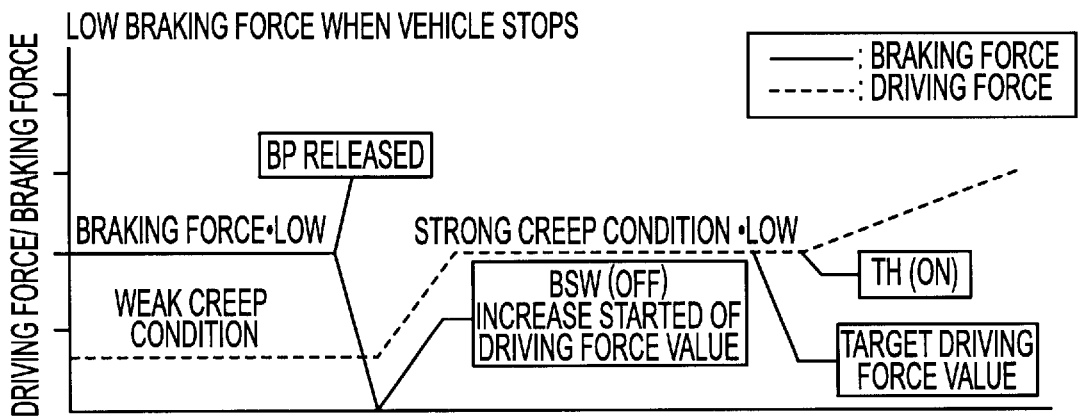
FIG. 6 shows control time charts of the vehicle for the controls shown in FIG. 4 from the time when the vehicle stops to the time when the vehicle starts. Here, FIG. 6A corresponds to a situation in which the braking force is small when the vehicle stops, FIG. 6B corresponds to a situation in which the braking force is in the middle when the vehicle stops is in the middle, and FIG. 6C corresponds to a situation in which the braking force is large when the vehicle stops, respectively.

(1) Small Braking Force When the Vehicle Stops (FIG. 6A)

This control time chart is for a situation in which a vehicle starts on a flat road. The vehicle stops on a flat road, therefore, a weak braking force is sufficient for maintaining the stopped state. As illustrated in FIG. 6A, therefore, the braking force is small when the vehicle stops. In other words, the driver stops the vehicle by depressing the brake pedal BP weakly.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition to increase the driving force value in the strong creep condition to the target driving force value set at a small value based on the braking force, so that the vehicle starts smoothly. With the accelerator pedal depressed (TH (ON)), the driving force is increased to accelerate the vehicle.

Figure 6B:
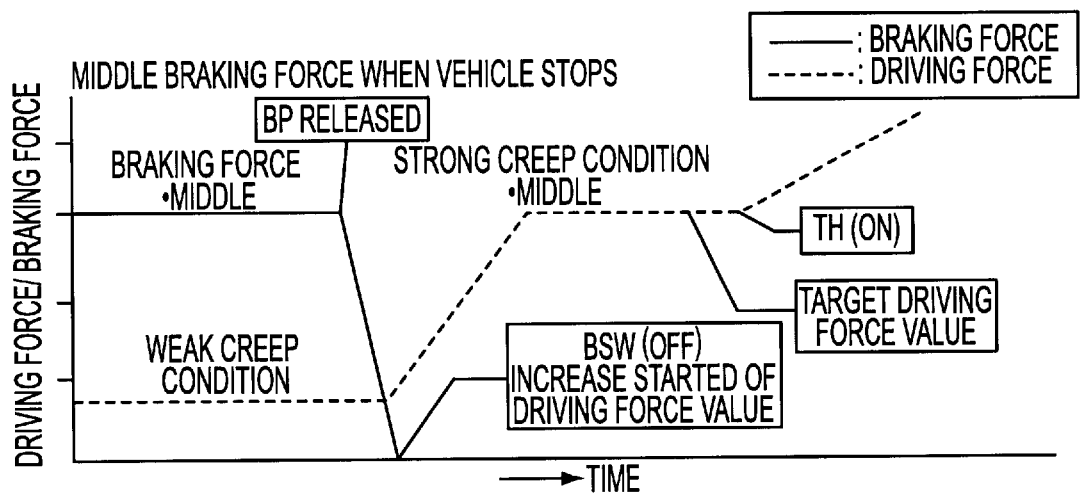

(2) Middle Braking Force When the Vehicle Stops (FIG. 6B)

This control time chart is for a situation in which a vehicle starts on a non-steep up slope. The vehicle stops on the non-steep up slope, therefore, a strong braking force is not required for maintaining the stopped state. As illustrated in FIG. 6B, therefore, the braking force is in the middle when the vehicle stops time. In other words, the driver stops the vehicle by depressing the brake pedal BP moderately.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition to increase the driving force value in the strong creep condition to the target driving force value set at a middle value based on the braking force, so that the vehicle starts smoothly. With the accelerator pedal depressed (TH (ON)), the driving force is increased to accelerate the vehicle.

Figure 6C:
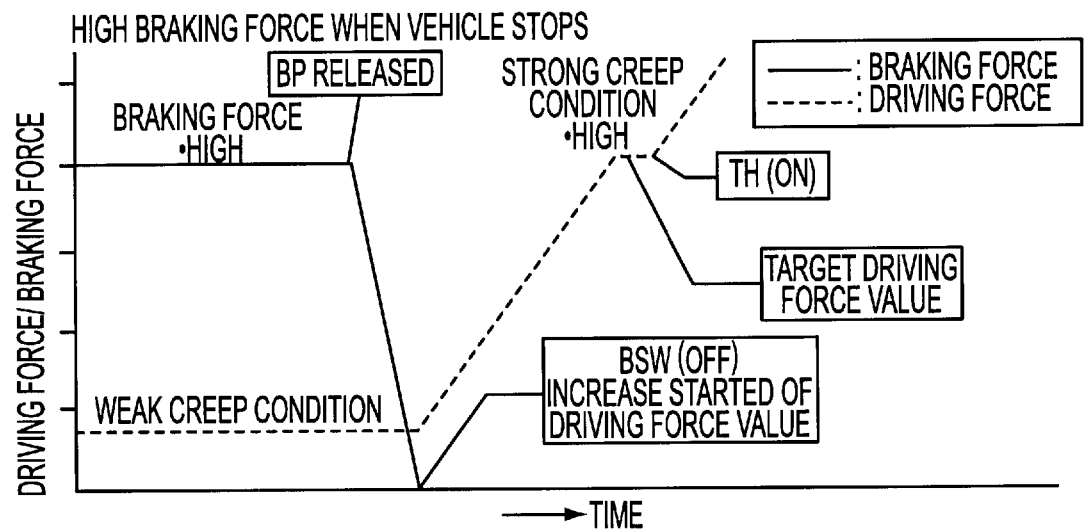

(3) Large Braking Force When the Vehicle Stops (FIG. 6C)

This control time chart is for a situation in which a vehicle starts on a steep up slope. The vehicle stops on the steep up slope, therefore, a strong braking force is not required for maintaining the stopped state. As illustrated in FIG. 6C, therefore, the braking force is large when the vehicle stops. In other words, the driver stops the vehicle by depressing the brake pedal BP strongly.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition to increase the driving force value in the strong creep condition to the target driving force value set at a large value based on the braking force, so that the vehicle starts smoothly. With the accelerator pedal depressed (TH (ON)), the driving force is increased to accelerate the vehicle.

Here, the driving force control unit DCU starts the increase in the driving force value at the instant the brake pedal BP depression is released (i.e., at the instant the braking force disappears). On an up slope, therefore, it is unlikely that the vehicle will displace backwards before the driving force value grows sufficiently large (to the target driving force value). Even if the braking force disappears, however, the vehicle is subject to inertial force and the rolling resistance of driving wheels 8, therefore, no problems arise even if the driving force begins to increase even after the braking force disappears. Alternatively, the driving force when the vehicle stops may be reduced to zero.

Here, the time period from the release (BSW (OFF)) of the brake pedal BP depression to the start (TH (ON)) of the accelerator pedal depression becomes shorter at a larger vehicle inclination angle, as illustrated in FIGS. 6A to 6C.

(2) Retaining Braking Force and Stopping Driving Motor Automatically

Three situations will be described separately based on the magnitude of the braking force when the vehicle stops.

Figure 7A:
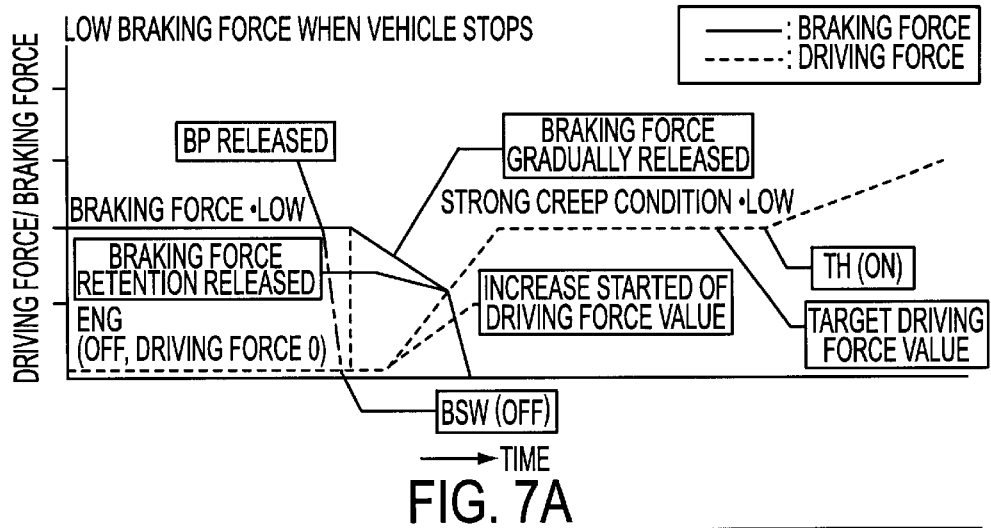
FIG. 7A corresponds to a situation in which the braking force is small when the vehicle stops, FIG. 7B corresponds to a situation in which the braking force is in the middle when the vehicle stops, and FIG. 7C corresponds to a situation in which the braking force is large when the vehicle stops, respectively.
Figure 7B:
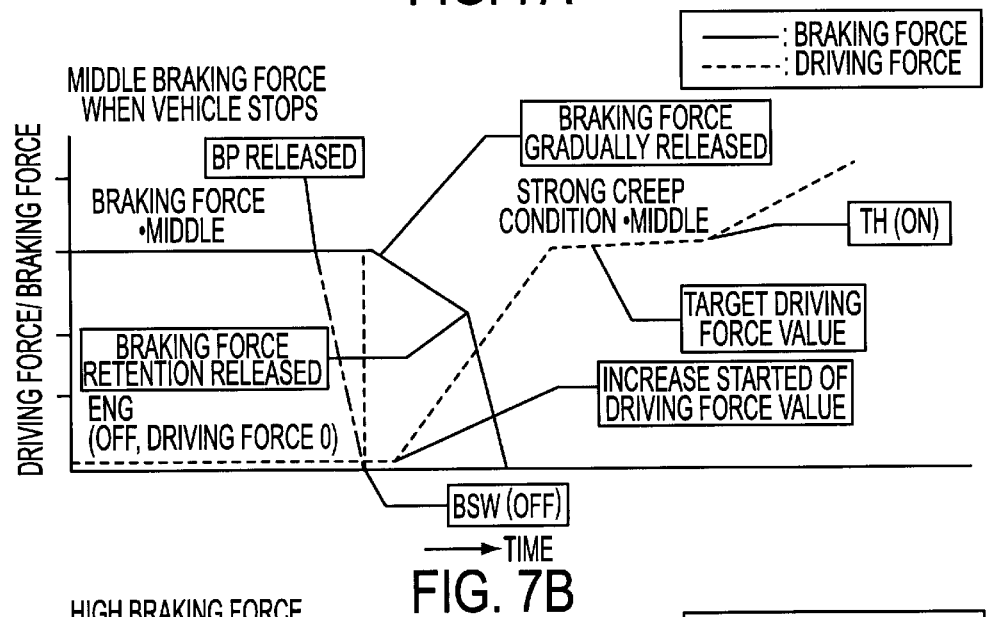
FIG. 7 shows vehicle control time charts for the controls shown in FIG. 5 from the time when vehicle stops to the time when the vehicle starts.
Figure 7C:
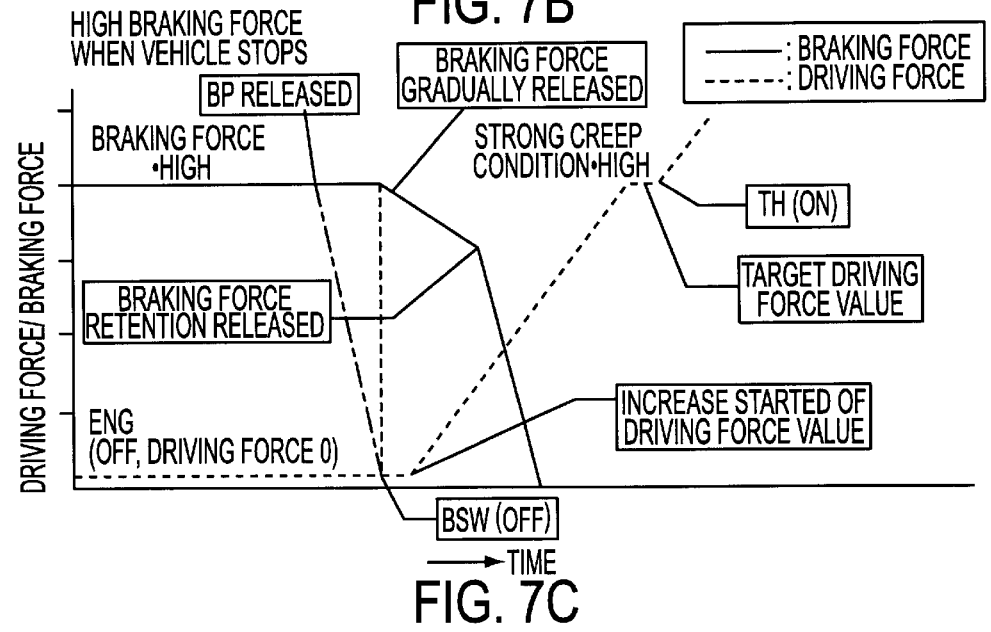

The configurations of the vehicle and the driving force control unit DCU are those shown in FIG. 1, and the vehicle inclination angle is detected based on the braking force. On the other hand, the driving force control unit DCU switches the driving force, when the brake pedal BP is depressed at a predetermined or lower vehicle speed, as illustrated in FIG. 2, into the weak creep condition, and increases the driving force to the driving force value (or the target driving force value) in the strong creep condition based on the braking force when the brake pedal BP depression is released (or the brake switch is OFF) when the vehicle starts. When the brake pedal BP is depressed when the vehicle stops, as illustrated in the flow chart of FIG. 5, the braking force retaining unit RU sets the servo valve LSV in the shut-off position to retain the braking force, and the driving motor stopping unit stops driving motor 1 (or engine) automatically to reduce the driving force to zero. In FIGS. 7A to 7C, a single-dotted line extending obliquely rightward and downward from a point "release the foot from BP" indicates the return of the brake pedal BP after the brake pedal BP is released.

(1) Small Braking Force When the Vehicle Stops (FIG. 7A)

This control time chart is for a situation in which a vehicle starts on a flat road. The vehicle stops on a flat road, therefore, a weak braking force is sufficient for maintaining the stopped state. As illustrated in FIG. 7A, therefore, the braking force is small when the vehicle stops. In other words, the driver stops the vehicle by depressing the brake pedal BP weakly. Here, the driving force is zero, as described before.

In order to start the vehicle from this state, the driver begins to release his foot from the brake pedal BP to release the depression. At this time, braking force is retained. When the depression of the brake pedal BP is released so that the brake switch BSW is turned OFF, the braking force retaining unit RU begins to release the braking force gradually. Simultaneously, the driving motor stopping unit commands the automatically stopped driving motor 1 to start automatically. Then, after a predetermined time lag by the signal communication system and the mechanical system, driving motor 1 is automatically started, and the driving force in the strong creep condition then begins, by the driving force control unit DCU, to rise to the target driving force value which has been set to a small value based on the braking force when the vehicle stops. Here, the braking force retained while being gradually released is released a predetermined time after the brake switch BSW is turned OFF, and the braking force disappears. By these operations, the vehicle starts smoothly. When the accelerator pedal is depressed (TH(ON)), the driving force is increased to accelerate the vehicle.

(2) Middle Braking Force When the Vehicle Stops (FIG. 7B)

This control time chart is for a situation in which a vehicle starts on a non-steep up slope. The vehicle stops on the non-steep up slope, therefore, a strong braking force is not required for maintaining the stopped state. As illustrated in FIG. 7B, therefore, the braking force is in the middle when the vehicle stops. In other words, the driver stops the vehicle by depressing the brake pedal BP moderately. Here, driving motor 1 is automatically stopped so that the driving force is zero.

In order to start the vehicle from this state, the driver begins to release his foot from the brake pedal BP to release the depression. At this time, the braking force is retained. When the depression of the brake pedal BP is released so that the brake switch BSW is turned OFF, the braking force retaining unit RU begins to release the braking force gradually. Simultaneously, the driving motor stopping unit commands the automatically stopped driving motor 1 to start automatically. Then, after a predetermined time lag by the signal communication system and the mechanical system, driving motor 1 is automatically started, and the driving force in the strong creep condition then begins, by the driving force control unit DCU, to rise to the target driving force value which has been set to a middle value based on the braking force when the vehicle stops. Here, the braking force retained while being gradually released is released a predetermined time after the brake switch BSW was turned OFF, and the braking force disappears. By these operations, the vehicle starts smoothly. When the accelerator pedal is depressed (TH (ON)), the driving force is increased to accelerate the vehicle.

(3) Middle Braking Force When Vehicle Stops (FIG. 7C)

This control time chart is for a situation in which a vehicle starts on a steep up slope. The vehicle stops on a steep up slope, therefore, a strong braking force is required for maintaining the stopped state. As illustrated in FIG. 7C, therefore, braking force is strong when the vehicle stops. In other words, the driver stops the vehicle by depressing the brake pedal BP moderately. Here, driving motor 1 is automatically stopped so that the driving force is zero.

In order to start the vehicle from this state, the driver begins to release his foot from the brake pedal BP to release the depression. At this time, the braking force is retained. When the brake pedal BP depression is released so that the brake switch BSW is turned OFF, the braking force retaining unit RU begins to release the braking force gradually. Simultaneously, the driving motor stopping unit commands the automatically stopped driving motor 1 to start automatically. Then, after a predetermined time lag by the signal communication system and the mechanical system, driving motor 1 is automatically started, and the driving force in the strong creep condition then begins, by the driving force control unit DCU, to rise to the target driving force value which has been set to a large value based on the braking force when the vehicle stops. Here, the braking force retained while being gradually released is released a predetermined time after the brake switch BSW is turned OFF, and the braking force disappears. By these operations, the vehicle is prevented from displacing backwards. When the accelerator pedal is depressed (TH (ON)), the driving force is increased to accelerate the vehicle.

As illustrated in FIGS. 7A to 7C, the time period from the release (BSW (OFF)) of the brake pedal BP to the start (TH (ON)) of the accelerator pedal depression is shorter at a larger vehicle inclination angle. In FIGS. 6 and 7, the driving force and the braking force appear linear but cannot always be said to be linear. Especially when driving motor 1 stops, as illustrated in FIG. 7, working oil (or pressure oil) in the oil pressure chamber of the starting clutch may leak. If driving motor 1 is then restarted to begin the pressure oil supply to the starting clutch, the driving force may be abruptly raised by the resistance of the pushing piston of the starting clutch. Therefore, the behavior of the rising portion of the driving force value may be different from that illustrated in FIG. 7.

According to the driving force control unit according to the first embodiment of the invention thus far described, the vehicle can be started smoothly by detecting the vehicle inclination angle (i.e., the gradient of the road where the vehicle stops) based on the braking force when the vehicle stops and by setting the target driving force value in the proper strong creep condition based on the vehicle inclination angle of the vehicle. This first embodiment can be practiced notwithstanding whether or not the braking force is retained, whether or not the braking force is gradually released, or whether or not the engine is stopped automatically. When braking force is to be retained, on the other hand, a means for retaining the braking force should not be limited to the servo valve. Moreover, the braking force control unit has been described to include a means for acting on brake fluid pressure. However, as long as it acts as a braking force, other means may be employed.

Here, the vehicle inclination angle can be detected in terms of the braking force when the vehicle stops or another inclination meter, but could be detected based on the releasing rate of the brake pedal BP depression (the "releasing rate of the brake pedal BP") or the depression changing rate from the brake pedal BP to the accelerator pedal.

For example, the releasing rate of the brake pedal BP has a constant relationship to the vehicle inclination angle at the place where the vehicle stops, as described below:

(1) In order to prevent the vehicle from displacing backwards on an up slope, the driver releases the brake pedal BP depression all at once and depresses the accelerator pedal (i.e., the instantaneous depression change of the pedals);

(2) With no backward displacement of the vehicle on a flat road, the driver releases the brake pedal BP depression more slowly than in (1);

(3) Because a forward force is established on a down slope by the weight of the vehicle, the driver releases the brake pedal BP depression more slowly than in (2). Especially for a steeper down slope, the releasing rate of the brake pedal BP is retarded even more.

Therefore, if the releasing rate of the brake pedal BP is detected, it is possible to determine considerably reliably whether the stopping place is on an up slope or a down slope. Here, the releasing rate of the brake pedal BP may be so coarse as to determine whether it is quick (Yes) or slow (No).

The releasing rate of the brake pedal BP is also related to the driving force which is required of the driver after the brake pedal BP is released. When the driver releases the brake pedal BP quickly on a flat road or a down slope, other than on an up slope, it can be assumed that he desires a quick start by the strong driving force. When the driver releases the brake pedal BP depression quickly on a flat road or down slope, therefore, no problems arise even if the driving force value in the strong creep condition is increased/decreased based on the releasing rate of the brake pedal BP.

Even when the driver depresses the brake pedal BP strongly to stop the vehicle by applying the brake quickly on a flat road or down slope, moreover, it is possible to determine what type of start the driver desires, if the releasing rate of the brake pedal BP is detected when restarting the vehicle. When transmission 3 is set in the reverse gear, the creep force is usually set to the maximum, which could be increased/decreased based on the releasing rate of the brake pedal BP.

The releasing rate of the brake pedal BP can be detected, for example, by metering the reducing rate of the brake fluid pressure value on the side of the master cylinder MC or the brake pedal BP returning rate.

In another construction, the magnitude of the braking force and the releasing rate of the brake pedal BP can be detected when the braking force is to be retained-by the braking force retaining unit RU, and the retention of the braking force can be continued only when the releasing rate of the brake pedal BP is high. This is because it is assumed that the vehicle has stopped on a steep up slope when the releasing rate of the brake pedal BP is high, and the braking force has to be continuously retained.

When the braking force is to be retained by the braking force retaining unit RU, moreover, the operation to release the braking force based on the retained braking force, that is, the time period for the braking force to be gradually released based on the braking force when the vehicle stops, may be increased/decreased. If the braking force is large when the vehicle stops, more specifically, if it is determined that the vehicle inclination angle (or the gradient of the road) is large, the braking force is retained for a long time. With a small braking force, it is determined that the vehicle inclination angle is small, therefore, the braking force is retained for a short time. This release of the braking force based on the retained braking force can be achieved by making the lowering pattern of the current value of the control current to be supplied to the servo valve LSV different based on the braking force. When the retained braking force is large, for example, the current value is reduced for a long time. With this braking force releasing operation, the vehicle can be started smoothly without any backward displacement or an abrupt start.

Second Embodiment

A second embodiment will be described in detail with reference to FIGS. 8 to 10.

Descriptions of members/elements having the same functions/actions as those of the first embodiment will be omitted by designating them by the same reference numerals as those of the first embodiment.

A vehicle having the driving force control unit DCU of this second embodiment mounted thereon is provided with all the devices that are mounted on the vehicle of the first embodiment.

The driving force control unit DCU of the second embodiment operates to make the time period constant from the release of the brake pedal BP depression until the driving force value (or the target driving force value) is reached in the strong creep condition, irrespective of the driving force value. In other words, if the target driving force value is set as in the first embodiment based on the braking force when the vehicle stops, the driving force control unit DCU makes the time period (the "rising time of the driving force") constant for the driving force in the strong creep condition to reach the target driving force value, irrespective of the magnitude of the target driving force value.

Control of Rising Time of Driving Force

In order to make the rising time of the driving force constant, in the second embodiment, the target driving force value is determined (FIG. 3) by the inclination angle metering unit based on the braking force when the vehicle stops, and the control unit CU transmits a predetermined oil pressure command value to the hydraulic control valve to raise the driving force value in the strong creep condition to a target value within a constant time period. In other words, the rising rate of the driving force is decreased when the target driving force value is small, but increased when the target driving force value is large.

Flow Chart of Controls

One example of the controls of the second embodiment from the time the vehicle stops to the time the vehicle starts will be described with reference to the flow charts of FIG. 8. Here, it is assumed that the driving force when the vehicle stops is in the weak creep condition, that the transmission is set in the driving range and that the accelerator pedal is not depressed. It is further assumed that the brake switch BSW is turned ON when the brake pedal BP is depressed, but OFF when not depressed. When the vehicle stops, the braking force is not retained and driving motor 1 is not automatically stopped.

Figure 8:
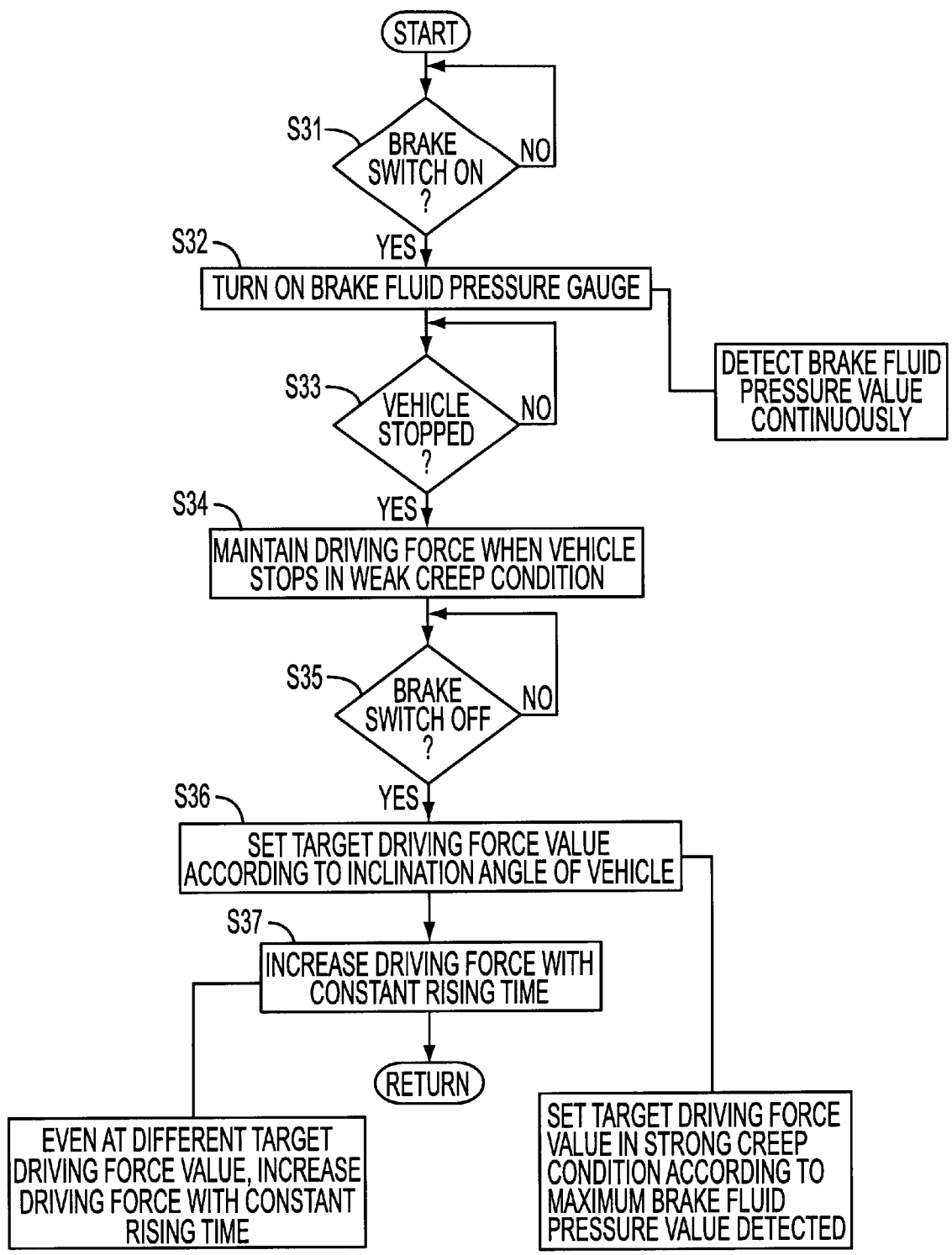
FIG. 8 is a flow chart (only for the control of the driving force value) showing a control example starting at the time when the vehicle stops. Here, the vehicle is provided with a driving force control unit according to a second embodiment of the invention.

In the flow chart of FIG. 8, the state of the brake switch BSW by the brake pedal BP depression is detected and determined (at S31). If the brake switch BSW is not ON, the controls wait for the brake switch BSW to turn ON. When the brake switch BSW is turned ON, the brake fluid pressure gauge PG (FIG. 1) is turned ON (at S32), and the brake fluid pressure is continuously detected so that the brake fluid pressure value, as converted into electric signals, is transmitted to the control unit CU. When the brake switch BSW is ON so that the vehicle speed becomes a predetermined or lower vehicle speed, the driving force is switched (as shown in FIG. 2) to the weak creep condition. When it is determined (at S33) that the vehicle has stopped, the weak creep condition is maintained (at S34). Here, the weak creep condition represents the situation in which the driving force is reduced to zero.

The controls then wait (at S35) for the brake switch BSW to be turned OFF by releasing the brake pedal BP depression when the vehicle stops, and the target driving force value is set (at S36) based on the braking force when the stops. Even if this target driving force value is different, the driving force in the strong creep condition is increased (at S37) to the target driving force value so that the rising time of the driving force may be constant.

Control Time Chart

The operations of the driving force control unit DCU of the second embodiment will be described with reference to the control time chart of FIG. 9. (In FIG. 9, a thick solid line indicates the braking force, and a solid dotted line indicates the driving force.) Here, the braking force when the vehicle stops is not retained and the driving motor 1 is not automatically stopped.

Three situations will be described separately based on the magnitude of the braking force when the vehicle stops.

Here, the configurations of the vehicle and the driving force control unit DCU are those shown in FIG. 1, and the vehicle inclination angle is detected based on the braking force. On the other hand, the driving force control unit DCU switches the driving force, when the brake pedal BP is depressed at a predetermined or lower vehicle speed, as illustrated in FIGS. 2 and 8, into the weak creep condition, while maintaining the weak creep condition when the brake pedal BP is depressed even when the vehicle stops, and increases the driving force to the target driving force value in the strong creep condition, as set based on the braking force when the vehicle stops when the brake pedal BP depression is released (or the brake switch BSW (OFF)) when the vehicle starts, so that the rising time of the driving force may be constant.

Figure 9A:
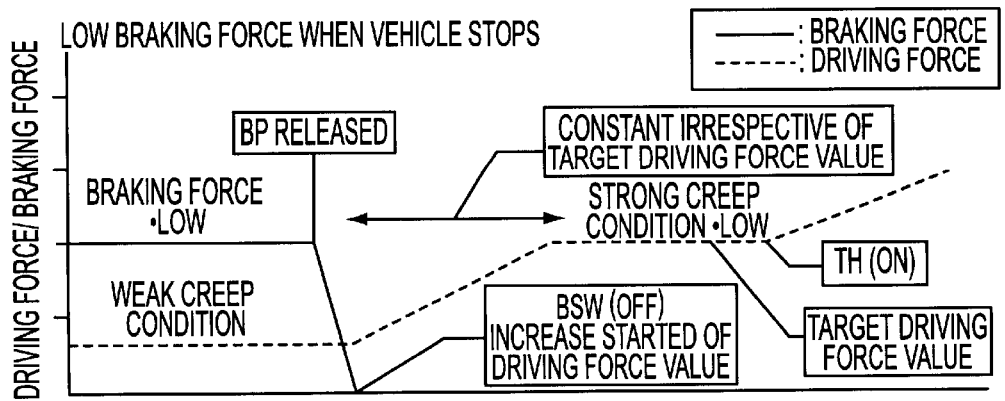
FIG. 9A corresponds to a situation in which the braking force is small when the vehicle stops, FIG. 9B corresponds to a situation in which the braking force is in the middle when the vehicle stops, and FIG. 9C corresponds to a situation in which the braking force is large when the vehicle stops, respectively.

(1) Small Braking Force When the Vehicle Stops (FIG. 9A)

This control time chart is for a situation in which a vehicle starts on a flat road. The vehicle stops on a flat road, therefore, a weak braking force is sufficient for maintaining the stopped state. As illustrated in FIG. 9A, therefore, the braking force is small when the vehicle stops. In other words, the driver stops the vehicle by depressing the brake pedal BP weakly.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition to increase the driving force value for a constant driving force rising time period to the target driving force value set at a small value based on the braking force, so that the vehicle starts smoothly. When the accelerator pedal is depressed (TH (ON)), the driving force is increased to accelerate the vehicle.

Figure 9B:
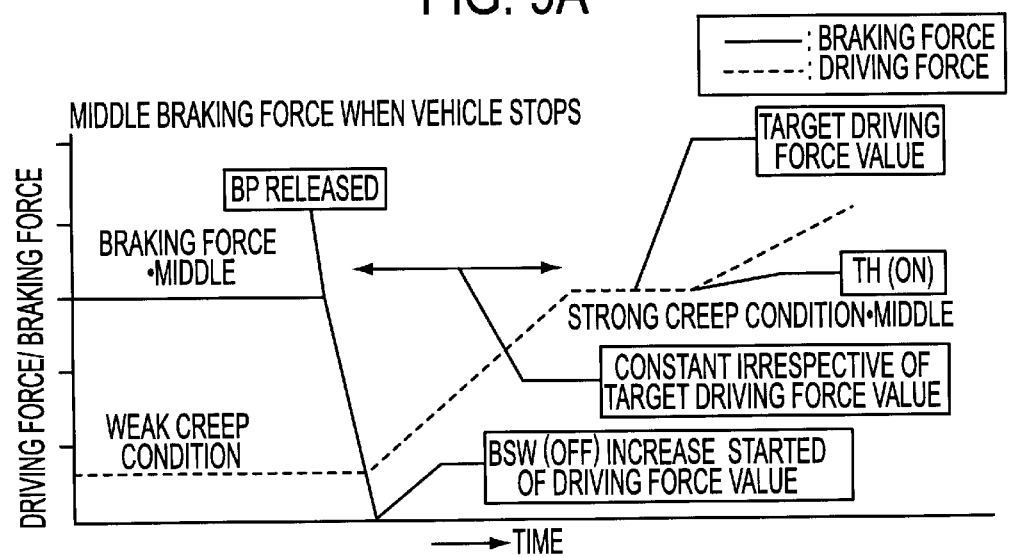
FIG. 9 shows vehicle control time charts for the controls shown in FIG. 8 from the time the vehicle stops to the time the vehicle starts.

(2) Middle Braking Force When the Vehicle Stops (FIG. 9B)

This control time chart is for a situation in which the vehicle starts on a non-steep up slope. The vehicle stops on a non-steep up slope, therefore, a strong braking force is not required for maintaining the stopped state. As illustrated in FIG. 9B, therefore, the braking force is in the middle when the vehicle stops. In other words, the driver stops the vehicle by depressing the brake pedal BP moderately.

In order to start the vehicle from this state, the driver releases his foot from the brake pedal BP to release the depression. Then, the brake switch BSW is turned OFF to eliminate the braking force. Simultaneously with this, the driving force control unit DCU switches the driving force value from the weak creep condition to the strong creep condition to increase the driving force value for a constant driving force rising time period to the target driving force value set at a middle value based on the braking force when the vehicle stops, so that the vehicle starts smoothly. When the accelerator pedal is depressed (TH (ON)), the driving force is increased to accelerate the vehicle.

Figure 9C:
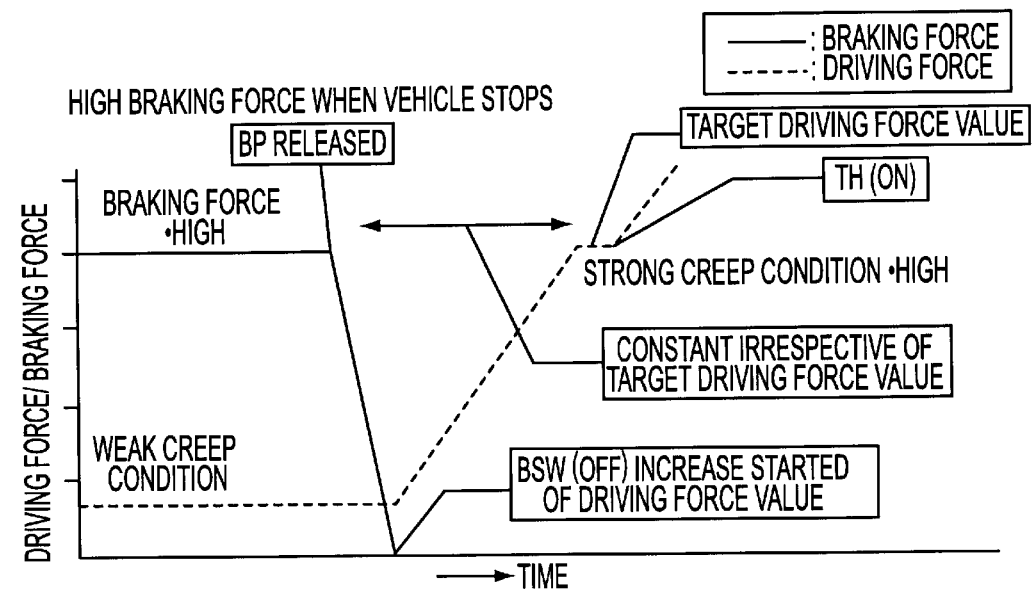

(3) Large Braking Force When the Vehicle Stops (FIG. 9C)

This control time chart is for a situation in which a vehicle starts on a steep up slope. The vehicle stops on the steep up slope, therefore, a strong braking force is not required for maintaining the stopped state. As illustrated in FIG. 9C, therefore, the braking force is large when the vehicle stops. In other words, the driver stops the vehicle by depressing the brake pedal BP strongly.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition to increase the driving force value for a constant driving force rising time period to the target driving force value set at a large value based on the braking force when the vehicle stops, so that the vehicle starts smoothly. When the accelerator pedal is depressed (TH (ON)), the driving force is increased to accelerate the vehicle.

Rising Pattern of Driving Force

Figure 10:
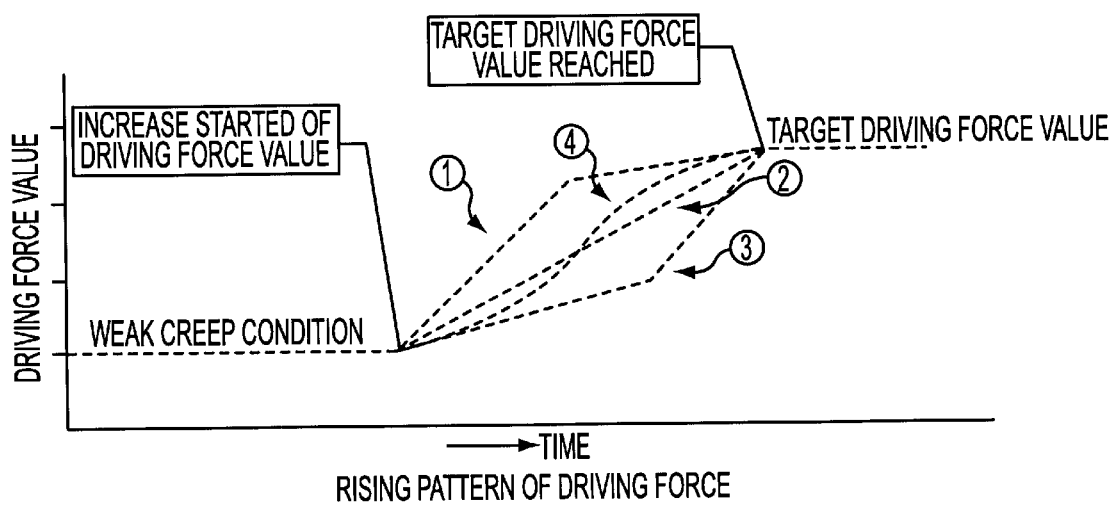
FIG. 10 is a diagram illustrating an example of a rising pattern of the driving force of the driving force control unit according to the second embodiment of the invention.

The rising pattern of the driving force can be made to rise convexly upward (at ① in FIG. 10), to rise linearly upward (at ② in FIG. 10), to rise convexly downward (at ③ in FIG. 10) and to rise convexly upward and downward (at ④ in FIG. 10). The individual patterns of FIG. 10 correspond to the oil pressure command values for the control unit CU to transmit to the hydraulic control valve (FIG. 1) of the starting clutch. When driving motor 1 is stopped, working oil of the starting clutch leaks, and the intended rising pattern of the driving force is not achieved until the starting clutch is filled up with the working oil.

According to the second embodiment of the invention described thus far, the driving force rises for a constant time period to the target driving force value, as set based on the gradient, irrespective of the magnitude of the target driving force value, so that the time to feel the initial motion of the vehicle can be made constant.

As in the first embodiment, the braking force may be retained, and driving motor 1 may be stopped automatically. On the other hand, the vehicle inclination angle may be detected based on the releasing rate of the brake pedal BP.

Third Embodiment

Descriptions of members/elements having the same functions/actions as those of the first and second embodiments will be omitted by designating them with the same reference numerals as those of the first embodiment.

Figure 11:
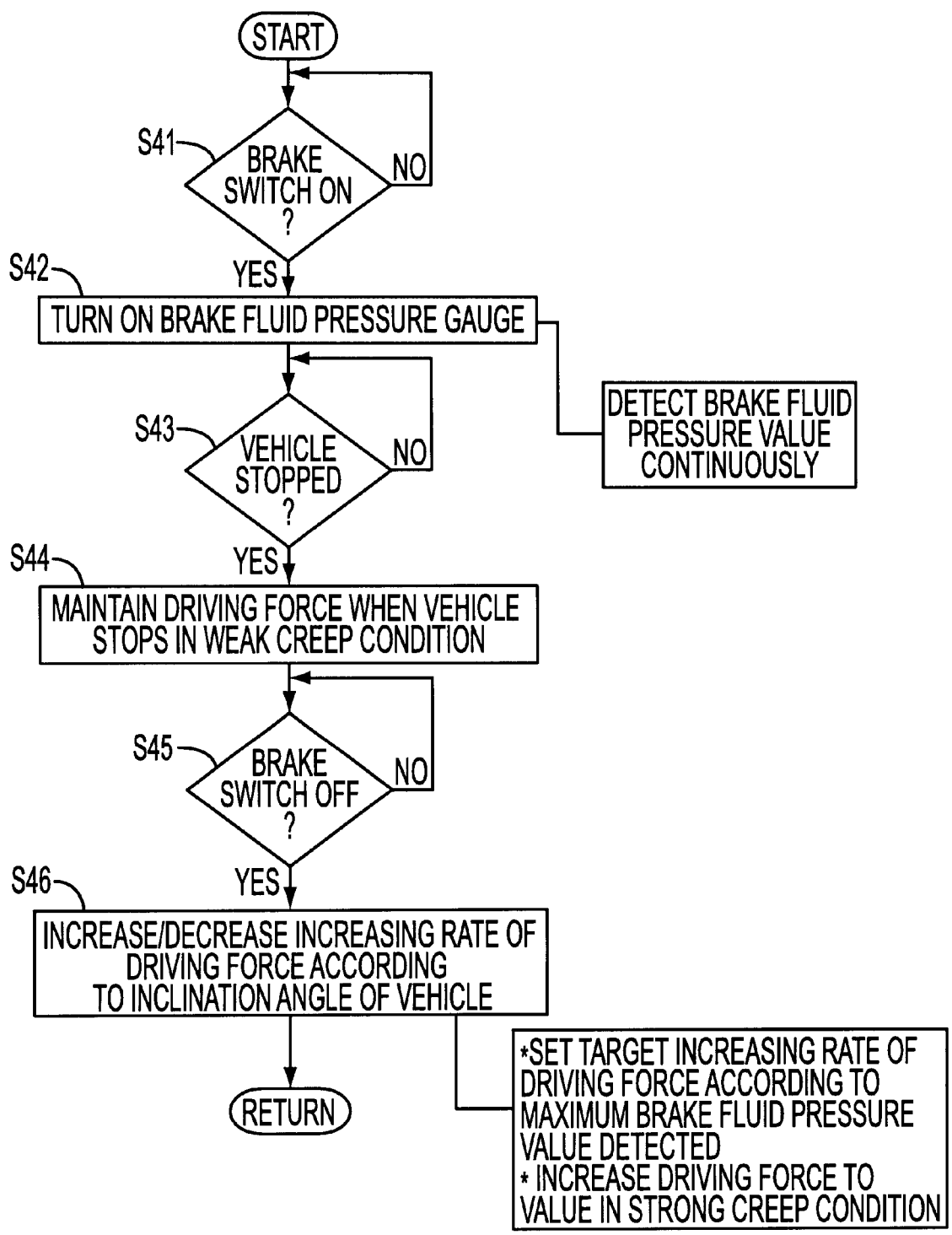
FIG. 11 is a flow chart (only for the control of the driving force value) showing a control example starting at the time when the vehicle stops. Here, the vehicle is provided with a driving force control unit according to a third embodiment of the invention.

Here, FIG. 11 is a flow chart showing a control example from the time the vehicle stops to the time the vehicle starts. FIG. 12 is a control time chart from the time the vehicle stops to the time the vehicle starts.

A vehicle having the driving force control unit DCU of this third embodiment mounted thereon is provided with all the devices that are mounted on the vehicle of the first and second embodiments.

The driving force control unit DCU of the third embodiment increases/decreases the increasing rate of the driving force when the brake pedal BP is released to switch the driving force from the weak creep condition to the strong creep condition, based on the vehicle inclination angle. In other words, the driving force is raised quickly if the vehicle inclination angle is large, but slowly if the vehicle inclination angle is small.

Controls of Increasing Rate of Driving Force

In order to make the rising time constant at the increasing rate of the driving force based on the vehicle inclination angle, according to the third embodiment, the inclination angle metering unit detects the vehicle inclination angle based on the braking force, and the control unit CU determines the target increasing rate of the driving force to transmit a predetermined oil pressure command value to the hydraulic control valve (FIG. 1) of the hydraulic clutch so that the driving force value is raised at the target increasing rate to the driving force value in the strong creep condition.

Flow Chart of Controls

One example of the controls of the third embodiment from the time the vehicle stops to the time the vehicle starts will be described with reference to the flow charts of FIG. 11. Here, it is assumed that the driving force when the vehicle stops is in the weak creep condition, that the transmission is set in the driving range and that the accelerator pedal is not depressed. It is further assumed that the brake switch BSW is turned ON when the brake pedal BP is depressed but OFF when it is not depressed. When the vehicle stops, the braking force is not retained and the driving motor 1 is not automatically stopped.

In the flow chart of FIG. 11, the state of the brake switch BSW by the brake pedal BP depression is detected and determined (at S41). If the brake switch BSW is not ON, the controls wait for the brake switch BSW to turn on. When the brake switch BSW is turned ON, the brake fluid pressure gauge PG (FIG. 1) is turned ON (at S42), and the brake fluid pressure is continuously detected so that the brake fluid pressure value, as converted into electric signals, is transmitted to the control unit CU. When the brake switch BSW is ON so that the vehicle speed becomes a predetermined or lower vehicle speed, the driving force is switched (as shown in FIG. 2) to the weak creep condition. When it is determined (at S43) that the vehicle has stopped, the weak creep condition is maintained (at S44). Here, the weak creep condition contains the situation in which the driving force is reduced to zero.

The controls then wait (at S45) for the brake switch BSW to be turned OFF by releasing the brake pedal BP depression when the vehicle stops. Based on the braking force (or the maximum brake fluid pressure value) when the vehicle stops, the target increasing rate of the driving force is set to increase the driving force to the driving force value in the strong creep condition. In short, the increasing rate of the driving force is increased/decreased (at S46) based on the vehicle inclination angle.

Control Time Chart

The operations of the driving force control unit DCU of the second embodiment will be described with reference to the control time chart of FIG. 12. (In FIG. 12, a thick solid line indicates the braking force, and a solid dotted line indicates the driving force.) Here, the braking force when the vehicle stops is not retained and driving motor 1 is not automatically stopped.

Three situations will be described separately based on the magnitude of the braking force when the vehicle stops.

Figure 2:
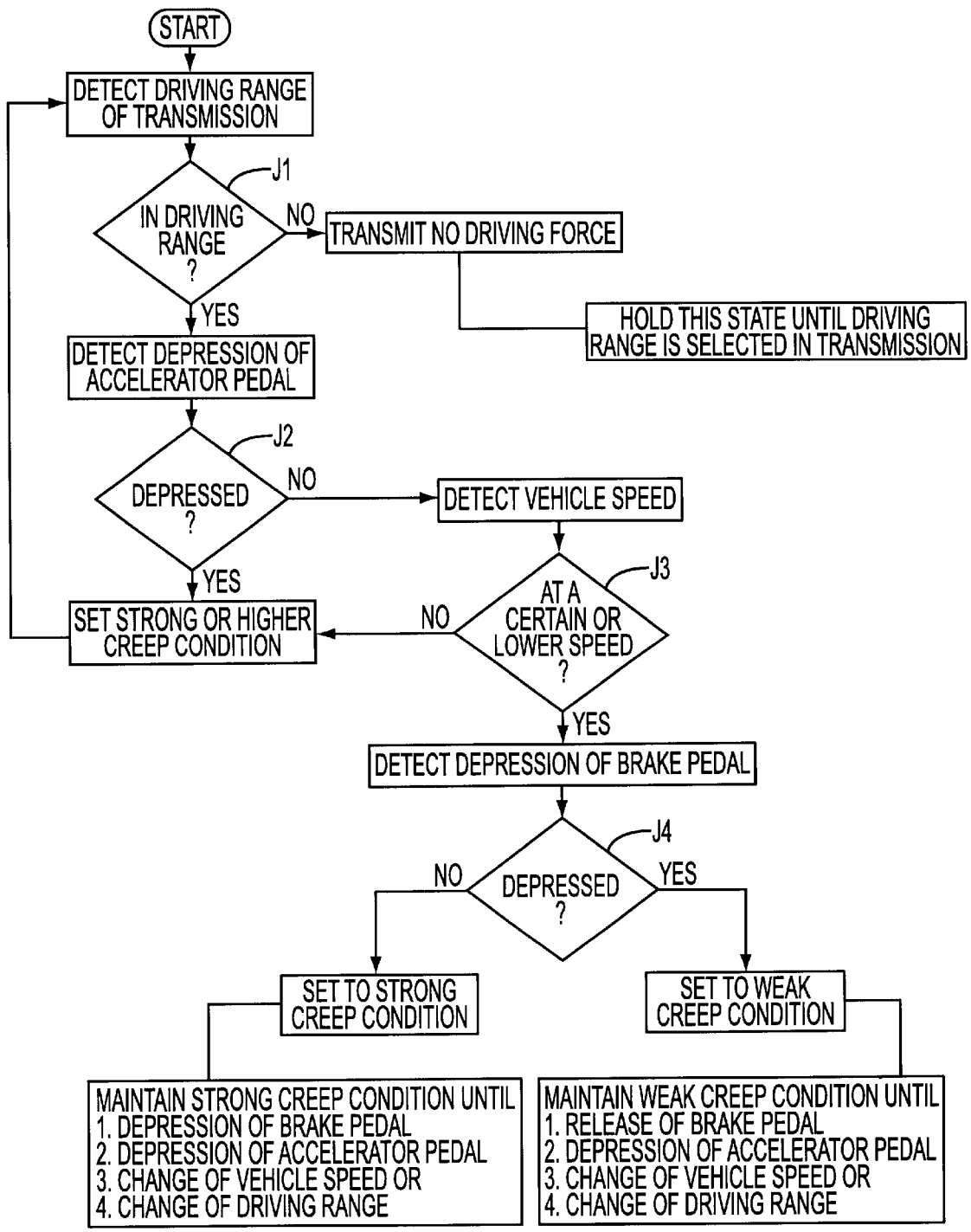
FIG. 2 is a flow chart showing a basic control example of the driving force control unit according to the first embodiment of the invention when the vehicle is running.

Here, the configurations of the vehicle and the driving force control unit DCU are those shown in FIGS. 2 and 11, and the vehicle inclination angle is detected based on the braking force. On the other hand, the driving force control unit DCU switches the driving force, when the brake pedal BP is depressed at a predetermined or lower vehicle speed, as illustrated in FIGS. 2 and 8, into the weak creep condition, while maintaining the weak creep condition when the brake pedal BP is depressed even when the vehicle stops, and increases driving force to the target driving force value in the strong creep condition at the increasing rate (or the target increasing rate) of the driving force based on the braking force when the vehicle stops when the brake pedal BP depression is released (or the brake switch OFF) when the vehicle starts.

Figure 12A:
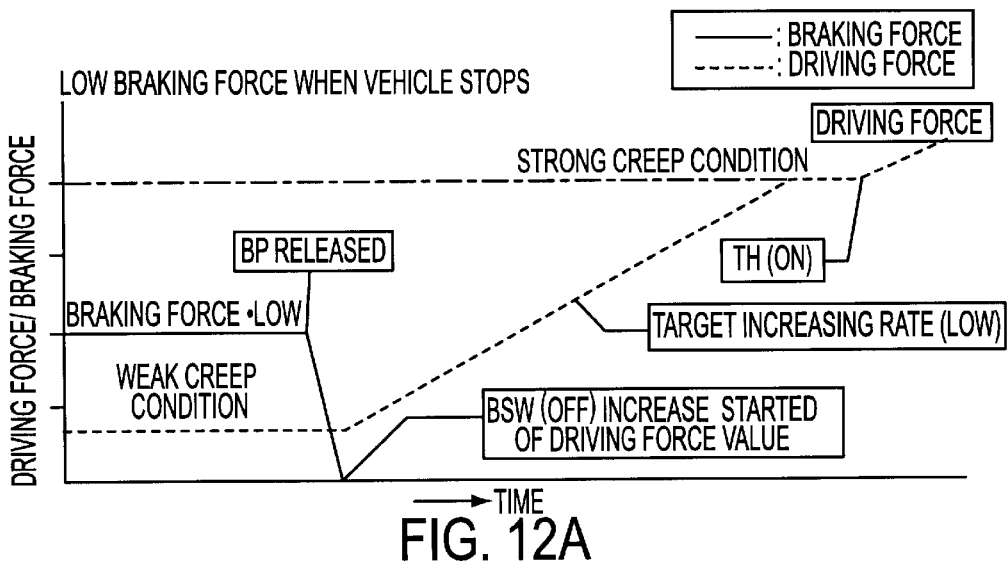
FIG. 12A corresponds to a situation in which the braking force is small when the vehicle stops, FIG. 12B corresponds to a situation in which the braking force is in the middle when the vehicle stops, and FIG. 12C corresponds to a situation in which the braking force is large when the vehicle stops, respectively.

(1) Small Braking Force When the Vehicle Stops (FIG. 12A)

This control time chart is for a situation in which the vehicle starts on a flat road. The vehicle stops on a flat road, therefore, a weak braking force is sufficient for maintaining the stopped state. As illustrated in FIG. 12A, therefore, the braking force is small when the vehicle stops. In other words, the driver stops the vehicle by depressing the brake pedal BP weakly.

In order to start the vehicle from this state, the driver releases his foot from the brake pedal BP to release the depression. Then, the brake switch BSW is turned OFF to eliminate the braking force. Simultaneously with this, the driving force control unit DCU switches the driving force value from the weak creep condition to the strong creep condition, but the target increasing rate of the driving force is set at a small value based on the braking force when the vehicle stops. As a result, the driving force value increases gently so that the vehicle starts smoothly. When the accelerator pedal is depressed (TH (ON)), the driving force is increased to accelerate the vehicle.

Figure 12B:
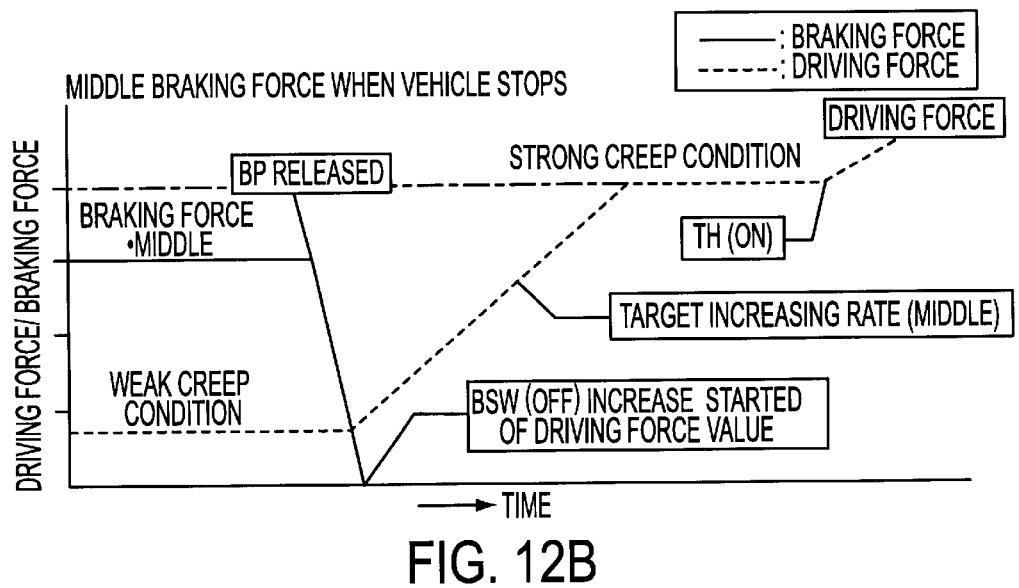
FIG. 12 shows vehicle control time charts for the controls shown in FIG. 11 from the time the vehicle stops to the time the vehicle starts.

(2) Middle Braking Force When the Vehicle Stops (FIG. 12B)

This control time chart is for a situation in which the vehicle starts on a non-steep up slope. The vehicle stops on the non-steep up slope, therefore, a strong braking force is not required for maintaining the stopped state. As illustrated in FIG. 12B, therefore, the braking force is in the middle when the vehicle stops. In other words, the driver stops the vehicle by depressing the brake pedal BP moderately.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition, but the target increasing rate of the driving force is set at a middle value based on the braking force when the vehicle stops. As a result, the driving force value increases moderately so that the vehicle starts smoothly. When the accelerator pedal is depressed (TH (ON)), the driving force is increased to accelerate the vehicle.

Figure 12C:
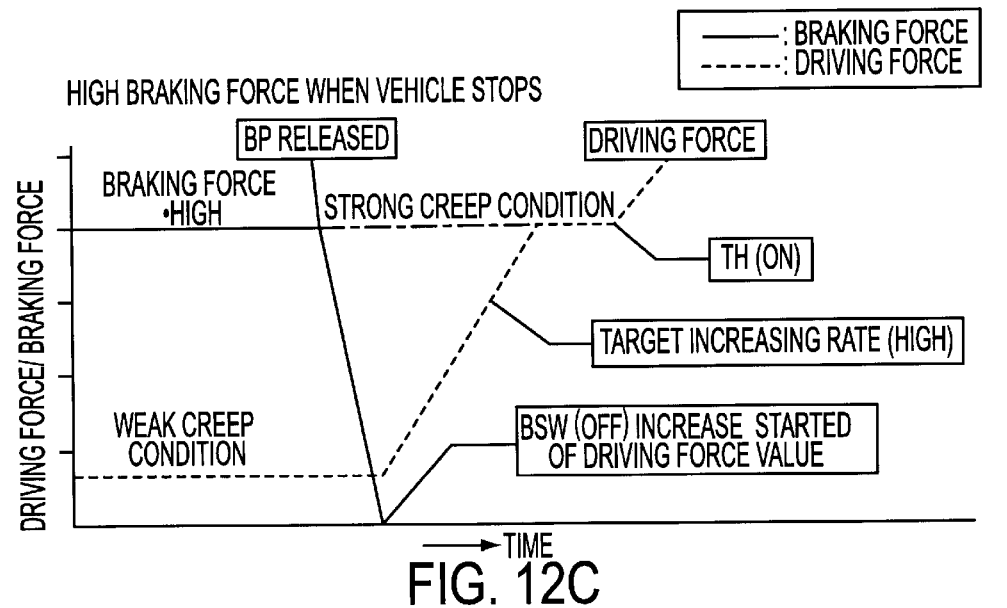

(3) Large Braking Force When the Vehicle Stops (FIG. 12C)

This control time chart is for a situation is which a vehicle starts on a steep up slope. The vehicle stops on the steep up slope, therefore, a strong braking force is not required for maintaining the stopped state. As illustrated in FIG. 12C, therefore, the braking force is large when the vehicle stops. In other words, the driver stops the vehicle by depressing the brake pedal BP strongly.

In order to start the vehicle from this state, the driver releases his foot from the brake pedal BP to release the depression. Then, the brake switch BSW is turned OFF to eliminate the braking force. Simultaneously, the driving force control unit DCU switches the driving force value from the weak creep condition to the strong creep condition, but the target increasing rate of the driving force is set at a large value based on the braking force when the vehicle stops. As a result, the driving force value increases quickly for the steep up slope requiring a quick rise in the driving force, so that the vehicle stops against the slope. When the driver depresses the accelerator pedal (TH (ON)) quickly, the driving force is increased to accelerate the vehicle.

According to the third embodiment of the invention described thus far, the driving force rises at the increasing rate, as properly set based on the vehicle inclination angle, so that the vehicle can start smoothly.

When the vehicle stops, as in the first embodiment, the braking force may be retained, and driving motor 1 may be automatically stopped. On the other hand, the vehicle inclination angle may be detected based on the releasing rate of the brake pedal BP. On the other hand, the driving force value in the strong creep condition may be changed based on the vehicle inclination angle or kept constant, irrespective of the vehicle inclination angle.

EXAMPLES

The present invention will be described in more detail in connection with two embodiments. Example 1 corresponds to a first embodiment, and Example 2 corresponds to a third embodiment. The present invention is not limited to these embodiments.

Both Example 1 and Example 2 use a vehicle having the following system configuration.

System Configuration of Vehicle

Figure 13:
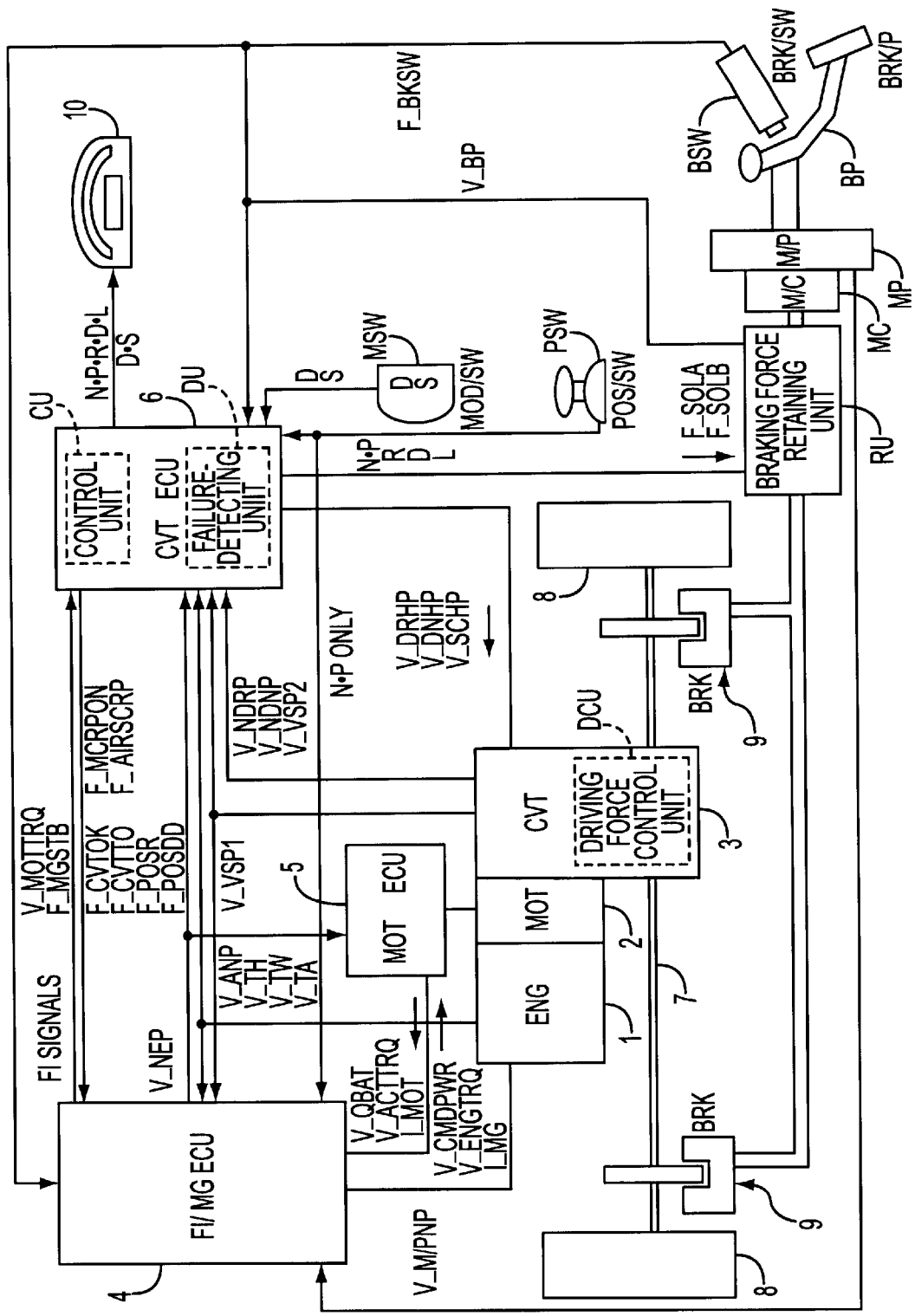
FIG. 13 is a diagram showing a system configuration of a vehicle in which a driving force control unit according to the invention is mounted.

First of all, the system configuration, and the like, of a vehicle according to the present embodiment (Example 1 and Example 2) will be described with reference to FIG. 13. The vehicle to be described in the present embodiments is a hybrid vehicle including, as its prime mover, an engine 1 or an internal combustion engine using gasoline as a driving motor and a motor 2 using electricity as a driving motor, and is equipped with CVT 3 as a transmission. Here, in the vehicle of the present invention, the driving motor is not limited, but may be exemplified exclusively by the engine or the motor. The transmission is also not limited, but may be exemplified by an automatic transmission equipped with a hydraulic torque converter.

Engine (Driving Motor)/CVT (Transmission)/Motor (Driving Motor)

Engine 1 is controlled at a fuel injection electronic control unit (hereinafter referred to as "FIECU"). The FIECU is integrally constructed with a management electronic control unit (hereinafter referred to as "MGECU"), and it is incorporated in a fuel injection/management electronic control unit 4 (hereinafter referred to as "FI/MGECU"). Motor 2 is controlled at a motor electronic control unit 5 (hereinafter referred to as "MOTECU"). Further, CVT 3 is controlled at a CVT electronic control unit 6 (hereinafter referred to as "CVTECU").

Figure 14:
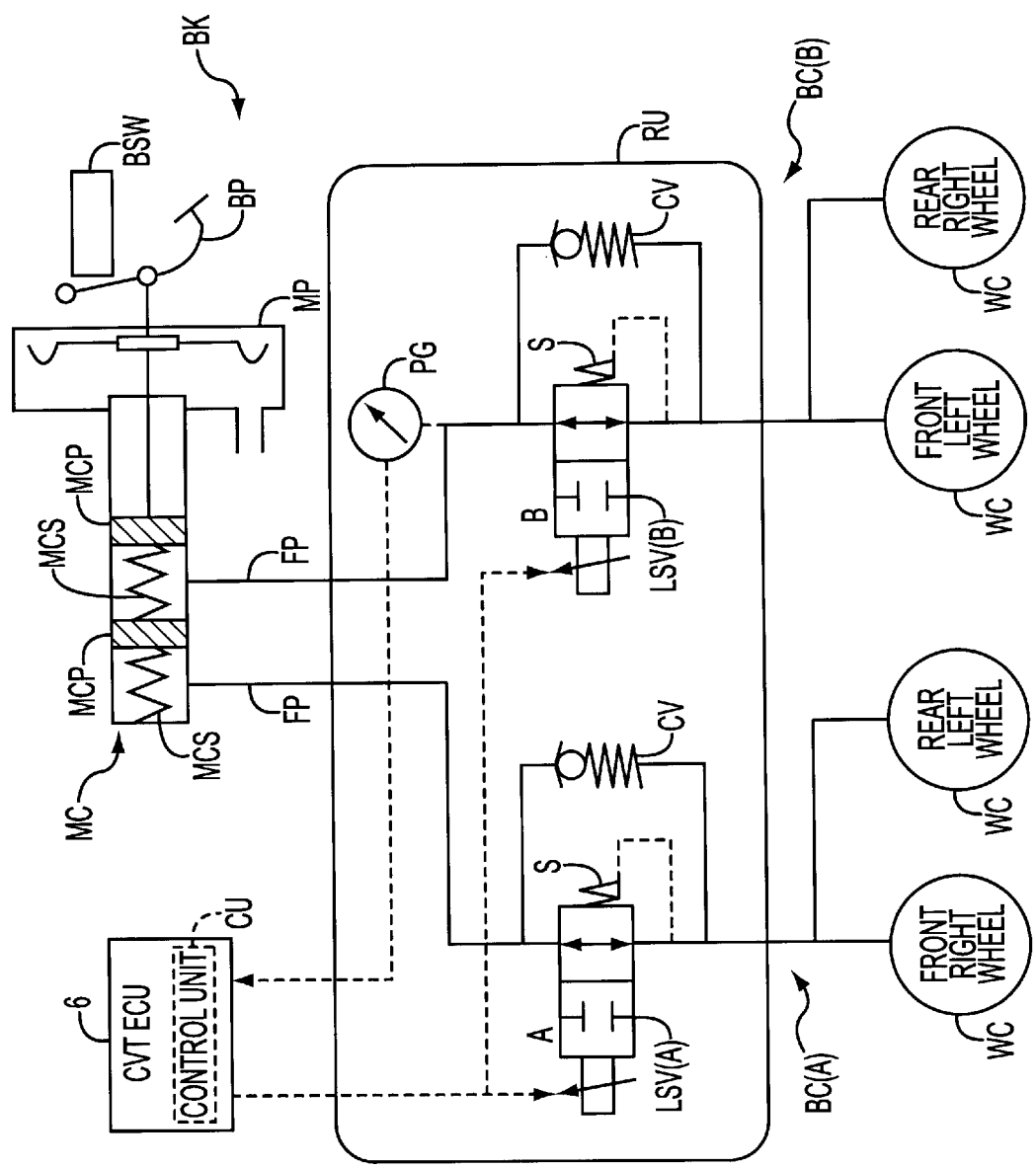
FIG. 14 shows a configuration of a braking force retaining unit to be mounted on the vehicle of FIG. 13.

A drive axle 7 provided with driving wheels 8 is mounted to CVT 3. Each driving wheel 8 is provided with a disc brake 9, which includes a wheel cylinder WC, and the like (FIG. 14). The wheel cylinders WC of the disc brakes 9 are connected to a master cylinder MC through a braking force retaining unit RU. When the driver depresses the brake pedal BP, a brake pedal load generated is transmitted to the master cylinder MC through a master power MP. The brake switch BSW detects whether or not the brake pedal BP is depressed.

Engine 1 is an internal combustion engine which uses thermal energy. Engine 1 drives the driving wheels 8 through CVT 3 and drive axle 7. In order to improve fuel consumption, engine 1 may be automatically stopped while the vehicle stops. For this reason, the vehicle is provided with a driving motor stopping unit for automatically stopping engine 1 when certain automatic engine stop conditions are satisfied.

Motor 2 has an assist mode to assist the engine drive by using electronic energy from a battery (not shown). Motor 2 has a regeneration mode for converting the kinetic energy derived from the rotation of drive axle 7 into electronic energy. When the engine does not require an assist from the assist mode (such as for starting on a down slope or decelerating the vehicle), the converted electronic energy is stored in the battery. Motor 2 also has an actuation mode for actuating engine 1.

CVT 3 includes an endless belt wound between a drive pulley and a driven pulley to make a continuously variable gear ratio possible by changing the winding radius of the endless belt. A change in the winding radius is achieved by changing each pulley width. CVT 3 establishes the engagement between a starting clutch and an output shaft to transmit the output of engine 1 converted by the endless belt into drive axle 7 through gears on the output side of the starting clutch. The vehicle equipped with CVT 3 makes creep running possible when the engine idles, and the vehicle requires a driving force control unit DCU for reducing the driving force to be used for the creep running.

Driving Force Control Unit

The driving force control unit DCU is disposed in CVT 3 and controls the driving force transmission capacity (or the engaging force) of the starting clutch variably to switch the magnitude of the creep force. This driving force control unit DCU is constructed to include the starting clutch disposed in CVT 3 and CVTECU 6 which is described later.

The driving force control unit DCU determines at CVTECU 6 the condition for the weak creep condition, the condition for the middle creep condition, the condition for the strong creep condition and the condition for the strong creep condition for driving, as will be described later, and changes the driving force transmission capacity of the starting clutch to switch the driving force in each of the preset creep conditions. This driving force control unit DCU can increase/decrease the driving force value in the strong creep condition when switching from the weak creep condition after the depressed brake pedal BP is released to the strong creep condition, based on the braking force when the vehicle is stopping.

In addition, the driving force control unit DCU switches to the strong creep condition by increasing the driving force transmission capacity of the starting clutch when it is detected, when starting on an up slope, that the vehicle has displaced backwards or forward.

The driving force control unit DCU determines the individual conditions for switching the creep force at CVTECU 6 and transmits a hydraulic pressure command value to the hydraulic pressure control value for controlling the engagement hydraulic pressure of the starting clutch from CVTECU 6 to CVT 3. Based on this hydraulic pressure command value in CVT 3, the driving force control unit DCU switches the engaging force of the starting clutch. As a result, the driving force transmission capacity changes to switch the creep force. The driving force is thus reduced by the driving force control unit DCU to improve the vehicle's fuel consumption. The fuel consumption improvement is realized by reducing the load on engine 1 and the load on the hydraulic pump in the starting clutch. Here, the driving force transmission capacity means the maximum driving force (or driving torque) to be transmitted by the starting clutch. If the driving force generated by engine 1 exceeds the driving force transmission capacity, the starting clutch cannot transmit the driving force over the driving force transmission capacity to the driving wheels 8.

If a braking force retaining unit RU failure is detected by the failure-detecting unit DU, the operation of the driving force control unit DCU is prohibited.

In the present embodiment, the creep force of the vehicle has three magnitudes including: (1) a strong creep condition; (2) a weak creep condition; and (3) a middle creep condition. The driving force transmission capacities of the individual conditions are set to be large in the strong creep condition, small in the weak creep condition and in the middle in the middle creep condition. The strong creep condition is divided into a strong creep condition at a vehicle speed of 5 km/h or lower and a strong creep condition at a vehicle speed of 5 km/h or more. The strong creep condition at the vehicle speed of 5 km/h or lower will be called the "strong creep condition", and the strong creep condition at the vehicle speed of 5 km/h or more will be called the "strong creep condition for driving".

The strong creep condition is realized when the accelerator pedal depression is released (in the idling state) at a predetermined or lower vehicle speed and when the positioning switch PSW selects the driving range, so that the vehicle runs slowly as if it creeps when the brake pedal BP is released. Here, the phrase "the positioning switch PSW selects the driving range" means that "the transmission selects a driving range".

The strong creep condition for driving is a condition in which the driving force is lower than that in the strong creep condition and which occurs before the creep condition is switched to the weak one. Here, the condition of a high driving force in the claims does not contain the strong creep condition for driving.

The middle creep condition is a condition having a middle driving force between those of the strong creep condition and the weak creep condition, and is a middle state in which the driving force is stepwise reduced from the strong creep condition to the weak creep condition.

The weak creep condition has little driving force. The weak creep condition is realized when the brake pedal BP is depressed, and the vehicle is stopped or has an extremely low speed.

Positioning Switch

The range positions of the positioning switch PSW are selected by a shift lever. The range positions include: a P-range for parking the vehicle; an N-range for neutral; an R-range for backward running; a D-range for normal running, and an L-range for obtaining a sudden acceleration or strong engine brake. The term "running range" indicates a range position at which the vehicle can move. In this vehicle, the running range includes the D, L and R ranges. Also, when the positioning switch PSW selects the D-range, a D-mode, as a normal running mode, and an S-mode as a sport mode, can be selected by a mode switch MSW. The positioning switch PSW information and the mode switch MSW information is transmitted to CVTECU 6 and to a meter 10. Meter 10 shows the range information and the mode information selected by the positioning switch PSW and the mode switch, respectively.

In the present embodiments, the driving force of the aforementioned creep is reduced (to the middle creep condition or the weak creep condition) when the positioning switch PSW is set in the D or the L-Range, but the strong creep condition is retained when the positioning switch PSW is set in the R-range. In the N and the P-Range, on the other hand, the driving force is not transmitted to the driving wheels 8, but the driving force transmission capacity is reduced to switch the driving force formally to the weak creep condition. These points will be described in detail later.

ECU and Others

The FIECU contained in FI/MGECU 4 controls the amount of fuel injection to achieve the optimum air/fuel ratio, and it also generally controls engine 1. Various kinds of information such as the throttle opening and conditions of engine 1 are transmitted to FIECU to control engine 1. The MGECU contained in FI/MGECU 4 mainly controls MOTECU 5 as well as determines automatic engine stop conditions and automatic engine actuation conditions. The MGECU receives information corresponding to the conditions of motor 2 and other information such as conditions corresponding to engine 1 from the FIECU, and based on such information it sends mode switching instructions of motor 2 to MOTECU 5. Further, the MGECU receives information corresponding to the conditions of CVT 3, conditions of engine 1, range information of the positioning switch PSW, conditions of motor 2, and the like, and based on such information it determines whether engine 1 should be automatically stopped or automatically actuated.

MOTECU 5 controls motor 2 based on a control signal from FI/MGECU 4. The control signal from FI/MGECU 4 includes mode information for instructing the actuation of engine 1 by motor 2, assistance of the engine actuation or regeneration of electric energy, and a required output value to motor 2, and MOTECU 5 sends an order to motor 2 based on such information. Further, MOTECU 5 receives information from motor 2 and transmits information such as the amount of generated energy and the capacity of the battery to FI/MGECU 4.

CVTECU 6 controls the transmission gear ratio of CVT 3, the engaging force of the starting clutch (the driving force transmission capacity), and the like. Various conditions of engine 1, range information of the positioning switch PSW, and the like are transmitted to CVTECU 6, and based on such information CVTECU 6 transmits a signal to CVT 3. The signal includes the control of the hydraulic pressure of each cylinder provided at the drive pulley and the driven pulley of CVT 3, and the control of the hydraulic pressure of the starting clutch. CVTECU 6 includes a control unit CU for ON/OFF control (shut-off/communicate) of the servo valves LSV(A), LSV(B) (FIG. 14) of the braking force retaining unit RU. CVTECU 6 transmits a signal (a control current) for turning ON (shutoff)/OFF (communicate) the servo valves LSV(A), LSV(B) to the braking force retaining unit RU. CVTECU 6 determines the switching of the creep driving force as well as determining the increase of the driving force upon detecting movement (or a backward displacement) of the vehicle while the braking force retaining unit RU is in operation. CVTECU 6 transmits the determined information to the driving force control unit DCU of CVT 3. CVTECU 6 further includes a failure-detecting unit DU for detecting a malfunction of the braking force retaining unit RU.

Here, CVTECU 6 determines to increase the driving force, when it detects the switching determination of the driving force of the creep and the movement (or the backward displacement) of the vehicle, and is based on the determined result to transmit a hydraulic pressure command value to a hydraulic pressure control valve for controlling the engagement hydraulic pressure of the starting clutch.

Brake Unit (Braking Force Retaining Unit)

The braking force retaining unit is equipped with a braking force retaining means for retaining the braking force on the vehicle after the brake pedal BP is released and for reducing and releasing the retained braking force gradually. The braking force retaining unit is further equipped with a means for metering the brake pedal BP opening rate.

The braking force retaining unit RU of the present embodiment is incorporated, as shown in FIG. 14, in a brake fluid pressure passage FP of a hydraulic brake unit BK and is equipped with a braking force retaining means or servo valves LSV to be switched between a communicating position, for communicating the master cylinder MC and the wheel cylinders WC, and a shut-off position, for shutting off the brake fluid pressure passage FP to retain the brake fluid pressure of the wheel cylinders WC. The servo valves LSV are enabled to release the brake fluid pressure retained in the wheel cylinders WC gradually by changing an input control current gradually. In short, the servo valves LSV can release the retained braking force gradually.

The brake unit BK will be described first (FIG. 14). The brake unit BK has a brake fluid pressure circuit BC composed of the master cylinder MC, the wheel cylinders WC, and the brake fluid pressure passage FP communicating between them. Because the brake plays an extremely important role for the safe operation of the vehicle, the hydraulic brake unit BK has two independent lines of brake fluid pressure circuits (BC(A) and BC(B)) so that the minimum braking force may be achieved by one line, even if the other line malfunction.

A piston MCP is inserted in the body of the master cylinder MC which is pushed when the driver depresses the brake pedal BP, to apply pressure to the brake fluid in the master cylinder MC so that the mechanical force is converted into brake fluid pressure (or the pressure to be applied to the brake fluid). When the driver releases the brake pedal BP, the piston MCP is returned to the original position by the force of a return spring MCS, and simultaneously with this, the brake fluid pressure restores its original level. The master cylinder MC shown in FIG. 14 is a tandem type master cylinder MC, in which the two pistons MCP are juxtaposed to halve the body of the master cylinder MC from a fail-safe standpoint by providing the two independent lines of the brake fluid pressure circuits BC.

In order to lighten the brake pedal BP depression force, the master power (or brake booster) is interposed between the brake pedal BP and the master cylinder MC. The master power MC shown in FIG. 14 is a vacuum servo type, in which a vacuum is extracted from the intake manifold of engine 1 to facilitate the operation of the brake pedal BP by the driver.

The brake fluid pressure passage FP functions as a passage to transmit the brake fluid pressure, as built up in the master cylinder MC, by providing the communication between the master cylinder MC and the wheel cylinders WC to carry the brake fluid. When the brake fluid pressure of the wheel cylinders WC is higher, on the other hand, the brake fluid pressure passage FP plays the role of a passage for returning the brake fluid from the wheel cylinders WC to the master cylinder MC. Because the brake fluid pressure circuits BC are provided independently, two independent lines of brake fluid pressure passages FP are provided. The brake fluid pressure circuits BC, constructed of the brake liquid pressure passages shown in FIG. 14, are an X-piping type, in which one brake fluid pressure circuit BC(A) brakes the right front wheel, and the left rear wheel whereas the other brake fluid pressure circuit BC(B) brakes the left front wheel and the right rear wheel. Here, the brake fluid pressure circuits can also be exemplified by a front/rear division type, in which one brake fluid pressure circuit brakes the two front wheels, whereas the other brake fluid pressure circuit brakes the two rear wheels.

The wheel cylinder WC is provided for each wheel and operates to convert the brake fluid pressure, as generated by the master cylinder MC and transmitted via the brake fluid pressure passage FP to the wheel cylinders WC, into a mechanical force (or the braking force) for braking wheel 8. A piston is inserted in the body of the wheel cylinder WC, which is pushed by the brake fluid pressure to generate the braking force for braking the wheel by actuating the brake pad for a disc brake and the brake shoe for a drum brake.

Also provided, if necessary, is a brake fluid pressure control valves to control the brake fluid pressure of the wheel cylinders WC of the front wheels and the brake fluid pressure of the wheel cylinders WC of the rear wheels.

Next, the braking force retaining unit RU (FIG. 14) will be described. This braking force retaining unit RU is equipped with the servo valves LSV and the check valves CV, if necessary, and are incorporated into the brake fluid pressure passages FP which provide the communication between the master cylinder MC and the wheel cylinders WC.

The servo valve LSV (or braking force control means) is activated by a control current from the control unit CU and operates in a shut-off position, which shuts off the flow the brake fluid, and a communicating position which permits the flow of the brake fluid.

1) When switched to the shut-off position, the servo valve LSV shuts off the flow of the brake fluid all at once to retain the brake fluid pressure applied to the wheel cylinders WC, as the braking force. As long as the servo valve LSV is in the shut-off position, the braking force is retained continuously. 2) When the servo valve LSV is switched to the communicating position, it permits the flow of the brake fluid all at once to release the braking force instantly. As long as the servo valve LSV is in the communicating position, the braking force is not retained after the brake pedal BP is released. 3) The retained braking force can be gradually reduced and released by changing the value of the control current to the servo valve LSV.

Here, both the two servo valves LSV/LSV shown in FIG. 14 are in the communicating position. Even when the driver releases the brake pedal BP when starting on an up slope, the servo valves LSV can retain the brake fluid pressure (i.e., the braking force) in the wheel cylinders WC to prevent backward displacement of the vehicle. Here, backward displacement means that the vehicle moves (downwards on the slope) by its own weight in the direction opposite to that intended by the driver.

In a normal operation, the servo valve LSV assumes the shut-off position from the time the vehicle stops until the time the vehicle starts. The situation (or condition) in which the servo valve LSV assumes the shut-off position or the communicating position will be described later.

The check valve CV is provided to increase the braking force when the servo valve LSV is in the shut-off position. The present embodiment is not equipped with a relief valve.

Here, the brake switch BSW detects whether or not the brake pedal BP is depressed. Based on this detected value and the detected value of accelerator pedal depression, the control unit CU instructs the switching of the servo valve LSV between the communicating position and the shut-off position. On the other hand, the brake fluid pressure gauge PG is disposed on the side of the master cylinder MC, and detects the brake fluid pressure and transmits the brake fluid pressure value to the control unit CU. This brake fluid pressure is used not only for detecting the vehicle inclination angle by an inclination detecting unit to be described later, but also for metering the opening rate of the brake pedal BP. The opening rate of the brake pedal BP is metered in terms of the lowering rate of the brake fluid pressure value from the brake fluid pressure of about one half of the brake fluid pressure value, which is built up when the brake pedal BP is depressed to the maximum, to the zero brake fluid pressure value which is obtained when the brake pedal BP is released. This is because the brake pedal BP is not always depressed to the maximum level. The opening rate of the brake pedal BP can also be used to discriminating whether the vehicle stops on an up slope or down slope or by estimating the driving force value needed after the brake pedal BP is released.

Inclination Angle Detecting Unit

The inclination angle detecting unit in the vehicle includes the brake fluid pressure gauge PG of the braking force retaining unit RU and the control unit CU packaged in CVTECU 6. The inclination angle detecting unit detects the vehicle inclination angle based on the maximum of the brake fluid pressure value, as detected by the brake fluid pressure gauge PG when the vehicle stops, on the master cylinder MC (that is, based on the braking force at the stop).

Driving Motor Stopping Unit

The driving motor stopping unit incorporated in the vehicle includes FI/MGECU 4 and other elements. The driving motor stopping unit makes an automatic engine stop operation possible while the vehicle stops. The automatic engine stop conditions are determined at FI/MGECU 4 and CVTECU 6. The automatic engine stop conditions will be described later. When all of the automatic engine stop conditions are satisfied, FI/MGECU 4 sends an engine stop order to engine 1 to automatically stop engine 1. The driving motor stopping unit automatically stops engine 1 to improve the vehicle's fuel consumption.

The FIECU and CVTECU 6 determine automatic engine actuation conditions while the driving motor stopping unit automatically stops engine 1. When all of the automatic engine actuation conditions are satisfied, FI/MGECU 4 sends an engine actuation order to MOTECU 5. MOTECU 5 also transmits an engine actuation order to motor 2. Motor 2 then automatically actuates the engine 1, and at the same time the driving force is switched to the strong creep condition (that is, the target driving force value and the target speed are determined based on the braking force when the vehicle stops). The automatic engine actuation conditions will be described later.

Also, when the failure-detecting unit DU detects a malfunction of the braking force retaining unit RU, operation of the driving motor stopping unit is prohibited.

Signals

Signals to be transmitted and received in this system will be described. With reference to FIG. 1, the letter "F__" in front of each signal indicates that the signal is flag information, which is either a 0 or 1. The letter "V__" indicates that the signal is numerical information (the unit is optional), and the letter "I__" indicates that the signal includes a plurality of information.

Signals transmitted from FI/MGECU 4 to CVTECU 6 will be described. V__MOTTRQ represents an output torque value of motor 2. F__MGSTB is a flag showing whether all of the engine stop conditions determined at FI/MGECU 4 are satisfied. If all the conditions are satisfied, the numeral 1 is provided, and if not, the numeral 0 is provided. The automatic engine stop conditions regarding the F__MGSTB will be described later. When the F__MGSTB and F__CVTOK (hereinafter described) are both 1, engine 1 is automatically stopped. When one of these flags is a 0, engine 1 is automatically actuated.

A signal transmitted from FI/MGECU 4 to CVTECU 6 and MOTECU 5 will be described. V__NEP represents an engine speed.

Signals to be transmitted from CVTECU 6 to FI/MGECU 4 will be described. F__MCRPON is a flag showing whether or not the driving force is in the middle creep condition. The numeral 1 is provided in the middle creep condition, and if not, the numeral 0 is provided. When F__MCRPON is 1, engine 1 is required to blow middle air in the middle creep condition (weaker air than that in the strong creep condition). F__AIRSCRP is a strong air demand flag in the strong creep condition. If strong air is required in the strong creep condition, the numeral 1 is provided, and if not, the numeral 0 is provided. When both the F__MCRPON and the F__AIRSCRP are 0, FI/MGECU 4 blows weak air in the weak creep condition. In order to keep the engine idle speed at a certain level, regardless of the driving force in the strong creep condition, the middle creep condition or the weak creep condition, the output of the engine should be adjusted by way of blowing corresponding air to the strong creep condition, the middle creep condition or the weak creep condition. When the driving force is in the strong creep condition and a load on engine 1 higher, a strong air blow (strong air in the strong creep condition) is required. The term "air blow" means the supply of air from an air passage bypassing a throttle valve of engine 1 to an intake pipe positioned downstream of the throttle valve. The strength of air to be blown adjusts the strength (amount) of air to be blown, by controlling the degree of the air passage opening.

F__CVTOK is a flag showing whether all of the engine stop conditions determined at CVTECU 6 are satisfied. If all the conditions are satisfied, the numeral 1 is provided, and if not, the numeral 0 is provided. The automatic engine stop conditions regarding the F__CVTOK will be described later. F__CVTTO is a flag showing whether the oil temperature of CVT 3 is over a certain value. If the oil temperature is at the certain value or higher, the numeral 1 is provided, and if the oil temperature is below the value, the numeral 0 is provided. The oil temperature of CVT 3 is obtained from the electric resistance value of the linear solenoid value controlling hydraulic pressure of the starting clutch at CVT 3. F__POSR is a flag showing a condition whether the positioning switch PSW is set in the R-range. If the positioning switch PSW selects the R-range, the numeral 1 is provided, and if not, the numeral 0 is provided. F__POSDD is a flag showing a condition whether the positioning switch PSW selects the D-range and the mode switch MSW selects the D-mode. If the D-range and the D-mode (D-range/D-mode) are selected, the numeral 1 is provided, and if not, the numeral 0 is provided. When FI/MGECU 4 does not receive any information indicating the D-range/D-mode, the R-range, the P-range or the N-range, FI/MGECU 4 determines that either the D-range/S-mode or the L-range is selected.

A signal V__ANP represents a negative pressure value at the intake pipe of engine 1. V__TH represents a throttle opening. V__TW represents a temperature of the cooling water at engine 1. V__TA represents the intake temperature of engine 1. The brake fluid temperature in the braking force retaining unit RU disposed within the engine compartment is obtained from the intake temperature. This is because both temperatures change with respect to the temperature at the engine compartment.

A signal transmitted from CVT 3 to FI/MGECU 4 and CVTECU 6 will be described. V__VSP1 represents a vehicle speed pulse from one of two vehicle speed pickups provided in CVT 3. The vehicle speed is calculated based on the vehicle speed pulse.

Signals transmitted from CVT 3 to CVTECU 6 will be described. V__NDRP represents a pulse showing the number of revolutions of the drive pulley provided at the CVT 3. V__NDNP represents a pulse showing the number of revolutions of the driven pulley provided at CVT 3. V__VSP2 represents a vehicle speed pulse from the other vehicle speed pickup at CVT 3. The V__VSP2 is more accurate than the V__VSP1, and the V__VSP2 is used for calculating the amount of clutch slippage at CVT 3.

Signals transmitted from MOTECU 5 to FI/MGECU 4 will be described. V__QBAT represents the capacity remaining at the battery. V__ACTTRQ represents an output torque value of motor 2, which is the same as the V__MOTTRQ. I__MOT represents information such as the amount of energy generated by motor 2 which indicates electric loading. Motor 2 generates all the electric power consumed by the vehicle including the electric power for driving the motor.

Signals transmitted from FI/MGECU 4 to MOTECU 5 will be described. V__CMDPWR represents required output value to motor 2. V__ENGTRQ represents an output torque value of engine 1. I__MG represents information such as an actuation mode, an assist mode and a regeneration mode with respect to motor 2.

A signal transmitted from the master power MP to FI/MGECU 4 will be described. V__M/PNP represents a negative pressure detected value at a constant pressure chamber of the master power MP.

A signal transmitted from the positioning switch PSW to FI/MGECU 4 will be described. An N or P is transmitted as positioning information when the positioning switch PSW selects either the N-range or P-range.

Signals transmitted from CVTECU 6 to CVT 3 will be described. V_DRHP represents a hydraulic pressure command value transmitted to the hydraulic pressure control valve, which controls hydraulic pressure within the cylinder of the drive pulley at the CVT 3. V_DNHP represents a hydraulic pressure command value transmitted to the hydraulic pressure control valve, which controls hydraulic pressure within the cylinder of the driven pulley at CVT 3. The transmission gear ratio of CVT 3 is changed by the V_CRHP and the V_DCHP. V_SCHP represents a hydraulic pressure command value transmitted to the hydraulic pressure control valve, which controls hydraulic pressure of the starting clutch at CVT 3. The engaging force of the starting clutch (the driving force transmission capacity) can be arbitrarily changed by the V_SCHP.

Signals transmitted from CVTECU 6 to the braking force retaining unit RU will be described. V_SOLA is a control current for turning ON (close to the shut-off position)/OFF (open to the communicating position) the servo valve LSV (A) of the braking force retaining unit RU (shown in FIG. 14). The value of the control current is increased for turning ON the servo valve LSV, and is decreased for turning OFF the servo valve LSV. V_SOLB is a control current for turning ON (close)/OFF (open) the servo valve LSV(B) of the braking force retaining unit RU (shown in FIG. 14). The value of the control current is increased for turning ON the servo valve LSV, and is decreased for turning OFF the servo valve LSV. Here, the current values of the V_SOLA and V_SOLB can be continuously changed.

A signal transmitted from the positioning switch PSW to CVTECU 6 will be described. The positioning switch PSW selects the N-range, the P-range, the R-range, the D-range or the L-range, and the selected range is transmitted as the positioning information.

A signal transmitted from the mode switch MSW to CVTECU 6 will be described. The mode switch MSW selects either the D-mode (normal running mode) or the S-mode (sport running mode), and the selected mode is transmitted as mode information. The mode switch MSW is a mode selection switch, which works when the positioning switch PSW is set in the D-range.

A signal transmitted from the brake switch BSW to the FIECU and CVTECU 6 will be described. F_BKSW is a flag showing a condition whether the brake pedal BP is depressed (ON) or released (OFF). If the brake pedal BP is depressed, the numeral 1 is provided, and if the brake pedal is released, the numeral 0 is provided.

Signals transmitted from the braking force retaining unit RU to CVTECU 6 will be described. V_BP is a brake fluid pressure value detected by the brake fluid pressure gauge PG (FIG. 14), and the vehicle inclination angle is detected based on the brake fluid pressure value. On the other hand, the V_BP is used for metering the brake pedal BP opening rate. The brake pedal BP opening rate is used for determine whether the vehicle stops on an up slope or a down slope and for estimating the driving force value needed after the brake pedal BP is released when the vehicle starts.

A signal transmitted from CVTECU 6 to meter 10 will be described. The positioning switch PSW selects the N-range, the P-range, the R-range, the D-range or the L-range, and the selected range is transmitted as positioning information.

Further, the mode switch MSW selects either the D-mode (normal running mode) or the S-mode (sport running mode), and the selected mode is transmitted as mode information.

Specific Vehicle Controls

How the vehicle is controlled in the present embodiment will be described separately for stopping and starting the vehicle (FIGS. 15 to 21).

Specific Controls at Vehicle Stopping Time

The conditions when the vehicle stops will be described in detail individually as follows: 1) Conditions for Retaining Braking Force; 2) Conditions required for Permitting operation of the Braking Force Retaining Unit; 3) Conditions required for Weak Creep Order; 4) Conditions required for Strong Creep Condition for Driving; 5) Conditions required for Middle Creep Condition; and 6) Conditions for Automatically Stopping the Engine.

1) Conditions for Retaining Braking Force

Conditions under which the braking force retaining unit RU retains the braking force will be described. The braking force is retained (FIG. 15A) when all of the following four conditions are satisfied.

I) Brake switch BSW is ON;

II) Running range is any range other than Neutral (N-range), Parking (P-range) and Reverse (R-range);

III) Operation of the braking force retaining unit RU is permitted; and

IV) Vehicle speed is 0 km/h.

When all the these conditions are satisfied, both the servo valves LSV are ON (to the closed position), thereby retaining the braking force.

The above conditions for retaining the braking force will be described individually.

I) "Brake switch BSW is ON". This is a condition because no braking force or a small braking force will be retained within the wheel cylinders WC.

II) "Driving range is any range other than Neutral (N-range), Parking (P-range) and Reverse (R-range)". This is a condition for canceling unnecessary operation of the braking force retaining unit RU in the N-range or P-range, and in the R-range, for preventing the vehicle from unintentional backward displacement with the aid of the driving force in the strong creep condition because the strong creep condition is kept in the R-range. Therefore, the braking force is retained while the driving range is in the D-range (Drive range) or L-range (Low range).

III) "Operation of the braking force retaining unit RU is permitted". This is a condition for reminding the driver to sufficiently depress the brake pedal BP before retaining the braking force so that the unintentional backward displacement of the vehicle on a slope can be prevented. Because the sufficient driving force is obtained in the strong creep condition such that the vehicle can stand still on a slope at an inclination angle of 5 degrees, the driver often does not sufficiently depress the brake pedal BP. Meanwhile, in the weak creep condition and the middle creep condition, the driving force is not sufficient for keeping the vehicle still on a slope having an inclination angle of 5 degrees. Therefore, by weakening the driving force, the driver is reminded to forcefully depress the brake pedal BP to retain a sufficient braking force to prevent backward displacement on the slope, even if the driving force lowers or disappears. The control logic for permitting the operation of the braking force retaining unit RU will be described later.

IV) "Vehicle speed is 0 km/h". This is a condition because the driver can not select the position for parking the vehicle if the servo valves LSV are in the closed position while the vehicle is running. Meanwhile, because the vehicle stops while the vehicle speed is 0 km/h, the braking force can be retained without causing any problems while driving. The "vehicle speed of 0 km/h" also includes a condition just before the vehicle stops.

2) Conditions Required for Permitting Operation of Braking Force Retaining Unit

Figure 15A:
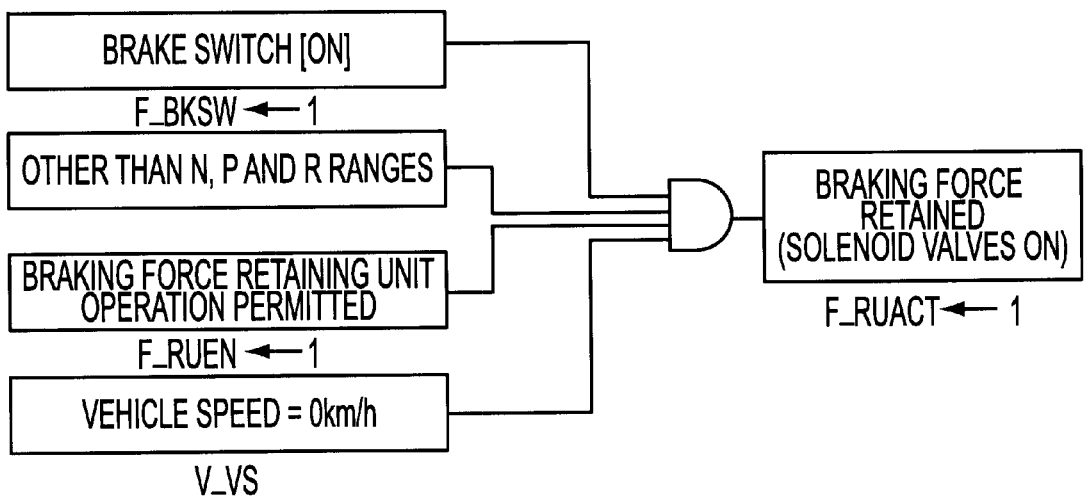
FIG. 15A shows the logic for retaining braking force.
Figure 15B:
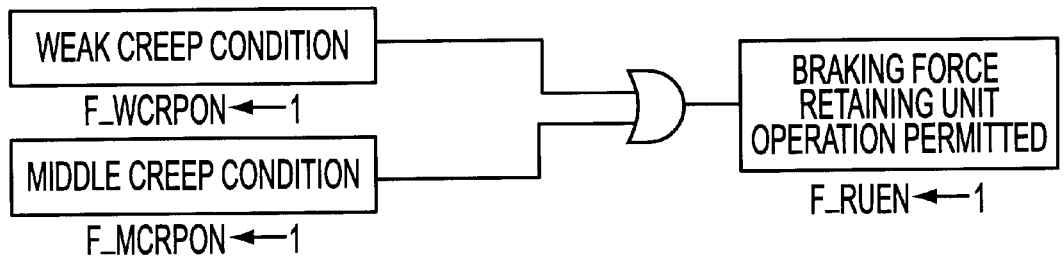
FIG. 15B shows the logic for permitting the operation of the braking force retaining unit.

The condition required for permitting the operation of the braking force retaining unit RU or one condition for retaining the braking force will be described. As shown in FIG. 15B, the operation of the braking force retaining unit RU is permitted while the driving force is either in the weak creep condition or in the middle creep condition. In the weak creep condition and the middle creep condition, the driving force is not sufficient to prevent the backward displacement of the vehicle even on a slope having an inclination angle of 5 degrees. For this reason, the driver is forced to depress the brake pedal BP properly for the slope before retaining the braking force to retain sufficient braking force to prevent the backward displacement of the vehicle. The driving force in the weak creep condition or in the middle creep condition is determined based on a hydraulic pressure command value to the hydraulic pressure control valve (FIG. 1) for controlling the hydraulic pressure of the starting clutch of CVT 3.

3) Conditions Required for Weak Creep Order

The conditions for transmitting the weak creep order will be described. The weak creep order (F_WCRP) is transmitted (FIG. 16A) when the following conditions or II) is satisfied:

I) Transmission is set in the N-range or P-range (N/P range); or

II) Both of the following two conditions are satisfied:
(1) the braking force retaining unit RU is normal, and (2) the brake switch BSW is ON, (3) the advance range (D-range/L-range) is selected, and (4) the vehicle speed is 5 km/h or lower; and
(5) The vehicle speed, after having switched to the strong creep condition, is >5 km/h and the vehicle speed is >4 km/h, or (6) the driving force is in the weak creep condition, or (7) the vehicle speed is 0 km/h, the driving force is in the middle creep condition, and a certain time has passed after having switched to the middle creep condition.

When one of the above conditions I) or II) is satisfied, the weak creep order is transmitted, and the driving force is switched to the weak creep condition.

The above conditions are individually determined at the driving force control unit DCU. As mentioned above, the reason for switching the driving force to the weak creep condition is to remind the driver to depress the brake pedal BP properly based on the slope to prevent the unintentional backward displacement of the vehicle while the vehicle stops on the slope, as well as for improving the vehicle's fuel consumption.

The aforementioned conditions for transmitting the weak creep order will be individually described.

I) When "the transmission is set in the N-range or P-range", the driving force is always switched to the weak creep condition. This is a condition because if the transmission is switched from a non-driving range (N-/P-range) to a driving range (D-/L-/R-range) and at the same time the accelerator pedal is quickly depressed, the driving force transmission capacity of the starting clutch can be instantly increased, allowing a smooth starting operation of the vehicle. In the weak creep condition, because the pressure oil has been filled in an oil pressure chamber of the starting clutch, there is no clearance or play for the advance stroke of the piston enforcing the clutch. Therefore, the driving force transmission capacity is instantly increased by increasing the pressure value of the pressure oil.

The driving force is switched to the weak creep condition when the transmission is set in the N- or P-range. This is for previously changing the driving force transmission capacity of the starting clutch to the capacity at the weak creep condition. However, the driving force from engine 1 is not transmitted to driving wheels 8. This is distinguished from the weak creep condition while the transmission is set in the D-/L-range. In the N-/P-range, the connection between the engine and driving wheels 8 is completely cut by a forward/reverse movement switching mechanism arranged in series with the starting clutch on a driving force transmission path. Because neither a transmission path for the forward movement nor a transmission path for the reverse movement is provided in the N-/P-range, the driving force from engine 1 is not transmitted to the driving wheels 8.

II) Conditions (1) to (4) are basic requirements for switching to the weak creep condition. Conditions (5) to (7) indicate conditions of the vehicle before switching to the weak creep condition.

(1) "The braking force retaining unit RU is normal". This is a condition because the braking force is not retained if the braking force retaining unit RU is out of order. Because sufficient driving force is not obtained in the weak creep condition, the vehicle will displace backwards on a slope. If the weak creep order is transmitted and driving force is switched to the weak creep condition, regardless of abnormal conditions of the vehicle, i.e., the servo valves LSV are not switched to the closed position, brake fluid pressure (or braking force) is not retained within the wheel cylinders WC after the brake pedal BP was released from the depression. Therefore, if the driver releases the brake pedal BP upon starting on the slope while believing that the braking force retaining unit RU will work, the braking force is suddenly lost, and the vehicle may displace backwards. When the driving force in the strong creep condition after the brake pedal BP is released is set to be low assuming the action of the braking force retaining unit RU, backward displacement can easily occur unless the braking force can be retained. A smooth starting operation (on an up slope) without the unintentional backward displacement of the vehicle is therefore facilitated by the strong creep condition.

(2) "The brake switch BSW is ON". This is a condition because the driver does not demand a reduction in the driving force when the brake pedal BP is not depressed.

(3) "An advance range (D-/L-range) is selected". This is a condition for improving the vehicle's fuel consumption while an advance range is selected. When the positioning switch PSW selects the D-range, the driving force is switched to the weak creep condition, notwithstanding the position (D-mode/S-mode) of the mode switch MSW. However, in the R-range, the driving force is not switched to the weak creep condition. This facilitates steering operations of the vehicle in a garage with the vehicle being kept in the strong creep condition.

(4) "The vehicle speed is 5 km/h or lower". This is a condition because the driving force of the driving wheels 8 is transmitted to engine 1 or motor 2 through the starting clutch of CVT 3 to obtain an engine brake or carry out power regeneration by motor 2.

(5) "The vehicle speed after having switched to the strong creep condition is >5 km/h and the vehicle speed is >4 km/h". This is a condition because switching to the weak creep condition is carried out simply by deceleration due to the continued application of the brakes.

Because the difference of the driving force is greater between the strong creep condition and the weak creep condition, the driver may experience an unintentional strong deceleration if the driving force is switched from the strong creep condition to the weak creep condition by depressing the brake pedal BP. Also, the vehicle may displace backwards momentarily if the vehicle stops on a slope. Under these circumstances, it is preferable that the switching operation from the strong creep condition to the weak creep condition not be carried out. To this end, once switched to the weak creep condition, the driving force is not changed to the weak creep condition until the throttle is OFF (the accelerator pedal depression is released) over a vehicle speed of 5 km/h and the driving force is switched to the strong creep condition for driving. The vehicle speed may decrease to 5 km/h, after having switched to the strong creep condition, without depressing the brake pedal BP even if the vehicle has once achieved speeds of over 5 km/h and then the driving force is decreased (strong creep condition for driving). For example, when the vehicle moves on an up slope, the vehicle speed may decrease without depressing the brake pedal BP. Under these circumstances, because the brake switch BSW is OFF, the driving force is switched to the strong creep condition when the vehicle speed decreases to 5 km/h. In order to cancel a successive switching operation from the strong creep condition to the weak creep condition, a further condition, i.e., vehicle speed is >4 km/h is required. The switching operation to the weak creep condition is not carried out unless the brake pedal BP is depressed when the vehicle speed again decreases to 5 km/h. If the brake pedal BP is depressed (the brake switch BSW [ON]) when the vehicle speed again decreases to 5 km/h, the driving force is switched from the strong creep condition for driving to the weak creep condition. In other words, if the driving force is not changed to the weak creep condition when the vehicle speed again decreases to 5 km/h (the vehicle speed=5 km/h), the strong creep condition is retained as long as the vehicle speed is 5 km/h or lower.

(6) "The driving force is in the weak creep condition". This is a condition because once switched to the weak creep condition, the weak creep condition is retained regardless of conditions (5) and (7). According to condition (5), the driving force is switched to the weak creep condition when the vehicle speed becomes 5 km/h. However, if the vehicle speed is less than 5 km/h, condition (5) is not satisfied. The weak creep condition is not retained merely by condition (5) if the vehicle speed is under 5 km/h. As a result, the condition of "the driving force is in the weak creep condition" is required to retain the weak creep condition when the vehicle speed is under 5 km/h.

(7) The vehicle speed is 0 km/h, the driving force is in the middle creep condition, and a certain time has passed after having switched to the middle creep condition. This is a condition because deteriorating fuel consumption and vehicle body vibration, while the vehicle stops in the strong creep condition, are prevented with the driving force being switched to the weak creep condition. The strong creep condition is retained if the driving force is not changed to the weak creep condition when the vehicle speed again decreases to 5 km/h (the vehicle speed=5 km/h) (based on condition (5)), or if the vehicle speed of 5 km/h or lower is retained after having switched to the strong creep condition by way of releasing the brake pedal BP while being in the weak creep condition. However, if the vehicle stops in the strong creep condition with the brake pedal BP being depressed, fuel consumption can deteriorate, and the vehicle vibration remains. For this reason, when the vehicle stops completely (the vehicle speed=0 km/h), the driving force is switched to the middle creep condition, in which the driving force is between the strong creep condition and the weak creep condition, and thereafter, if a certain time (e.g., 300 msecs) has passed, the driving force is further switched to the weak creep condition. Because the braking force due to the brake pedal BP depression increases while the driving force is stepwise reduced from the strong creep condition to the middle creep condition and further to the weak creep condition, the momentary displacement of the vehicle on an up slope is made as small as possible.

4) Conditions required for Strong Creep Condition for Driving

Figure 16A:
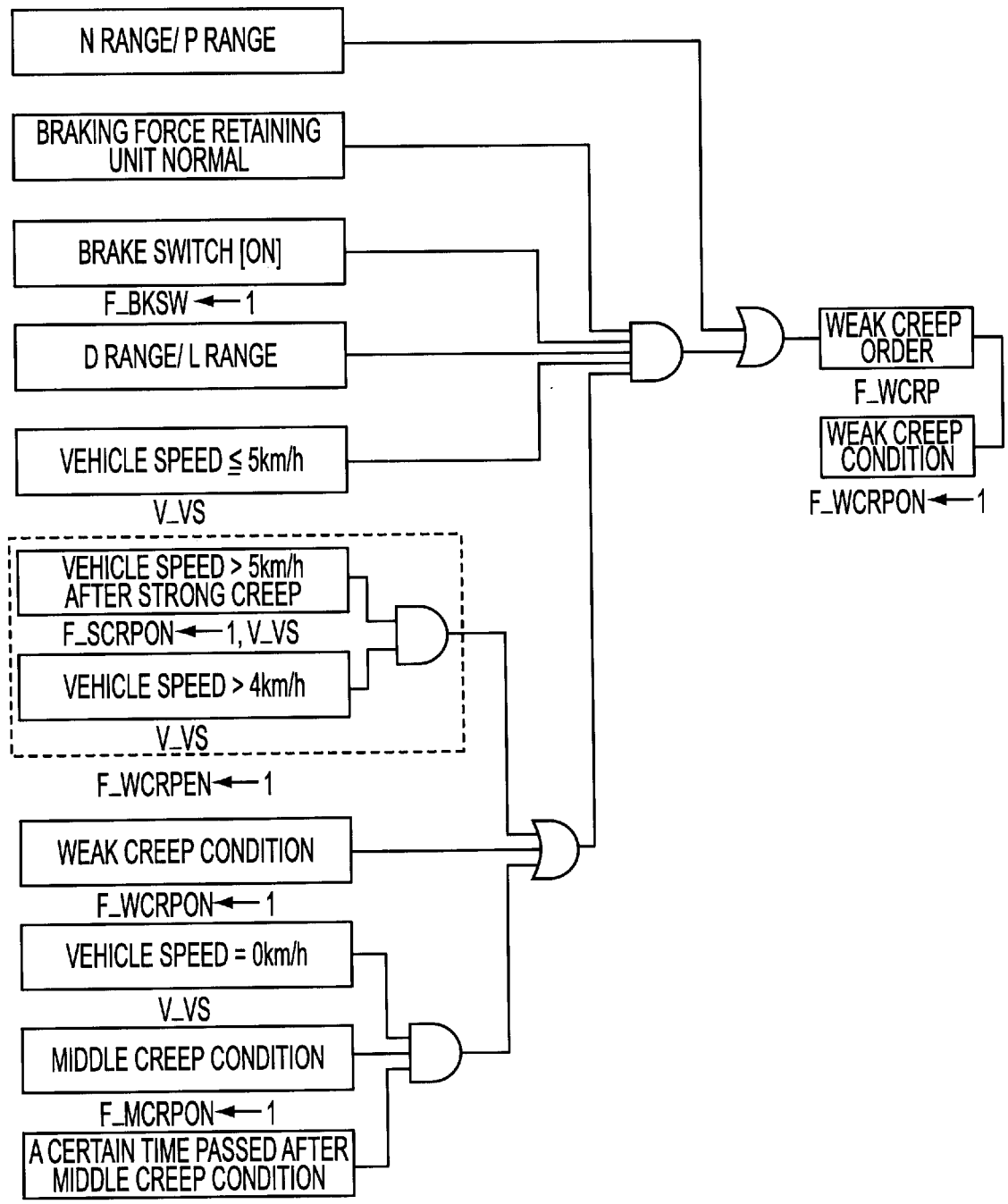
FIG. 16A shows the control logic for establishing a weak creep condition.
Figure 16B:
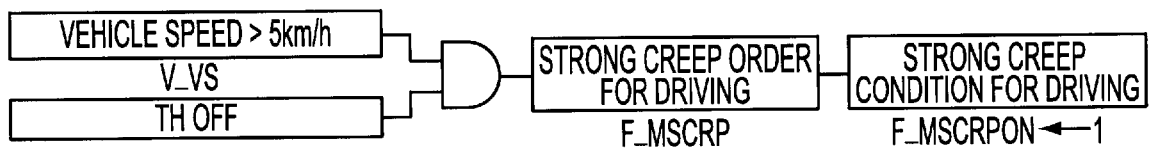
FIG. 16B shows the control logic for establishing a strong creep condition for driving.
Figure 16C:
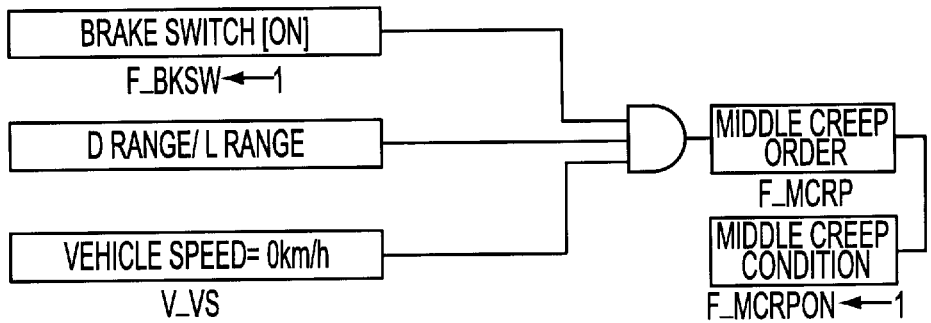
FIG. 16C shows the control logic for establishing a middle creep condition, respectively.

The conditions for the strong creep condition for driving will be described. The strong creep order for driving (F_MSCRP) is transmitted when both of the following two conditions I) and II) are satisfied (FIG. 16B). After the strong creep order when the vehicle is running, the strong creep condition is established.

I) Vehicle Speed >5 km/h; and

II) Throttle is OFF (Accelerator pedal is released).

These conditions are determined at the driving force control unit DCU. One reason for switching the driving force to the strong creep condition for driving is to prevent a strong deceleration of the vehicle before stopping due to the switching operation from the strong creep condition to the weak creep condition. The driving force is switched to the strong creep condition for driving, which is weaker than the strong creep condition, in advance of switching to the weak creep condition.

The aforementioned conditions for transmitting the strong creep condition for driving will be individually described.

I) "Vehicle speed >5 km/h". This is a condition because the switching operation from the strong creep condition to the weak creep condition is carried out when the vehicle speed is over 5 km/h at least once after the strong creep condition, and then the vehicle speed becomes 5 km/h. This also discriminates the strong creep condition at the vehicle speed of 5 km/h or lower from the strong creep condition for driving over the vehicle speed of 5 km/h.

II) "Throttle is OFF (TH OFF)". This a condition because, since the driver does not intend to further increment the driving force, the driving force may decrease without any problem.

5) Conditions required for Middle Creep Condition

Conditions required for the middle creep condition will be described. When the following three conditions I), II) and III) are satisfied, a middle creep order (F_MCRP) is transmitted (FIG. 16C):

I) Brake switch BSW is ON;

II) Advance range (D-/L-range) is selected; and

III) Vehicle is fully stopped (vehicle speed=0 km/h).

These conditions are determined at the driving force control unit DCU. The strong creep condition is retained if the driving force is not changed to the weak creep condition when the vehicle speed again decreases to 5 km/h (vehicle speed=5 km/h) or if the vehicle speed of 5 km/h or lower is retained after having switched to the strong creep condition by way of releasing the brake pedal BP while being in the weak creep condition. However, if the vehicle remains stopped in the strong creep condition, fuel consumption deteriorates, and vehicle vibration continues. For this reason, the middle creep condition is required. As previously mentioned, in order to prevent the momentary backward displacement of the vehicle, which is due to switching from the strong creep condition to the weak creep condition while the vehicle stops, the driving force is switched to the middle creep condition.

The aforementioned conditions for transmitting the middle creep order will be individually described.

I) "The brake switch BSW is ON". This is a condition because the driver does not intend to reduce the driving force when the brake pedal BP is not depressed.

II) "The advance range (D-/L-range) is selected". This a condition because it is necessary to switch to the middle creep condition while an advance range is selected because the driving force is switched to the weak creep condition while the positioning switch is set in the D-range or L-range. Switching to the middle creep condition is not necessary in the N-/P-range because the weak creep condition is selected as soon as the transmission is switched. Also, switching to the middle creep condition is not necessary in the R-range because the strong creep condition is retained in the R-range.

III) "The vehicle is fully stopped (the vehicle speed=0 km/h)". This is a condition because the driving force is switched to the weak creep condition to prevent deteriorated fuel consumption and vehicle vibration while the vehicle stops in the strong creep condition. The middle creep condition is required as a transitional condition to the weak creep condition. In this transient state, the middle creep condition is necessary.

The determination whether or not the driving force is in the weak creep condition, the strong creep condition for driving or the middle creep condition is made based on the hydraulic pressure command value to the starting clutch of CVT 3.

6) Conditions for Automatically Stopping the Engine

Figure 17:
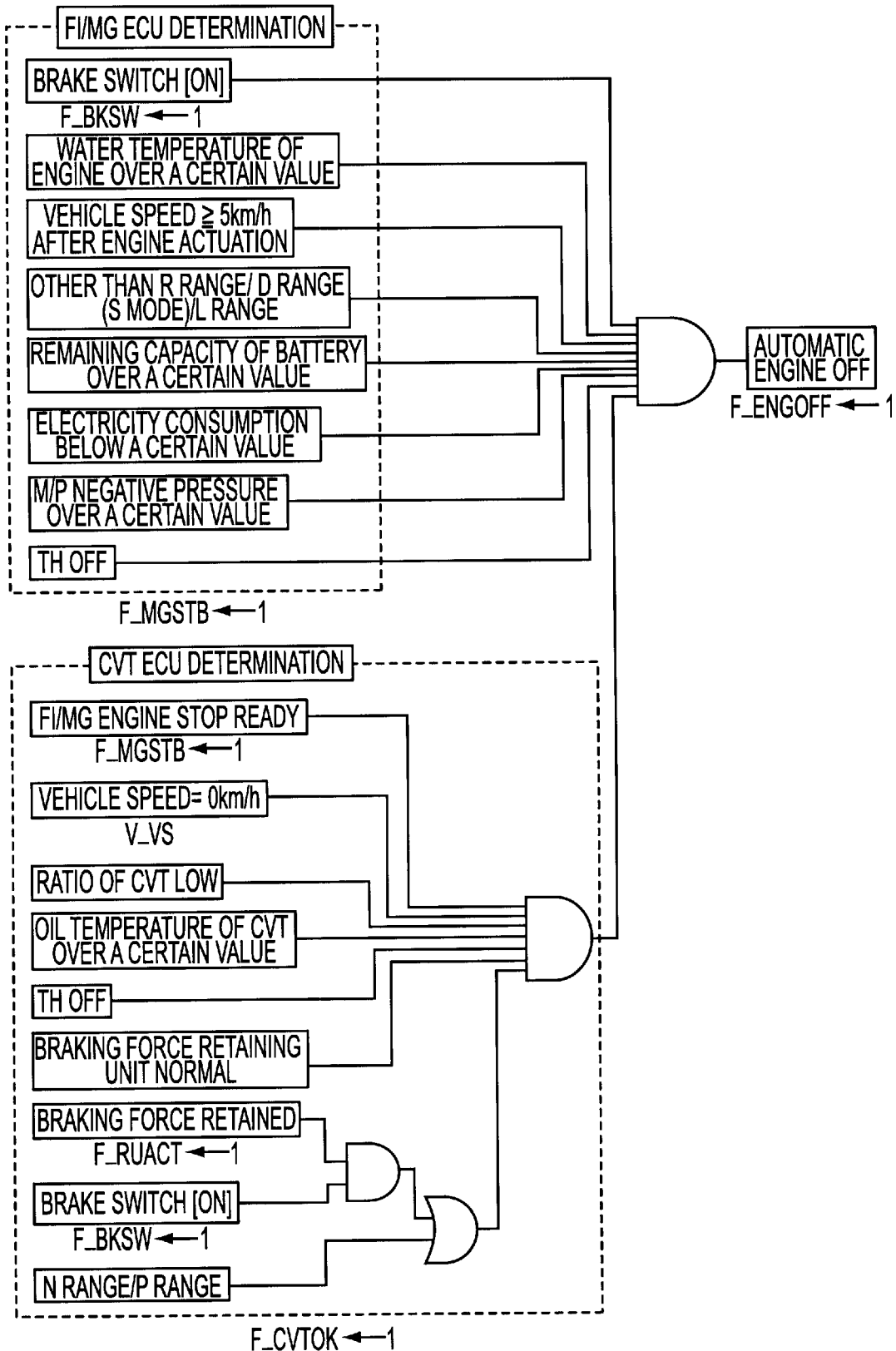
FIG. 17 shows the control logic for automatically stopping an engine of a driving motor stopping unit to be mounted on the vehicle of FIG. 13.

For the purpose of further improving fuel consumption, engine 1 is automatically stopped while the vehicle stops. Conditions for automatically turning off engine 1 will be described. When all the conditions shown in FIG. 17 are satisfied, an engine stop order (F_ENGOFF) is transmitted, and engine 1 is automatically stopped. The automatic engine stop operation of engine 1 is carried out by the driving motor stopping unit. Therefore, the following automatic engine stop conditions are determined at the driving motor stopping unit. Specifically, the automatic engine stop conditions are determined at FI/MGECU 4 and CVTECU 6. When FI/MGECU 4 determines that all the conditions I) to VIII) are satisfied, F_MGSTB becomes 1. When CVTECU 6 determine that all the conditions IX) to XV) are satisfied, F_CVTOK becomes 1.

Conditions for automatically stopping the engine will be individually described.

I) "Brake switch BSW is ON". This is a condition for warning the driver. The driver places his foot on the brake pedal BP when the brake switch BSW is ON. Therefore, if engine 1 is stopped and driving force is lost, the driver can easily increase the brake pedal load before the vehicle unintentionally displaces backward on a slope.

II) "Water temperature of the engine is over a certain value". This is a condition because the actuation/stop operation of engine 1 should be carried out when engine 1 is in a stable condition. In cold areas, if the water temperature is low, engine 1 may not restart.

III) "Vehicle speed reaches 5 km/h at least once after an engine actuation". This is a condition for facilitating steering operations in a garage while the vehicle is moving in the creep running. Steering operations in a garage are time-consuming if engine 1 is stopped whenever the vehicle stops when changing steering directions.

IV) "Positioning switch selects a range other than the R-range/D-range (S-mode)/L-range, i.e., positioning switch selects the N-range/D-range(D-mode)/P-range". This is a condition for the following reasons. Steering operations in a garage while selecting the R-range or L-range are time-consuming if engine 1 is stopped whenever the vehicle stops when changing steering directions. When the positioning switch PSW selects the D-range and the mode switch MSW selects the S-mode, the driver is expecting a quick start vehicle operation.

V) "Capacity of the battery is over a certain value". This a condition because if the remaining capacity of the battery is not enough to restart engine 1, the motor cannot actuate engine 1 after having stopped the engine.

VI) "Electricity consumption is below a certain value". This is a condition for securing a sufficient electric supply to loads.

VII) "Load on the constant pressure chamber of the master power MP is over a certain value". This is a condition because the lower negative pressure in the constant pressure chamber of the master power MP, the smaller the amplification of the brake load when the brake pedal BP is depressed, which leads to deteriorated braking performance (with no assist). Because a negative pressure in the constant pressure chamber is obtained from the intake pipe of engine 1, the negative pressure in the constant pressure chamber becomes far lower if engine 1 is stopped at a lower negative pressure. This leads to reduced amplification of the brake load when the driver depresses the brake pedal BP, and hence results in deteriorated braking performance.

VIII) "Accelerator pedal is not depressed (TH OFF)". This is a condition because since the driver does not intend to further increment the driving force, engine 1 may be automatically stopped.

IX) "All the automatic engine stop conditions at FI/MGECU 4 are satisfied". This is a condition because if all the engine stop conditions determined at FI/MGECU 4 are not satisfied, it is not preferable to carry out the automatic engine stop operation.

X) "Vehicle speed is 0 km/h". This is a condition because the driving force is not required when the vehicle stops.

XI) "Ratio of the CVT is low". This is a condition because a smooth starting operation of the vehicle does not occur unless the ratio of the CVT (pulley ratio) is low.

XII) "Oil temperature of the CVT is over a certain value". This is a condition because if the oil temperature of CVT 3 is low, a start-up for the hydraulic pressure of the starting clutch will cause a delay. Therefore, the required time from engine actuation to the strong creep condition is extended, and the vehicle will displace backwards on a slope.

XII) "Accelerator pedal is not depressed (TH OFF)". This is a condition because since the driver does not intend to further increment the driving force, engine 1 may be automatically stopped.

XIV) "Braking force retaining unit RU is normal". This is a condition because since the braking force may not be retained if the braking force retaining unit RU is out of order, the strong creep condition is kept to prevent the vehicle from unintentional backward displacement.

XV) "[1] Braking force is retained (servo valves LSV are in the shut-of position), and Brake switch BSW is ON] or [2) in the N-range/P-range]". This is a condition for the following reasons.

1) As long as the braking force is retained, the vehicle does not displace backwards on a slope even if engine 1 is automatically stopped, and the driving force is lost. Further, when the brake switch BSW is ON, the driver places his foot on the brake pedal BP. Therefore, if engine 1 is stopped and driving force is lost, the driver can easily increase the brake pedal load before the vehicle unintentionally displaces backwards on a slope.

2) If the vehicle stops with the positioning switch PSW selecting the P-range or N-range, the driver intends to pull up the vehicle. Therefore, engine 1 may be automatically stopped. In this condition, engine 1 is automatically stopped, even if the braking force retaining unit RU is not actuated.

Specific Controls at Vehicle Starting Time

The conditions under which the vehicle starts are as follows and will be described in detail individually below: 1) Conditions for Releasing Retained Braking Force; 2) Requirement for Determining Creep Rising Condition; 3) Conditions Required for Strong Creep Order; and 4) Conditions for Automatically Actuating the Engine.

1) Conditions for Releasing Retained Braking Force

Figure 18A:
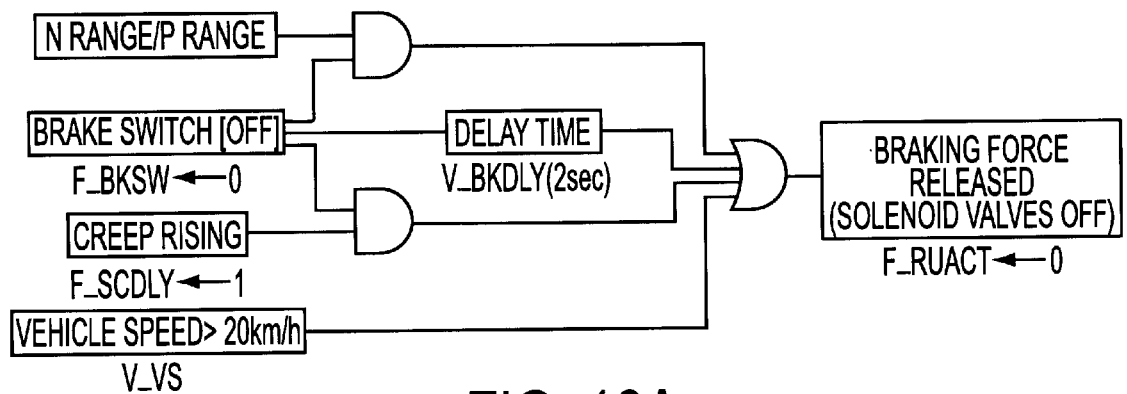
FIG. 18A shows the control logic for releasing the retained braking force.
Figure 18B:
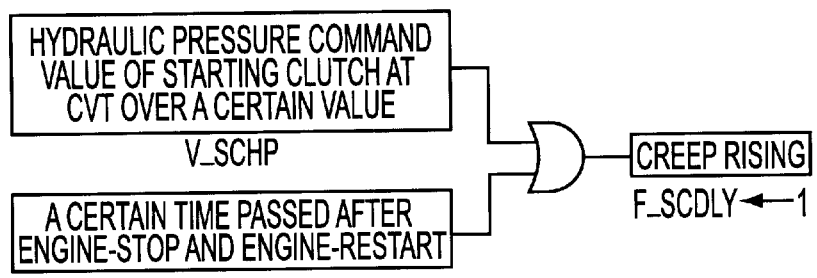
FIG. 18B shows the control logic for determining a creep rising condition, respectively.

The conditions under which the braking force retaining unit RU releases the retained braking force will be described. As shown in FIG. 18A, the retained braking force is released when any of the following conditions is satisfied:

I) Positioning switch PSW selects the N-range/P-range, and Brake switch BSW is OFF;

II) A certain delay time has passed after the brake switch BSW became OFF;

III) Creep driving force has risen, and Brake switch BSW is OFF; and

IV) Vehicle speed is over 20 km/h.

When any of these conditions is satisfied, the servo valves LSV are in the communicating position for releasing the braking force.

The conditions for releasing the retained braking force will be individually described.

I) "The positioning switch PSW selects the N-range/P-range, and the brake switch BSW is OFF". This is a condition for eliminating unnecessary operation of the braking force retaining unit RU.

II) "A certain delay time has passed after the brake switch BSW became OFF". This is a condition because it is not preferable, as a fail-safe action, that the braking force be permanently retained after having released the brake pedal BP, and brake dragging occurs. In the preferred embodiment, the delay time (TMBKDLY) in the present embodiment is about 2 secs after having released the brake pedal BP (after the brake switch BSW was OFF).

III) "The creep driving force has risen, and the brake switch BSW is OFF". This is a condition because in this condition, the driving force is increasing to the strong creep condition but has not yet reached the strong creep condition. On an up slope, however, the backward displacement can be restricted considering the inertial force and the rolling resistance (or the driving force in the increasing procedure), and in a down slope, the vehicle can be started without moving abruptly.

IV) "The vehicle speed is over 20 km/h". This is a condition for eliminating unnecessary brake dragging as a fail-safe action.

When the retained braking force is released by turning OFF the brake switch BSW for I) to III) but not IV), the current value of the control current fed to the servo valves LSV is gradually reduced when the brake switch BSW is turned off, thereby reducing and releasing the braking force gradually. If the "N-/P-range" is selected, if the "delay time" passes or if the "creep rises" with the braking force being gradually reduced and released, moreover, the current value of the control current fed to the servo valves LSV is reduced all at once to release the retained braking force all at once.

2) Requirement for Determining Creep Rising Condition

The requirements for determining a creep rising condition or one condition for releasing the retained braking force will be described. When any of the following conditions I) or II) is satisfied, it is determined that the creep driving force has risen (FIG. 18B):

I) Hydraulic pressure command value of the starting clutch at CVT 3 is over a certain value; or II) A certain time has passed after engine 1 was automatically stopped and then restarted.

These two conditions are determined at the driving force control unit DCU. In the creep rising condition, the driving force has been increased to such an extent that the backward displacement of the vehicle on an up slope is prevented considering the inertial force and the rolling resistance (or the driving force in the increasing procedure) of the vehicle, even if the operation of the braking force retaining unit RU is disengaged and no braking force is retained. The creep rising condition also includes a condition allowing a slight backward displacement of the vehicle, as long as the increasing of the driving force minimizes the backward displacement of the vehicle.

The requirements for determining the creep rising conditions will be individually described.

I) "Hydraulic pressure command value of the starting clutch at CVT 3 is over a certain value". This is a condition because when the hydraulic pressure command value of the starting clutch at the CVT 3 is over a certain value, the driving force has been increased to such an extent that the backward displacement of the vehicle is prevented on an up slope even if the retained braking force is released. On a down slope, on the other hand, the vehicle can be started smoothly without moving abruptly. The condition "the hydraulic pressure command value over a certain value" indicates that the hydraulic pressure command value—it is transmitted to the hydraulic pressure control valve (or the linear solenoid valve, as shown in FIG. 1), which controls the hydraulic pressure for the engaging force of the starting clutch—has been increasing to a middle value between the weak creep condition and the strong creep condition, in the process of switching from the weak creep condition to the strong creep condition.

II) "A certain time has passed after engine 1 was automatically stopped and then restarted". This is a condition because if the retention of the braking force is released, the driving force has been increased to such an extent as to restrict the backward displacement of the vehicle on an up slope. On a down slope, on the other hand, the engine can be started smoothly without creating an abrupt feel. The time-counting is initiated when engine 1 is automatically restarted. The pressure oil has been discharged from the oil pressure chamber of the starting clutch at CVT 3 while the engine is stopped. Therefore, a clearance or play exists for the advance stroke of the piston enforcing the clutch when engine 1 is actuated and the pressure oil supply is initiated. For this reason, the hydraulic pressure command value to the hydraulic pressure control valve of the starting clutch does not correspond to the actual hydraulic pressure value (the driving force transmission capacity). When the driving force increases from the engine stop condition, it is impossible to determine the creep rising condition based on the hydraulic pressure command value of the starting clutch. As a result, the creep rising condition is determined when a timer (or a creep rising timer) counts a certain time period after the pressure oil is supplied to the starting clutch was initiated.

3) Conditions required for Strong Creep Order

Conditions for the strong creep order will be described. The strong creep order (F_SCRP) is transmitted when any of the following two conditions shown in FIGS. 19A and 19B is satisfied.

Figure 19A:
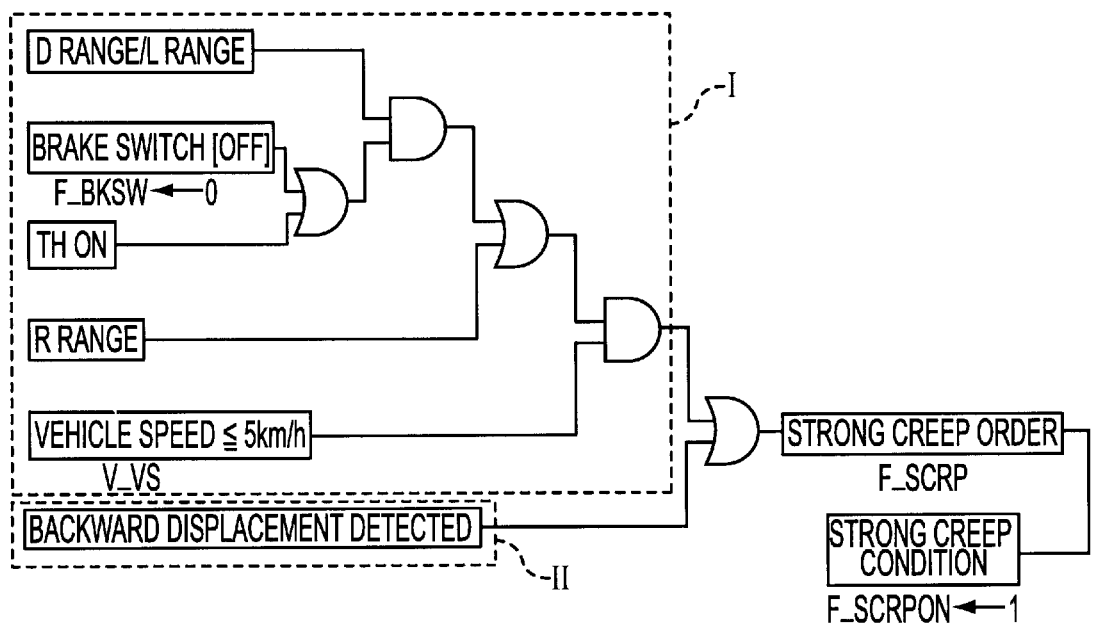
FIGS. 19A and 19B show the control logic for establishing the strong creep condition. Here.
Figure 19B:
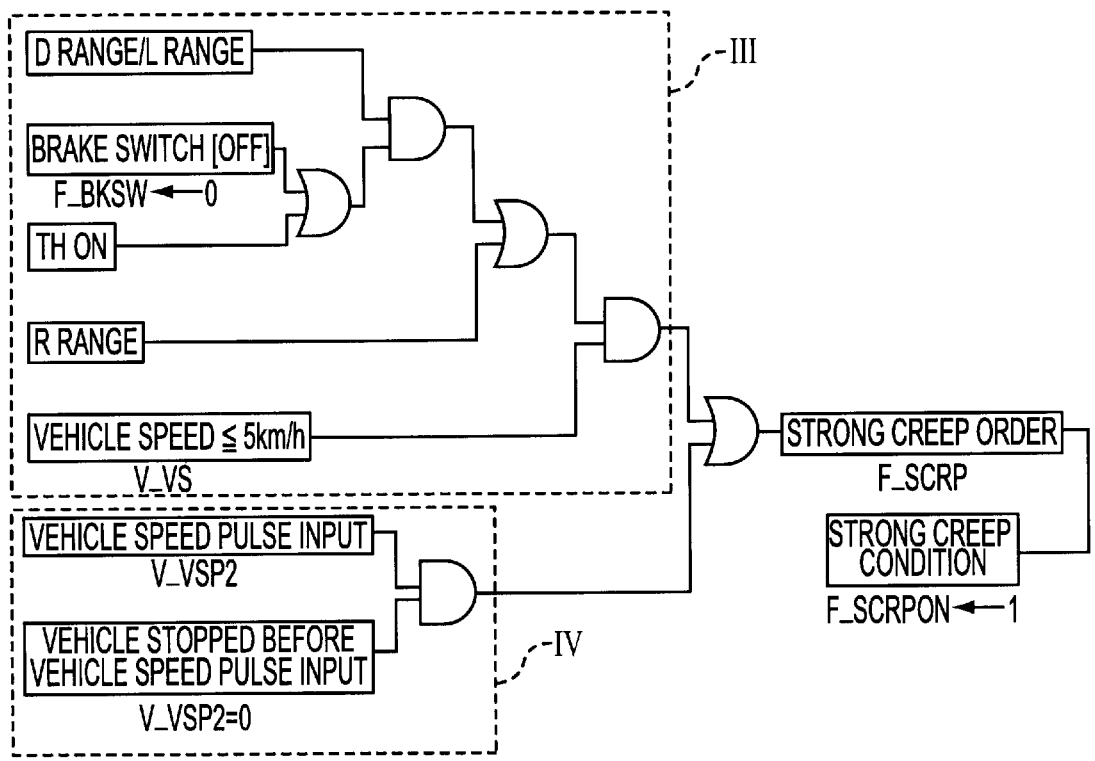

The first condition required for the strong creep order is that either I) or II) is satisfied (FIG. 19A).

I) [(1) Brake switch is OFF or Throttle is ON, and Advance range (D-/L-range) is selected] or [(2) Reverse (R-) range is selected] and (3) Vehicle speed is 5 km/h or lower.

II) Backward displacement of the vehicle is detected.

Alternatively, the second condition required for transmitting the strong creep order is that either of the following two conditions III) or IV) is satisfied (FIG. 19B).

III) [(1) Brake switch is OFF or Throttle is ON, and Advance range (D-/L-range) is selected] or [(2) Reverse (R-) range is selected] and (3) Vehicle speed is 5 km/h or lower.

IV) Vehicle speed pulse is inputted, and Vehicle is fully stopped before the input of the vehicle speed pulse.

In the first and second conditions required for the strong creep order, I) and III) are identical, while II) and IV) are different. Therefore, the explanation of condition III) is omitted. These conditions I) to IV) are determined at the driving force control unit DCU.

The conditions for transmitting the strong creep order will be individually described.

First individual conditions 1) to 3) of I) will be described (although the content of III) will be omitted).

(1) "The brake switch is OFF or the throttle is ON, and the advance range (D-/L-range) is selected". This is a condition because, since the driver initiates a starting operation, the driving force is changed to the strong creep condition. The driver intends to start the vehicle because the positioning switch PSW is set in the D-range or L-range, and further, the brake pedal BP depression is released, or instead, the accelerator pedal is depressed. Therefore, the driving force is switched from the weak creep condition to the strong creep condition.

When the accelerator pedal is depressed, the driving force transmission capacity increases, even after having reached the greater driving force transmission capacity, i.e., a capacity that allows the transmission of all the driving force generated at the driving motor (or the condition greater than the greater driving force transmission capacity). However, the flag showing the strong creep condition (F_SCRPON) is kept until another flag rises.

(2) "Reverse (R-) range is selected". This is a condition for ensuring smooth creep driving in the R-range. When the positioning switch PSW is set in the R-range, the driver expects a steering operation in a garage with the driving force being switched to the strong creep condition. Therefore, the driving force is switched from the weak creep condition to the strong creep condition.

(3) "The vehicle speed is 5 km/h or lower". This is a condition because the strong creep condition for driving at a vehicle speed over 5 km/h can be distinguished from the strong creep condition at a vehicle speed of 5 km/h or lower.

II) "Backward displacement of the vehicle is detected". This is a condition because when the vehicle starts to displace backwards on a steep slope with the backward displacement force derived from the vehicle's own weight being greater than the braking force, the driving force in the strong creep condition prevents the backward displacement of the vehicle. When the vehicle stops on an up slope, the total amount of the driving force in the weak creep condition (driving force is zero if engine 1 is automatically stopped), and the braking force, resists the backward displacement force of the vehicle. However, at a greater inclination angle of the slope, the backward displacement force becomes greater, and the vehicle starts to displace backwards on the steep slope with the backward displacement force being greater than the total amount of the driving force in the weak creep condition and the braking force. For this reason, when the backward displacement of the vehicle is detected, the driving force is switched from the weak creep condition to the strong creep condition in any circumstances to generate sufficient driving force against the slope.

Figure 20A:
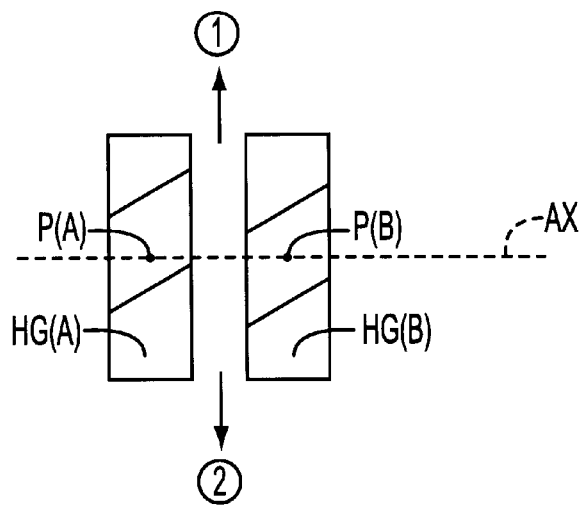
FIG. 20A shows a construction thereof.
Figure 20B:
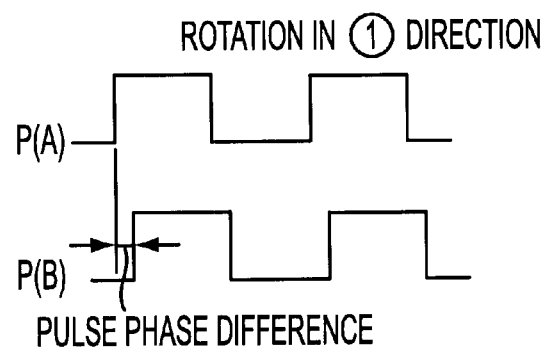
FIG. 20B shows a pulse phase of the rotation in a direction ① of FIG. 20A.
Figure 20C:
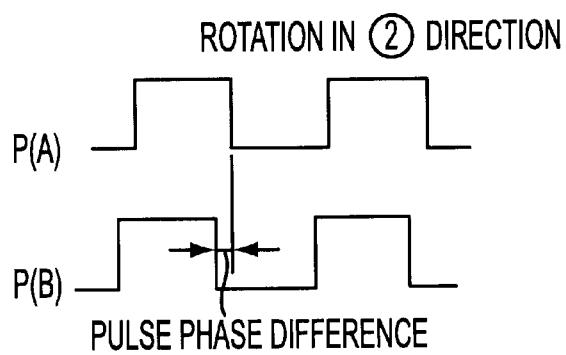
FIG. 20C shows a pulse phase of the rotation in a direction ② of FIG. 20A, respectively.

With reference to FIG. 20, a means for detecting backward displacement of the vehicle will be described. For example, helical gears HG(A), HG(B) are provided downstream of the starting clutch of CVT 3. The helical gears HG(A), HG(B) may be provided at any position as long as they are rotatable with the tires. As shown in FIG. 20A, the teeth of the helical gears HG(A), HG(B) are positioned in helical and diagonal relation around the periphery of the gears. The phase of the gear teeth shifts with the rotation of the helical gears HG(A), HG(B) in directions ⓪ and ②. To this end, electromagnetic pickups P(A), P(B) are provided on the respective helical gears HG(A), HG(B) to align in the same axis AX of the helical gears. The electromagnetic pick-ups P(A), P(B) detect the front ends of the gear teeth. The direction of rotation is obtained from the pulse phase difference based on the two pulses detected at the electromagnetic pick-ups P(A), P(B). As best seen in FIG. 20B, when the helical gears HG(A), HG(B) rotate in direction ①, the pulse detected at the electromagnetic pick-up P(B) shifts back from that detected at the electromagnetic pick-up P(A). In other words, the front ends of the gear teeth of the helical gear HG(A) are detected before those of the gear teeth of the helical gear HG(B). Meanwhile, when the helical gears HG(A), HG(B) rotate in direction ②, the pulse detected at the electromagnetic pick-up P(B) shifts forward to that detected at the electromagnetic pick-up P(A) (FIG. 20C). In other words, the front ends of the gear teeth of the helical gear HG(A) are detected after those of the gear teeth of the helical gear HG(B). Therefore, the direction of rotation is detected in terms of the pulse phase difference. Assuming that rotation in direction ① indicates backward displacement of the vehicle, the backward displacement is determined by the relative positions of the two pulses obtained from the electromagnetic pick-ups P(A), P(B) mentioned above. Any known gears other than the helical gears HG(A), HG(B) may also be employed as long as their teeth have a phase difference.

IV) "A vehicle speed pulse is inputted, and the vehicle is fully stopped before the input of the vehicle speed pulse". This is a condition for the following reason. When the vehicle displaces from the fully stopped position, the backward displacement (or the possible backward displacement) of the vehicle is detected, and then the driving force is switched to the strong creep condition to keep the vehicle against the slope. Although the displacement of the vehicle is detected, a determination is not carried out to specify the direction as to whether the vehicle moves forwards or backwards. When the vehicle stops on an up slope, the total amount of the driving force in the weak creep condition (the driving force is zero if the engine 1 is automatically stopped), and the braking force resists the backward displacement force of the vehicle. However, at a greater inclination angle of the slope, the backward displacement force becomes greater, and the vehicle starts to displace forward (on a down slope) or backwards (on an up slope) with the displacement force derived from the vehicle's own weight being greater than the total amount of the driving force in the weak creep condition and the braking force. For this reason, when the forward or backward displacement (i.e., the displacement) of the vehicle is detected, the driving force is switched from the weak creep condition to the strong creep condition to generate sufficient driving force against the slope. For the purpose of detecting that the vehicle completely stops, the vehicle speed pulse of zero is detected before a vehicle speed pulse is inputted. The displacement of the vehicle is detected even from one vehicle speed pulse input. The driving force may be switched to the strong creep condition because it is not contrary to the driver's intention, even if the vehicle displaces in the same direction as the driver has intended.

Of the foregoing conditions, however, when the strong creep order is issued by releasing the brake pedal BP (or by turning OFF the brake switch BSW), it is determined whether or not the vehicle speed is at 0 km/h when the brake switch BSW is turned OFF. When the vehicle speed is at 0 km/h, moreover, the driving force value (or the target driving force value) in the strong creep condition is set in Example 1 based on the braking force when the vehicle stops, and the rate (or the target increasing rate) for the driving force to increase to the driving force value in the strong creep condition is set in Example 2 based on with the braking force at the vehicle stopping time.

4) Conditions for Automatically Actuating the Engine

After engine 1 is automatically stopped, engine 1 is automatically restarted under the following conditions. When any of the following conditions shown in FIGS. 21A and 21B is satisfied, the automatic engine actuation order (F_ENGON) is transmitted, and engine 1 is automatically actuated. The automatic engine actuation is carried out by the driving motor stopping unit. Therefore, the following automatic engine actuation conditions are determined at the driving motor stopping unit. Specifically, the automatic engine actuation conditions are determined at FI/MGECU 4 and CVTECU 6. When FI/MGECU 4 determines that any of the following conditions I) to VI) is satisfied, F_MGSTB becomes 0. When CVTECU 6 determines that any of the following conditions VII) to XI) [or VII) to X) and XII)] is satisfied, F_CVTOK becomes 0 and engine 1 is automatically actuated. When at least one of F_MGSTB and F_CVTOK becomes 0. The first condition required for the automatic engine actuation order (shown in FIG. 21A) is the same as the second condition shown in FIG. 21B, except for conditions XI) and XII) which are determined by CVTECU 6. Therefore, the explanation refers only to the second condition required for the automatic engine actuation order.

I) "Depression of the brake pedal BP is released (Brake switch BSW is OFF)". This is a condition because the determination of the starting operation is carried out when the driver releases the brake pedal BP. When the driver releases the brake pedal BP in the D-range/D-mode, the driver is considered to have initiated the starting operation. Therefore, engine 1 is automatically actuated. Meanwhile, the driver releases the brake pedal BP in the P-range or the N-range to pull off and exit the vehicle. Under these circumstances, engine 1 is automatically actuated in order to remind the driver not to exit the vehicle without turning off the ignition switch.

II) "R-range/D-range (S-mode)/L-range is selected". This is a condition because the driver intends to start the vehicle quickly if the transmission is set in the R-range/D-range (S-mode)/L-range after engine 1 was stopped. Therefore, when engine 1 is stopped with the transmission set in a range other than the R-range/D-range (S-mode)/L-range and thereafter is switched to the R-range/D-range (S-mode)/L-range, the engine is automatically actuated.

III) "Remaining capacity of the battery is below a certain value". This is a condition because engine 1 is not automatically actuated if the remaining capacity of the battery is not enough. Engine 1 is not stopped unless the remaining capacity of the battery is over a certain value. However, the capacity of the battery may become lower after engine 1 was automatically stopped. In this case, engine 1 is automatically actuated for the purpose of charging the battery. The certain value is set to be higher than the critical battery capacity, below which engine 1 will not actuated.

IV) "Electricity consumption is over a certain value". This is a condition because while electricity consumers, such as lights, are on, the capacity of the battery decreases quickly. As a result, engine 1 will not restart. For this reason, irrespective of the remaining capacity of the battery, engine 1 is automatically actuated when the electricity consumption is over a certain value.

V) "Negative pressure of the master pump MP is below a certain value". This is a condition because as the negative pressure at the master power MP is lower, less braking force is obtained. Therefore, engine 1 is restarted to secure sufficient braking force.

VI) "Accelerator pedal is depressed (TH ON)". This is a condition because the driver is expecting the driving force by engine 1. Therefore, engine 1 is automatically actuated when the accelerator pedal is depressed.

VII) "Condition for an automatic actuation of engine 1 at FI/MGECU 4 is satisfied". This is a condition because the automatic actuation of engine 1 determined at FI/MGECU 4 is also determined at CVTECU 6.

VIII) "Accelerator pedal is depressed (TH ON)". This is a condition because the driver is expecting the driving force by engine 1. Therefore, engine 1 is automatically actuated when the accelerator pedal is depressed.

IX) "Depression of the brake pedal BP is released (Brake switch BSW is OFF)". This is a condition because the determination of the starting operation is carried out when the driver releases the brake pedal BP. When the driver releases the brake pedal BP in the D-range/D-mode, the driver is considered to have initiated the starting operation. Therefore, engine 1 is automatically actuated.

X) "Braking force retaining unit RU is out of order". This a condition because When the braking force retaining unit RU is out of order and braking force is not retained, the vehicle displaces backwards (or forward) on a slope if the driver performs the automatic engine stop operation while believing the braking force will be retained. Therefore, when the servo valves LSV of the braking force retaining unit RU are out of order, engine 1 is automatically actuated, and the vehicle is kept in the strong creep condition. If a failure is detected in the braking force retaining unit RU after engine 1 was stopped, engine 1 is immediately actuated so that the driving force of the vehicle is kept in the strong creep condition. This is because the braking force may not be retained after the brake pedal BP is released upon starting the vehicle. In other words, it is the strong creep condition that prevents the vehicle from the unintentional backward displacement and facilitates a smooth vehicle start. Here, the failure of the braking force retaining unit RU is detected by the failure-detecting unit DU.

XI) "Backward displacement of the vehicle is detected". This is a condition because when the vehicle starts to displace backwards on a steep up slope with the backward displacement force derived from the vehicle's own weight being greater than the braking force, the vehicle is prevented from backward displacement by the driving force of engine 1. When the vehicle stops on an up slope, the braking force resists the backward displacement force of the vehicle. However, at a greater inclination angle of the slope, the backward displacement force becomes greater, and the vehicle starts to displace backwards on the steep up slope with the backward displacement force being greater than the braking force. For this reason, when the backward displacement of the vehicle is detected, the driving force is switched from the engine stop condition to the strong creep condition in any circumstance to generate sufficient driving force against the up slope. Because the way of detecting the backward displacement of the vehicle has been referred to in the Conditions Required for Strong Creep Order section, further explanation is omitted.

XII) "A vehicle speed pulse is inputted, and the vehicle is fully stopped before the input of the vehicle speed pulse". This is a condition for the following reason. When the vehicle displaces from the fully stopped position, the backward displacement (or the possible backward displacement) of the vehicle is detected, and then engine 1 is automatically actuated to generate driving force against the slope. Although the displacement of the vehicle is detected, the determination is not carried out to specify the direction as to whether the vehicle moves forward or backwards. When the vehicle stops on an up slope with engine 1 being stopped, only the braking force resists the backward displacement force of the vehicle. However, at a greater inclination of the slope, the backward displacement force becomes greater, and the vehicle starts to displace forward (on a down slope) or backwards (on an up slope) with the displacement force derived from the vehicle's own weight being greater than the braking force. For this reason, when the forward or backward displacement (i.e., the displacement) of the vehicle is detected, engine 1 is automatically actuated (to generate the strong creep condition) against the slope. For the purpose of detecting that the vehicle stops completely, the vehicle speed pulse of zero is detected before the vehicle speed pulse is inputted. The displacement of the vehicle is detected even from the input of one vehicle speed pulse.

Of the aforementioned individual conditions, if engine 1 is automatically actuated by turning OFF the brake switch BSW, the driving force value (or the target driving force value) in the strong creep condition is set in Example 1 based on the braking force when the vehicle stops, and the rate (or the target increasing rate) for the driving force to increase to the driving force value in the strong creep condition is set in Example 2 based on the braking force when the vehicle stops.

Example 1

In the vehicle of the aforementioned system construction, according to the vehicle of Example 1, the driving force value (or the target driving force value) in the strong creep condition when the driving force control unit DCU switches from the weak creep condition when the vehicle starts to the strong creep condition is increased/decreased based on the vehicle inclination angle when the vehicle stops.

The vehicle inclination angle is detected by the inclination angle measuring unit, based on the brake fluid pressure value when the vehicle stops. Based on this inclination angle, the driving force control unit DCU calculates the target driving force value to increase/decrease the driving force.

Control Time Chart

Next, the vehicle of Example 1 will be described with reference to two control time charts (FIGS. 22 and 23) to show how it is controlled when the vehicle is running, for example. In this situation, by depressing the brake pedal BP continuously, the driving force is changed by the driving force control unit DCU from the strong creep condition for driving (F_MSCRPON) to the weak creep condition, and engine 1 is automatically stopped by the driving motor stopping unit.

Figure 22:
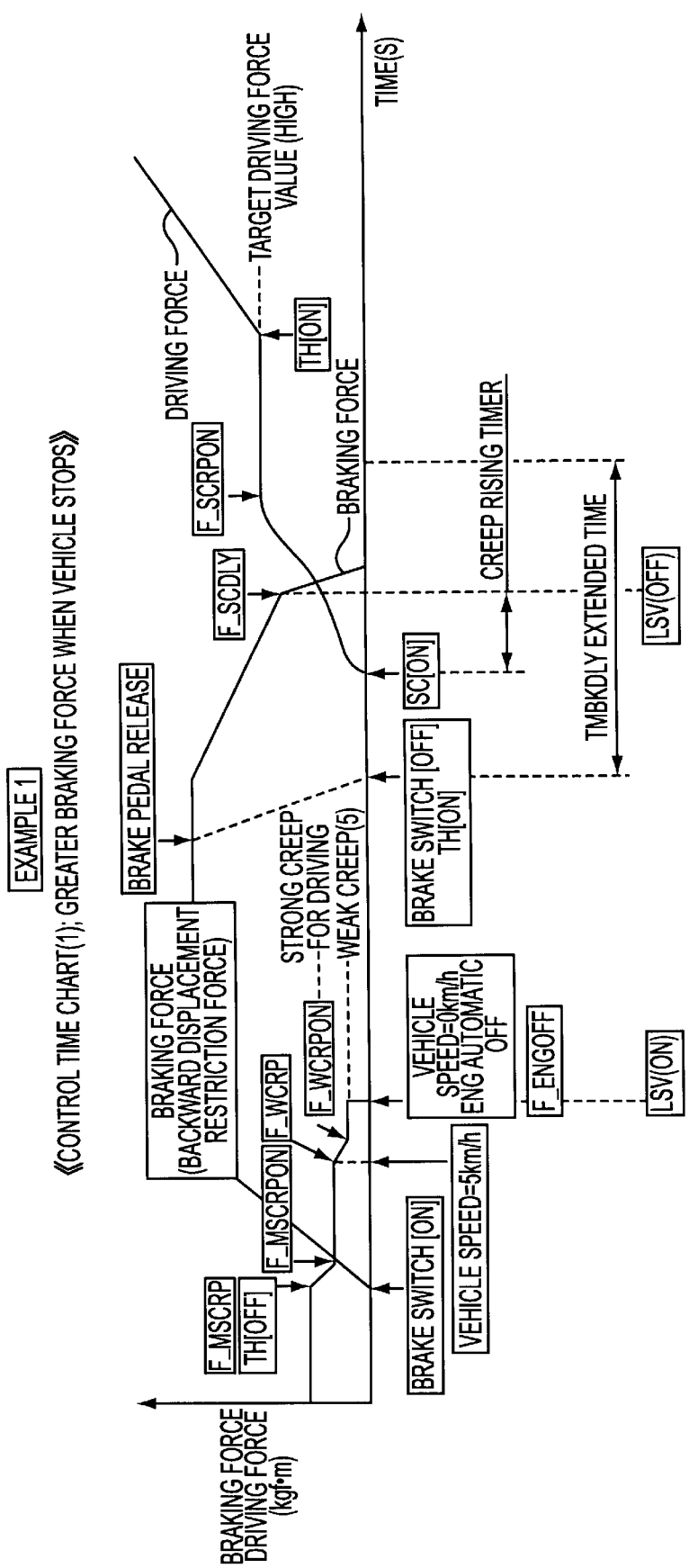
FIG. 22 is a diagram for explaining Example 1 and presents a control time chart (1) when the vehicle is running and when the braking force is large when the vehicle stops.
Figure 23:
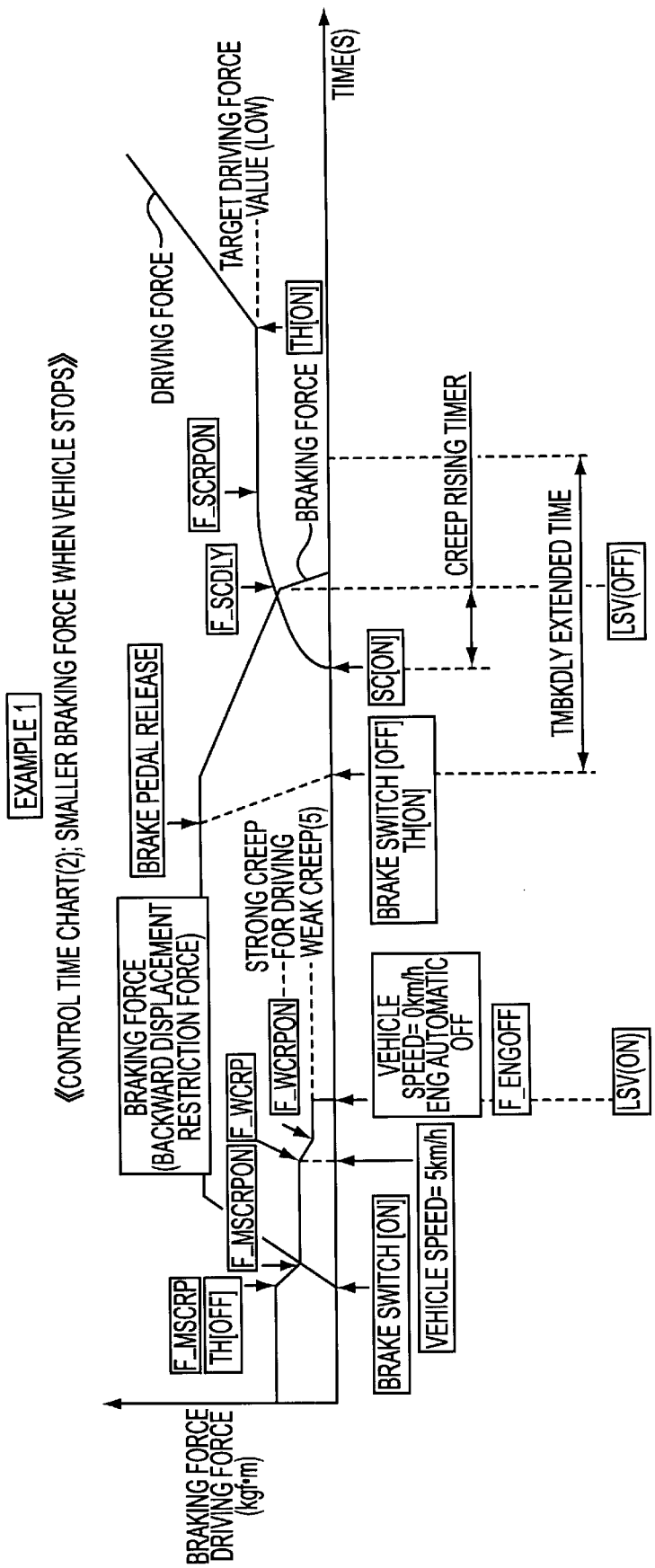
FIG. 23 is a diagram for explaining Example 1 and presents a control time chart (2) when the vehicle is running and when the braking force is small when the vehicle stops.

Here, FIG. 22 corresponds to a situation in which the braking force when the vehicle stops is high (or the vehicle inclination angle is large), and FIG. 23 corresponds to a situation in which the braking force when the vehicle stops is low (or the vehicle inclination angle is small). In either case, when the vehicle stops, the braking force is retained, and the engine 1 is automatically stopped.

Control Time Chart (1)

This control time chart (FIG. 22) shows a situation in which the braking force is great when the vehicle stops. It is assumed that the vehicle stops on an up slope having a large inclination angle. It is also assumed that the positioning switch PSW and the mode switch MSW of the vehicle are not changed from the D-mode and D-range. In the time chart of FIG. 22, the process of increasing and decreasing driving force and braking force of the vehicle are shown in time-sequence order. Here, a thick line indicates the driving force, and a thin line indicates the braking force.

The driving force control unit DCU transmits a strong creep order for driving (F_MSCRP) when the driver releases the accelerator pedal (or the throttle is OFF) while the vehicle is running (the vehicle speed >5 km/h). Driving force is then switched to the strong creep condition for driving (F_MSCRPON), which is less than the strong creep condition (F_SCRPON).

If the driver releases the accelerator pedal and depresses the brake pedal BP (the brake switch BSW is ON), the braking force increases. When the vehicle speed falls to 5 km/h with a continued braking application, the driving force control unit DCU transmits a weak creep order (F_WCRP), and the driving force is switched to the weak creep condition (F_WCRPON). Then, the driving force decreases to the weak creep condition through the strong creep condition for driving so that the driver does not feel a strong deceleration.

When the vehicle speed falls to 0 km/h, the braking force retaining unit RU turns the servo valves LSV to the closed condition to retain braking force. Further, the driving motor stopping unit automatically stops engine 1 (F_ENGOFF), and the driving force is lost. Then, engine 1 is stopped after the weak creep condition, the driver forcefully depresses the brake pedal BP with a force based on the slope. For this reason, even if engine 1 is automatically stopped and loses the driving force, the vehicle does not displace backwards on the slope (by the backward displacement restriction force). Specifically, the driver depresses the brake pedal BP forcefully based on the gradient of the up slope to stop the vehicle on the steep slope (to keep the stopped state). As a result, a great braking force is generated. Here, the automatic stop of the engine 1 is intended to improve fuel consumption and to eliminate the emission of exhaust gases.

Next, when the driver releases the depression of the brake pedal BP to restart the vehicle, the control unit CU gradually reduces the current value of the control current to be fed to the servo valves LSV of the braking force retaining unit RU. As a result, the brake fluid pressure retained in the wheel cylinders WC becomes gradually lower so that the braking force becomes gradually lower (to release the braking force gradually). Restriction on the backward displacement of the vehicle is achieved by the braking force retained while being gradually reduced, by the inertial force to act on the vehicle, and by the rolling resistance of the wheels.

While the braking force is being gradually reduced, the brake switch BSW is turned OFF by releasing the brake pedal BP depression, and an automatic engine actuation order (F_ENGON) is transmitted. After a time lag due to delays in the signal communication system and the mechanical system, moreover, engine 1 is automatically actuated to start (SC[ON]) the supply of the pressure oil to the starting clutch of CVT 3. As a result, the driving force increases to the target driving force value (that is, the brake switch BSW is turned OFF to actuate engine 1 automatically). This target driving force value is a value in the strong creep condition when the vehicle starts after the brake pedal BP was released, and is set based on the vehicle inclination angle detected by the inclination angle measuring unit from the maximum of the brake fluid pressure value when the vehicle stops (from the time of the vehicle speed of 0 km/h to the OFF of the brake switch BSW). For a steep up slope, the target driving force value is set to a high value because the braking force when the vehicle stops is high.

In the procedure (F_SCDLY) for the driving force to reach the target driving force value, on the other hand, the braking force retaining unit RU releases the retained braking force all at once while reducing and releasing it gradually by the servo valves LSV. Even if the braking force is suddenly released at this time, backward displacement of the vehicle is restricted by the inertial force and the rolling resistance (or the driving force in the plus increasing procedure) of the vehicle, so that the vehicle can be smoothly started by the increasing driving force.

Here, the release from the retention of the braking force is timed, as determined by the creep rising timer, from the start (SC [ON]) of the pressure oil supply to the starting clutch of CVT 3. When this time is reached, the signal (or the creep rising signal F_SCDLY) for releasing the retained braking force is transmitted, and the servo valves LSV are instantly returned to the communicating position to release the retention of the braking force (FIG. 18A) because the brake switch BSW is OFF. The reason why the rise increase is determined in this manner by the timer is that working oil in the oil pressure chamber of the starting clutch goes out when engine 1 stops so that the hydraulic pressure command value to the starting clutch and the actual oil pressure value (or the driving force transmission capacity) do not match (due to the abrupt rise of the driving force when SC turns ON). This is because the working oil (or the pressure oil) in the oil pressure chamber of the starting clutch goes out when engine 1 stops. When the engine stops while keeping the weak creep condition, on the other hand, the hydraulic pressure command value to the starting clutch matches the actual oil pressure value (or the driving force transmission capacity).

By thus setting the target driving force value to a high level based on the vehicle inclination angle, the vehicle can be started smoothly on a steep up slope without any backward displacement. Moreover, this vehicle is accelerated with the increasing driving force as the accelerator pedal is depressed (TH [ON]).

In the curve of FIG. 22 indicating the braking force, a phantom line extending rightwardly downward from the portion of the "Brake pedal Release" indicates the returning behavior of the brake pedal BP.

Control Time Chart (2)

This control time chart (FIG. 23) shows a situation in which the braking force is small when the vehicle stops. It is assumed that the vehicle stops on an up slope having a small inclination angle. It is also assumed that the positioning switch PSW and the mode switch MSW of the vehicle are not changed from the D-mode and D-range. In the time chart of FIG. 23, the processes of increasing and decreasing driving force and braking force of the vehicle are shown in time-sequence order. Here, a thick line indicates the driving force, and a thin line indicates the braking force.

The driving force control unit DCU transmits a strong creep order for driving (F_MSCRP) when the driver releases the accelerator pedal (or the throttle is OFF) while the vehicle is running (the vehicle speed is >5 km/h). Driving force is then switched to the strong creep condition for driving (F_MSCRPON), which is less than the strong creep condition (F_SCRPON).

If the driver releases the accelerator pedal and depresses the brake pedal BP (the brake switch BSW is ON), braking force increases. When the vehicle speed falls to 5 km/h with a continued braking application, the driving force control unit DCU transmits a weak creep order (F_WCRP), and the driving force is switched to the weak creep condition (F_WCRPON). Then, the driving force decreases to the weak creep condition through the strong creep condition for driving so that the driver does not feel a strong deceleration.

When the vehicle speed falls to 0 km/h, the braking force retaining unit RU turns the servo valves LSV to the closed condition to retain the braking force. Further, the driving motor stopping unit automatically stops engine 1 (F_ENGOFF), and the driving force is lost. Then, engine 1 is stopped after the weak creep condition and the driver forcefully depresses the brake pedal BP with the force based on the slope. For this reason, even if engine 1 is automatically stopped and the driving force is lost, the vehicle does not displace backwards on the slope (by the backward displacement restriction force). Specifically, the driver depresses the brake pedal BP more weakly than on the steep up slope because the vehicle stops on the gentle up slope. As a result, the braking force generated is weaker than that generated on the steep up slope.

Next, when the driver releases the brake pedal BP depression to restart the vehicle, the control unit CU gradually reduces the current value of the control current to be fed to the servo valves LSV of the braking force retaining unit RU. As a result, the brake fluid pressure retained in the wheel cylinders WC becomes gradually lower so that the braking force becomes gradually lower (to release the braking force gradually). The restriction on the backward displacement of the vehicle is achieved by the braking force retained while being gradually reduced, by the inertial force to act on the vehicle, and by the rolling resistance of the wheels.

While the braking force is being gradually reduced, the brake switch BSW is turned OFF by releasing the brake pedal BP depression, and an automatic engine actuation order (F_ENGON) is transmitted. After a time lag due to delays in the signal communication system and the mechanical system, moreover, engine 1 is automatically actuated to start (SC[ON]) the pressure oil supply to the starting clutch of CVT 3. As a result, the driving force increases to the target driving force value. This target driving force value is set based on the vehicle inclination angle detected by the inclination angle measuring unit from the maximum of the brake fluid pressure value when the vehicle stops (from the time the vehicle speed reaches 0 km/h to the time the brake switch BSW is turned OFF). For a gentle up slope, the target driving force value is set to a low value because the braking force when the vehicle stops is low.

In the procedure (F_SCDLY) for the driving force to reach the target driving force value, on the other hand, the braking force retaining unit RU releases the retained braking force all at once while reducing and releasing it gradually by the servo valves LSV. Even if the braking force is suddenly released at this time, the backward displacement of the vehicle is restricted by the inertial force and the rolling resistance (or the driving force in the plus increasing procedure) of the vehicle, so that the vehicle can be started smoothly by the increasing driving force.

Here, the timing for releasing the retention of the braking force is identical to that of the situation of Control Time Chart (1).

By thus setting the target driving force value to a low level based on the vehicle inclination angle, the vehicle can be started smoothly. Moreover, this vehicle is accelerated with the increasing driving force as the accelerator pedal is depressed (TH [ON]).

In the curve of FIG. 23 indicating the braking force, a phantom line extending rightwardly downward from the portion of the "Brake pedal Release" indicates the returning behavior of the brake pedal BP.

Example 2

In the vehicle of the aforementioned system construction, according to the vehicle of Example 2, the increasing rate (or the target increasing rate) of the driving force when the driving force control unit DCU switches from the weak creep condition when the vehicle starts to the strong creep condition is increased/decreased based on the vehicle inclination angle when the vehicle stops. The vehicle inclination angle is detected by the inclination angle measuring unit, based on the brake fluid pressure value when the vehicle stops. Based on this inclination angle, the driving force control unit DCU calculates the target driving force value to increase/decrease the driving force. The driving force value in the strong creep condition is constant irrespective of the vehicle inclination angle (or the brake fluid pressure value) when the vehicle stops.

Control Time Chart

Next, the vehicle of Example 2 will be described with reference to two control time charts (FIGS. 24 and 25) to show how it is controlled when the vehicle is running, for example. In this situation, by depressing the brake pedal BP continuously, the driving force is changed by the driving force control unit DCU from the strong creep condition for driving (F_MSCRPON) to the weak creep condition, and engine 1 is automatically stopped by the driving motor stopping unit.

Figure 24:
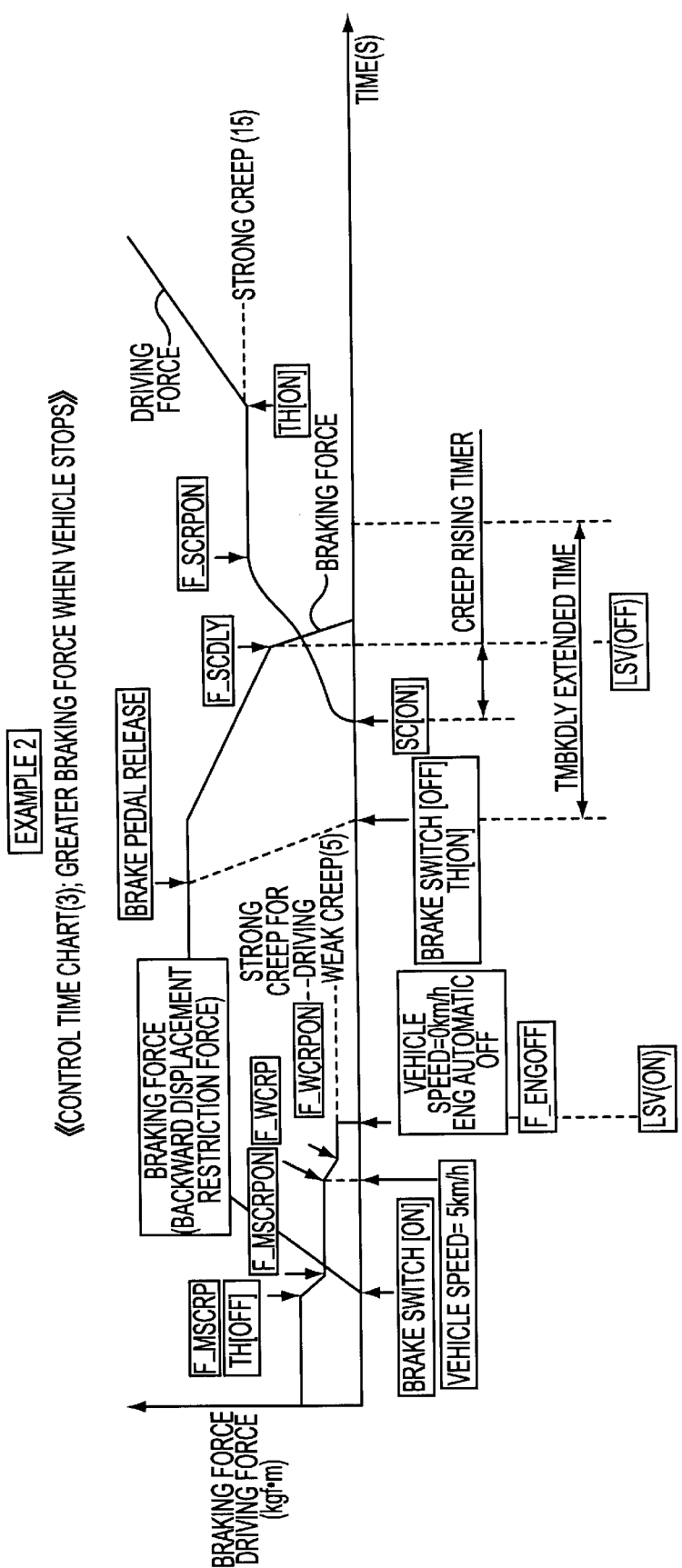
FIG. 24 is a diagram for explaining Example 2 and presents a control time chart (3) when the vehicle is running and when the braking force is large when the vehicle stops.
Figure 25:
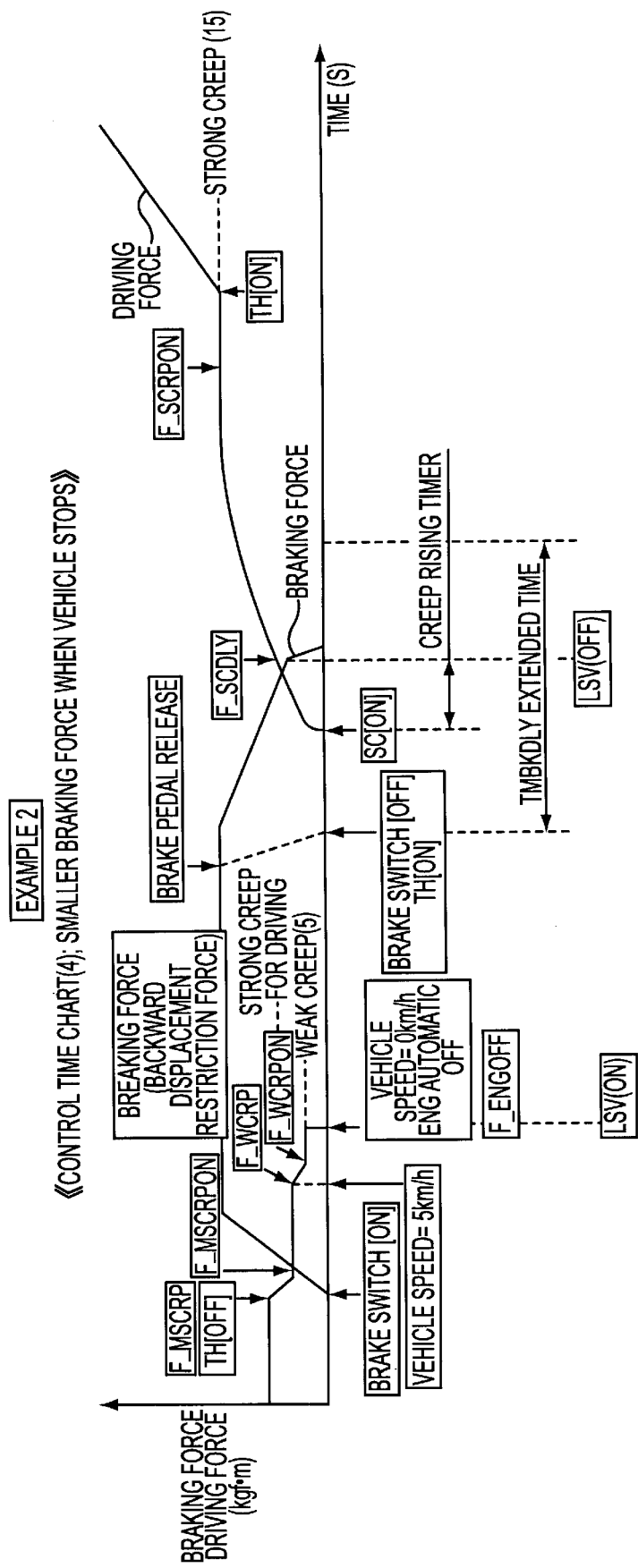
FIG. 25 is a diagram for explaining Example 2 and presents a control time chart (4) when the vehicle is running and when the braking force is small when the vehicle stops.

Here, FIG. 24 corresponds to the situation in which the braking force when the vehicle stops is high (or the vehicle inclination angle is large), and FIG. 25 corresponds to the situation in which the braking force when the vehicle stops is low (or the vehicle inclination is small). In either situation, when the vehicle stops, the braking force is retained, and engine 1 is automatically stopped.

Control Time Chart (3)

This control time chart (FIG. 24) shows a situation in which the braking force is great when the vehicle stops. It is assumed that the vehicle stops on an up slope having a large inclination angle. It is also assumed that the positioning switch PSW and the mode switch MSW of the vehicle are not changed from the D-mode and D-range. In the time chart of FIG. 24, the processes of increasing and decreasing driving force and braking force of the vehicle are shown in time-sequence order. Here, a thick line indicates the driving force, and a thin line indicates the braking force.

The operations until the vehicle stops are identical to those of Control Time Chart (1) of Example 1, therefore, a description will be omitted. The vehicle stops on an up slope having a high inclination angle by stopping engine 1 automatically. The braking force when the vehicle stops is high, and the braking force retaining unit RU retains the braking force by holding the servo valves LSV in the shut-off position.

When the driver releases the brake pedal BP depression to restart the vehicle, the control unit CU gradually reduces the current value of the control current to be fed to the servo valves LSV of the braking force retaining unit RU. As a result, the brake fluid pressure retained in the wheel cylinders WC becomes gradually lower so that the braking force becomes gradually lower (to release the braking force gradually). The restriction on the backward displacement of the vehicle is achieved by the braking force retained while being gradually reduced, by the inertial force acting on the vehicle, and by the rolling resistance of the wheels.

While the braking force is being gradually reduced, the brake switch BSW is turned OFF by releasing the brake pedal BP depression, and an automatic engine actuation order (F_ENGON) is transmitted. After a time lag due to delays in the signal communication system and the mechanical system, moreover, engine 1 is automatically actuated to start (SC[ON]) the pressure oil supply to the starting clutch of CVT 3. As a result, the driving force increases at the target increasing rate to the driving force value in the strong creep condition. The target increasing rate is such an increasing rate of the driving force when the vehicle starts after the brake pedal BP is released, and is set based on the vehicle inclination angle detected by the inclination angle measuring unit from the maximum of the brake fluid pressure value when the vehicle stops (from the time the vehicle speed reaches 0 km/h to the time the brake switch BSW turns OFF). For a steep up slope, the target increasing rate becomes high because the braking force when the vehicle stops is high.

In the procedure (F_SCDLY) for the driving force to reach the driving force value in the strong creep condition, on the other hand, the braking force retaining unit RU releases the retained braking force all at once while reducing and releasing it gradually by the servo valves LSV. Even if the braking force is suddenly released at this time, backward displacement of the vehicle is restricted by the inertial force and the rolling resistance (or the driving force in the plus increasing procedure) of the vehicle, so that the vehicle can be started smoothly by the increasing driving force.

Here, the release of the retained braking force is timed, as determined by the creep rising timer, from the start (SC [ON]) of the pressure oil supply to the starting clutch of CVT 3.

By thus setting the target driving force value to a high level based on the vehicle inclination angle, the driving force rises quickly, and the vehicle can be started smoothly on a steep up slope without any backward displacement. Moreover, this vehicle is accelerated with the increasing driving force as the accelerator pedal is depressed (TH [ON]).

In the curve of FIG. 24 indicating the braking force, a phantom line extending rightwardly downward from the portion of the "Brake pedal Release" indicates the returning behavior of the brake pedal BP.

Control Time Chart (4)

This control time chart (shown by FIG. 25) shows a situation in which the braking force is small when the vehicle stops. It is assumed that the vehicle stops on an up slope having a small inclination angle. It is also assumed that the positioning switch PSW and the mode switch MSW of the vehicle are not changed from the D-mode and D-range. In the time chart of FIG. 25, the processes of increasing and decreasing driving force and braking force of the vehicle are shown in time-sequence order. Here, a thick line indicates the driving force, and a thin line indicates the braking force.

The operations until the vehicle stops are identical to those of Control Time Chart (2) of Example 1 therefore a description is omitted. The vehicle stops on an up slope having a low inclination by stopping engine 1 automatically. The braking force when the vehicle stops is low, and the braking force retaining unit RU retains the braking force by holding the servo valves LSV in the shut-off position.

Next, when the driver releases the brake pedal BP depression to restart the vehicle, the control unit CU gradually reduces the current value of the control current to be fed to the servo valves LSV of the braking force retaining unit RU. As a result, the brake fluid pressure retained in the wheel cylinders WC becomes gradually lower so that the braking force becomes gradually lower (to release the braking force gradually). The restriction on the backward displacement of the vehicle is achieved by the braking force retained while being gradually reduced, by the inertial force acting on the vehicle, and by the rolling resistance of the wheels.

While the braking force is being gradually reduced, the brake switch BSW is turned OFF by releasing the brake pedal BP depression, and the automatic engine actuation order (F_ENGON) is transmitted. After a time lag due to delays in the signal communication system and the mechanical system, moreover, engine 1 is automatically actuated to start (SC[ON]) the pressure oil supply to the starting clutch of CVT 3. As a result, the driving force increases at the target increasing rate to the driving force in the strong creep condition. The target increasing rate is set based on the vehicle inclination angle detected by the inclination angle measuring unit from the maximum of the brake fluid pressure value when the vehicle stops (from the time of the vehicle speed reaches 0 km/h to the time the brake switch BSW turns OFF). For a gentle up slope, the target driving force value is set to a low value because the braking force when the vehicle stops is low. Here, the driving force value in the strong creep condition is constant, irrespective of the braking force when the vehicle stops.

In the procedure (F_SCDLY) for the driving force to reach the driving force value in the strong creep condition, on the other hand, the braking force retaining unit RU releases the retained braking force all at once while reducing and releasing it gradually by the servo valves LSV. Even if the braking force is suddenly released at this time, the backward displacement of the vehicle is restricted by the inertial force and the rolling resistance (or the driving force in the plus increasing procedure) of the vehicle, so that the vehicle can be started smoothly by the increasing driving force.

Here, the timing for releasing the retention of the braking force is identical to that of the situation of Control Time Chart (3).

By thus setting the target increasing rate to a low level based on the vehicle inclination angle, the driving force rises gently, and the vehicle can be started smoothly.

Moreover, this vehicle is accelerated with the increasing driving force as the accelerator pedal is depressed (TH [ON]).

In the curve of FIG. 25 indicating the braking force, a phantom line extending rightwardly downward from the portion of the "Brake pedal Release" indicates the returning behavior of the brake pedal BP.

With the aforementioned embodiments of the invention, the following effects are achieved;

(1) According to the first aspect of the invention, the driving force value can be high, when the vehicle inclination angle is large when the vehicle stops, and low when the vehicle inclination angle is small. On an up slope, the vehicle can be freed of a backward displacement or an abrupt feel. On a flat road, on the other hand, the vehicle can be started smoothly without an abrupt feel.

(2) In addition, according to the second aspect of the invention, no matter whether the vehicle might be on an up slope or a flat road, the time period for the driver to feel the initial motion of the vehicle after a brake pedal release can be constant to improve a stable feel in starting the vehicle.

(3) According to the third aspect of the invention, the increasing rate of the driving force can be high, when the vehicle inclination angle is large when the vehicle stops, and low when the vehicle inclination angle is small. On an up slope, the vehicle can be freed of a backward displacement or an abrupt feel. On a flat road, on the other hand, the vehicle can be started smoothly without an abrupt feel.

(4) According to the fourth aspect of the invention, the backward displacement force on an up slope changes not only with the vehicle inclination angle but also with the loading weight, but the braking force by the driver's depression of the brake pedal directly reflects the backward displacement force which is determined by the vehicle inclination angle when the vehicle stops and by the loading weight. In other words, the brake pedal is strongly depressed to increase braking force when the loading weight is large at the same inclination angle. As compared with the situation in which the driving force value in the large state or the increasing rate of the driving force is to be set by the inclination meter based on only the inclination angle, or the like, when the vehicle stops, it is possible to set the driving force value in the large state or the increasing rate of the driving force more properly based on the prevailing vehicle state. Moreover, detecting the loading weight and the inclination angle individually is not required, rather, detecting the braking force is required, so that the detection sensor can be simplified.

As has been described before, the present invention is not be limited to the foregoing embodiments and examples thereof but can be exemplified in various modes.

What is claimed is:

1. A driving force control unit for a vehicle, which allows transmission of driving force from a driving motor to driving wheels irrespective of releasing an accelerator pedal at a certain or lower vehicle speed when a transmission is selected to a driving range, and which switches the magnitude of the driving force while the accelerator pedal is released at a vehicle speed no more than the certain vehicle speed between a greater condition and a smaller condition in accordance with depression of the brake pedal so that the driving force is made lower at a depression of the brake pedal than at a release of the brake pedal, wherein the driving force value in said greater condition upon switching from said smaller condition to said greater condition, at a release of the brake pedal during the time the vehicle stops, is increased or decreased based on a vehicle inclination angle when the vehicle stops.

2. A driving force control unit according to claim 1, wherein the time period required for reaching said driving force value from the release of the brake pedal is controlled to be constant irrespective of the driving force value in said greater condition.

3. A driving force control unit according to claim 2, wherein the vehicle inclination angle is detected based on the braking force generated by the depression of the brake pedal while the vehicle stops.

4. A driving force control unit according to claim 2, wherein the vehicle inclination angle is determined by the releasing rate of the brake pedal when the vehicle stops.

5. A driving force control unit according to claim 1, wherein the vehicle inclination angle is detected based on the braking force generated by the depression of the brake pedal while the vehicle stops.

6. A driving force control unit according to claim 1, wherein the vehicle inclination angle is determined by the releasing rate of the brake pedal when the vehicle stops.

* * * * *